US011394216B2

(12) United States Patent
Jiao et al.

(10) Patent No.: US 11,394,216 B2
(45) Date of Patent: Jul. 19, 2022

(54) AUTOMATIC WORKING SYSTEM

(71) Applicant: Positec Power Tools (Suzhou) Co., Ltd., Suzhou (CN)

(72) Inventors: Shiping Jiao, Suzhou (CN); Baoquan Zhang, Suzhou (CN); Bincai Lan, Suzhou (CN); Don Zhendong Gao, Suzhou (CN); Xiulian Chen, Suzhou (CN); Jiang Du, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 123 days.

(21) Appl. No.: 16/848,559

(22) Filed: Apr. 14, 2020

(65) Prior Publication Data

US 2020/0287397 A1  Sep. 10, 2020

Related U.S. Application Data

(63) Continuation of application No. PCT/CN2018/112185, filed on Oct. 26, 2018.

(51) Int. Cl.
*H02J 7/00*       (2006.01)
(52) U.S. Cl.
CPC .................. *H02J 7/0045* (2013.01)
(58) Field of Classification Search
USPC .......... 320/106, 107, 108, 109, 110
See application file for complete search history.

(56) References Cited

U.S. PATENT DOCUMENTS

| 5,787,545 A | * | 8/1998 | Colens .................. A47L 9/2852 15/319 |
| 8,441,230 B2 | | 5/2013 | Boyles et al. |
| 2012/0256752 A1 | | 10/2012 | Musser et al. |
| 2014/0266048 A1 | | 9/2014 | Cunanan et al. |

FOREIGN PATENT DOCUMENTS

| CN | 101375781 A | * | 3/2009 |
| CN | 101853004 A | * | 10/2010 |
| CN | 102687625 A | | 9/2012 |
| CN | 103970039 A | * | 8/2014 |
| CN | 103970039 A | | 8/2014 |
| CN | 104953685 A | | 9/2015 |
| CN | 205335882 U | | 6/2016 |
| CN | 205453246 U | * | 8/2016 |
| CN | 206211572 U | | 5/2017 |

(Continued)

*Primary Examiner* — Brian Ngo
(74) *Attorney, Agent, or Firm* — Dentons US LLP

(57) ABSTRACT

An automatic working system includes a self-moving device powered by an energy module and moving and working in a defined working area. The self-moving device includes a body, a movement module, a task execution module, a control module, and a charging system configured to store external electrical energy in the energy module to charge the energy module. The charging system includes at least two charging modes for charging the energy module. In the different charging modes, the charging system uses different charging logics and/or different charging parameters to charge the energy module. The charging system further includes a charging management module configured to manage the charging modes, to enable the charging system to use a corresponding charging mode to charge the energy module.

20 Claims, 27 Drawing Sheets

(56) References Cited

FOREIGN PATENT DOCUMENTS

| | | | |
|---|---|---|---|
| CN | 106909143 A | * | 6/2017 |
| CN | 107093918 A | | 8/2017 |
| DE | 202012005813 U1 | | 8/2012 |
| EP | 0829196 A2 | | 3/1998 |
| EP | 2875712 A1 | | 5/2015 |
| JP | 2017-158401 A | | 9/2017 |
| WO | 2016/155559 A1 | | 10/2016 |
| WO | WO-2017101882 A1 * | 6/2017 | ............... G05D 1/02 |

* cited by examiner

AUTOMATIC WORKING SYSTEM

This application is a Continuation Application of International Application No. PCT/CN2018/112185, filed on Oct. 26, 2018, which claims benefit of and priority to Chinese Patent Application Nos. 201711025072.1, filed on Oct. 27, 2017, 201711294746.8, filed on Dec. 8, 2017, 201810364669.7, filed on Apr. 23, 2018, and 201810011833.6, filed on Jan. 5, 2018, all of which are hereby incorporated by reference in their entirety for all purposes as if fully set forth herein.

BACKGROUND

Technical Field

The present invention relates to an automatic working system.

Related Art

For a self-moving device and an automatic working system thereof, for example, an autonomous lawnmower and an automatic working system thereof, the automatic working system of the autonomous lawnmower includes a boundary wire, an autonomous lawnmower, a charging station, and the like. A built-in battery pack is disposed inside the autonomous lawnmower. The battery pack is fastened inside the autonomous lawnmower and cannot be manually detached. It is necessary to use a tool to remove a screw or the like to mount or detach the battery pack. The autonomous lawnmower can automatically perform a work task without manual supervision. When there is insufficient power, the autonomous lawnmower automatically returns to the charging station to supply power to an energy module to for charging. Such a built-in battery pack is usually specially configured for a corresponding autonomous lawnmower and can be directly used after mounting.

Other electric tools such as a gun drill, a hammer drill, a trimmer, and a hand-propelled lawnmower are powered by a detachable battery pack. When an electric tool runs out of power, a user has to replace the battery pack with a backup battery pack. When the backup battery pack is used up, the user has to stop work, takes the battery packs home or another charging site to charge the battery packs, and waits until the battery packs are fully charged before the user can continue with the work. As a result, the time efficiency and continuity of work cannot be ensured.

Therefore, it is necessary to design a new self-moving device and an automatic working system thereof that can work intelligently, to resolve the foregoing problems.

SUMMARY

To overcome the foregoing deficiencies, the following technical solutions are adopted in the present invention: An automatic working system, comprising a self-moving device powered by an energy module and moving and working in a defined working area, wherein the self-moving device comprises: a body; a movement module, disposed on the body and configured to drive the self-moving device to move; a task execution module, disposed on the body and configured to perform a work task; a control module, configured to control the movement module to drive the self-moving device to move in a defined area, and control the task execution module to perform the work task; and a charging system, configured to store external electrical energy in the energy module to charge the energy module, wherein the charging system comprises at least two charging modes for charging the energy module, in the different charging modes, the charging system uses different charging logics and/or different charging parameters to charge the energy module, and the charging system further comprises a charging management module is configured to manage the charging modes, to enable the charging system to use a corresponding charging mode to charge the energy module.

In a possible implementation, the self-moving device further comprises an energy module configured to power the self-moving device, and the energy module is selectively configured to power the self-moving device or an electric tool different from the self-moving device.

In a possible implementation, the self-moving device is powered by a detachable energy module, and the charging system is configured to charge the detachable energy module.

In a possible implementation, the self-moving device further comprises a self-moving device power interface configured to be docked to the energy module to charge the energy module and/or to be powered by the energy module.

In a possible implementation, the self-moving device power interface is the same as a power interface of an electric tool different from the self-moving device, to enable the energy module to be selectively configured to power the self-moving device or the electric tool.

In a possible implementation, the self-moving device power interface comprises at least one of a quick-plug self-moving device connector and a wirelessly rechargeable self-moving device charging interface.

In a possible implementation, the charging system comprises at least two charging modes, and each charging mode is used to match one of at least two different types of energy modules, to enable the charging system to use a corresponding charging mode to charge the at least two different types of energy modules.

In a possible implementation, the at least two charging modes separately use different charging parameters to charge the energy module, to enable the charging system to use a corresponding charging parameter to charge the energy module.

In a possible implementation, the automatic working system comprises at least two energy modules charged by the charging system, the charging system comprises at least two charging modes, each charging mode uses one of at least two different charging orders to charge the energy module, to enable the charging system to use a corresponding charging order to charge the energy module.

In a possible implementation, when the self-moving device is powered on and/or a quantity of the energy modules changes, the charging management module adjusts the charging mode, to enable the charging system to select a corresponding charging mode to charge a current energy module.

In a possible implementation, the charging management module comprises an energy information acquisition module configured to acquire related information of the energy module and a control unit configured to control the charging system according to the related information, and the control unit is configured to control the charging system to use a corresponding charging mode to charge the energy module.

In a possible implementation, the energy module comprises an energy information providing module configured to provide the related information of the energy module, and the energy information acquisition module is configured to acquire information provided by the energy information providing module.

In a possible implementation, the energy information providing module comprises at least one of a recognition electrode, a sensor, a reed switch, and a recognition resistor.

In a possible implementation, the energy information acquisition module is electrically connected to the energy information providing module to acquire information provided by the energy information providing module.

In a possible implementation, the energy information acquisition module communicates with the energy information providing module to obtain information provided by the energy information providing module.

In a possible implementation, the related information of the energy module comprises at least one piece information of quantity information, type information, temperature information, voltage information, capacity information, and battery level information of the energy module.

In a possible implementation, the energy information acquisition module is configured to acquire the at least one piece of information of quantity information and type information of the energy module, and the control unit controls, according to the at least one piece of information of quantity information and type information of the energy module, a charging mode of charging the energy module by the charging system.

In a possible implementation, the charging modes comprise a constant current charging mode of using a constant charging current to charge the energy module, and in the constant current charging mode, the control unit automatically selects, according to the related information of the energy module, a charging current of charging the energy module by the charging system.

In a possible implementation, in the constant current charging mode, the control unit adjusts a charging power of charging the energy module by the charging system to adjust the charging current, to enable the charging system to select a corresponding constant charging current to charge the energy module.

In a possible implementation, the charging modes further comprises a constant voltage charging mode of using a constant charging voltage to charge the energy module, and in the constant voltage charging mode, the control unit automatically selects, according to the related information of the energy module, a charging voltage of charging the energy module by the charging system.

In a possible implementation, the energy information acquisition module is configured to acquire a current voltage value of the energy module, and the control unit controls, according to the current voltage value of the energy module, the charging system to select to use one of the constant current charging mode and the constant voltage charging mode to charge the energy module.

In a possible implementation, the energy information acquisition module is configured to continuously acquire at least one piece of information of a quantity, a current temperature, a voltage value, and a remaining battery level value of the energy module, and the control unit controls, according to the related information of the energy module acquired by the energy information acquisition module, a charging status of charging the energy module by the charging system.

In a possible implementation, the charging status comprises at least one of whether charging is performed, a charging order, a charging current, a charging voltage, a charging power, a charging battery level, and a charging time.

In a possible implementation, the charging management module further comprises a charging status adjustment module configured to adjust the charging status of the energy module, and the control unit controls, according to the related information of the energy module acquired by the energy information acquisition module, the charging status adjustment module to adjust the charging status of the energy module.

In a possible implementation, the charging status adjustment module comprises at least one of a charging order adjustment module configured to adjust the charging order of the energy module, a charging speed adjustment module configured to adjust the charging speed of the energy module, a charging current adjustment module configured to adjust the charging current of the energy module, a charging battery level management module configured to adjust the charging battery level of the energy module, and a charging power management module configured to adjust the charging power of the energy module.

In a possible implementation, the charging management module further comprises an instruction receiving module and a control unit, the instruction receiving module is configured to receive an instruction for adjusting the charging mode, and the control unit adjusts the charging mode according to the instruction.

In a possible implementation, the instruction comprises an adjustment instruction used to adjust a charging parameter and/or charging logic of charging the energy module by the charging system, the instruction receiving module receives the adjustment instruction, and the control unit adjusts the charging mode according to the adjustment instruction.

In a possible implementation, the self-moving device presets a plurality of preset charging modes for charging the energy module, the instruction comprises a switching instruction used to switch between the preset charging modes, and the control unit controls, according to the switching instruction, the charging system to use a corresponding preset charging mode to charge the energy module.

In a possible implementation, the automatic working system further comprises a human-computer interaction module configured to send the instruction.

In a possible implementation, the human-computer interaction module comprises a user interface disposed on the self-moving device and/or a user terminal communicating with the self-moving device.

In a possible implementation, the self-moving device presets a plurality of preset charging modes for charging the energy module, the charging management module further comprises a scheduling module and a control unit, the scheduling module is configured to plan a time arrangement of using the preset charging modes by the charging system, and the control unit is configured to control the charging system to charge the energy module according to the plan of the scheduling module, to enable the charging system to charge the energy module according to a corresponding preset charging mode at a corresponding time.

In a possible implementation, the scheduling module comprises a preset timetable, the timetable is used to plan a time arrangement of using the preset charging modes by the charging system, and the control unit controls the charging system to charge the energy module according to the time arrangement of the timetable, to enable the charging system to charge the energy module according to a corresponding preset charging mode at a corresponding time.

In a possible implementation, the scheduling module is configured to memorize a habit by which the self-moving device uses the preset charging modes and generate a timetable according to memorized content, the timetable is used to plan a time arrangement of using the preset charging modes by the charging system, and the control unit controls the charging system to charge the energy module according to the time arrangement of the timetable, to enable the charging system to charge the energy module according to a corresponding preset charging mode at a corresponding time.

In a possible implementation, the scheduling module comprises an instruction receiving module configured to receive an instruction representing the timetable, the timetable is used to plan a time arrangement of using the preset charging modes by the charging system, and the control unit controls the charging system to charge the energy module according to the time arrangement of the timetable, to enable the charging system to charge the energy module according to a corresponding preset charging mode at a corresponding time.

In a possible implementation, the self-moving device presets a plurality of preset charging modes for charging the energy module, and the charging management module is configured to control the charging system to use a corresponding preset charging mode to charge the energy module.

In a possible implementation, the preset charging modes comprise a fast-charging mode and a slow-charging mode.

In a possible implementation, the charging management module controls the charging current of charging the energy module by the charging system, to adjust the charging speed of the charging system.

In a possible implementation, the fast-charging mode comprises a constant current charging mode, and in the constant current charging mode in the fast-charging mode, the charging management module increases the charging current of charging the energy module by the charging system, to increase the charging speed of the charging system.

In a possible implementation, the slow-charging mode comprises a constant current charging mode and a constant voltage charging mode, and in the slow-charging mode, the charging management module controls the charging system to automatically select, according to a current voltage value of the energy module, the constant current charging mode or the constant voltage charging mode to charge the energy module.

In a possible implementation, in the fast-charging mode, when the charging system simultaneously charges at least two energy modules, the charging management module controls the charging system to adjust in real time a charging current for charging each energy module, to enable the charging system to charge the energy module at a high power, to increase the charging speed of the energy module.

In a possible implementation, in the fast-charging mode, the charging management module controls the charging system to first charge one of the energy modules to increase the charging speed of the energy module that is first charged.

In a possible implementation, the charging modes comprise a device mode and an electric tool mode.

In a possible implementation, a device charging cutoff battery level and an electric tool charging cutoff battery level are preset, in the device mode, a charging cutoff battery level of charging the energy module by the charging system is the device charging cutoff battery level, and in the electric tool mode, the charging cutoff battery level of charging the energy module by the charging system is the electric tool charging cutoff battery level.

In a possible implementation, the device charging cutoff battery level is 80% to 90%, and the electric tool charging cutoff battery level is 90% to 100%.

In a possible implementation, the charging modes further comprises a fast-charging mode for charging at a fast speed and a slow-charging mode for charging at a slow speed, in the device mode, the charging system charges the energy module in the slow-charging mode, and in the electric tool mode, the charging system charges the energy module in the fast-charging mode.

In a possible implementation, the self-moving device further comprises a docking charging interface, the docking charging interface is configured to be docked to a charging station, to store external electrical energy in the energy module by using the charging system, the self-moving device comprises an automatic-return charging mode, the charging management module comprises an energy information acquisition module configured to acquire related information of the energy module and a control unit configured to control the self-moving device to automatically return for charging, and in the automatic-return charging mode, the control unit controls, according to the related information of the energy module, the self-moving device to automatically return to the charging station to be docked to the charging station to charge the energy module.

In a possible implementation, the automatic-return charging mode comprises a room temperature return charging mode, in the room temperature return charging mode, a return voltage threshold is preset, the energy information acquisition module is configured to acquire a current voltage value of the energy module, and when the current voltage value of the self-moving device is less than the return voltage threshold, the control unit controls the self-moving device to automatically return for charging.

In a possible implementation, the automatic-return charging mode further comprises a high-temperature return charging mode, in the high-temperature return charging mode, a high-temperature return voltage threshold is preset, the high-temperature return voltage threshold is greater than the return voltage threshold, and when the current voltage value of the self-moving device is less than a high temperature voltage threshold, the control unit controls the self-moving device to automatically return for charging.

In a possible implementation, the energy information acquisition module is configured to acquire a current temperature of the energy module, and the control unit controls, according to the current temperature of the energy module, the self-moving device to select a corresponding automatic-return charging mode.

In a possible implementation, a temperature threshold is preset, when the current temperature of the energy module exceeds the temperature threshold, the control unit controls the self-moving device selects the high-temperature return charging mode to automatically return for charging.

In a possible implementation, the energy module comprises a thermosensitive resistor, and the energy information acquisition module detects a resistance value of the thermosensitive resistor to acquire the current temperature of the energy module.

In a possible implementation, the automatic-return charging mode comprises a room temperature return charging mode, in the room temperature return charging mode, a return battery level threshold is preset, the energy information acquisition module is configured to acquire a remaining battery level value of the energy module, and when the remaining battery level value of the energy module is less than the return battery level threshold, the control unit controls the self-moving device to return to the charging station for charging.

In a possible implementation, the self-moving device further comprises a docking charging interface, the docking charging interface is configured to be docked to a charging station to store external electrical energy in the energy module by using the charging system, the self-moving device comprises a non-automatic-return charging mode, and in the non-automatic-return charging mode, the control unit controls the self-moving device is docked to the charging station to charge the energy module.

In a possible implementation, the self-moving device further comprises a docking charging interface and a direct charging interface different from the docking charging interface, the docking charging interface is configured to be docked to a charging station to store external electrical energy in the energy module by using the charging system, and the direct charging interface is configured to be directly electrically connected to an external power supply to store external electrical energy in the energy module by using the charging system.

In a possible implementation, the self-moving device comprises at least two self-moving device power interfaces docked to the energy module, to enable the self-moving device to simultaneously charge two energy modules.

In a possible implementation, the automatic working system further comprises a charging member configured to accommodate at least one energy module, and the charging member comprises a charging member interface electrically connected to the energy module and a charging member adaptation interface electrically connected to the self-moving device.

In a possible implementation, the self-moving device comprises a self-moving device power interface directly docked to the energy module and a device adaptation interface electrically connected to the charging member adaptation interface, to enable the self-moving device to simultaneously charge the energy module docked to the self-moving device power interface and the energy module electrically connected to the charging member interface.

In a possible implementation, the charging member interface is directly docked to the energy module to implement an electrical connection.

In a possible implementation, there is one self-moving device power interface.

In a possible implementation, the self-moving device is an autonomous lawnmower

The beneficial effects of the present invention are as follows: At least two charging modes and a charging management module configured to manage the charging modes are disposed to enable a self-moving device to charge different energy modules.

DETAILED DESCRIPTION

To make the objectives, technical solutions, and advantages of the present invention more comprehensible, the present invention is further described in detail below with reference to the accompanying drawings and the embodiments. It should be understood that the described specific embodiments are only used to explain the present invention rather than to limit the present invention. "Exposure" in the present invention includes "partial exposure". "A plurality of" in the present invention includes "one or more".

Figure 1:
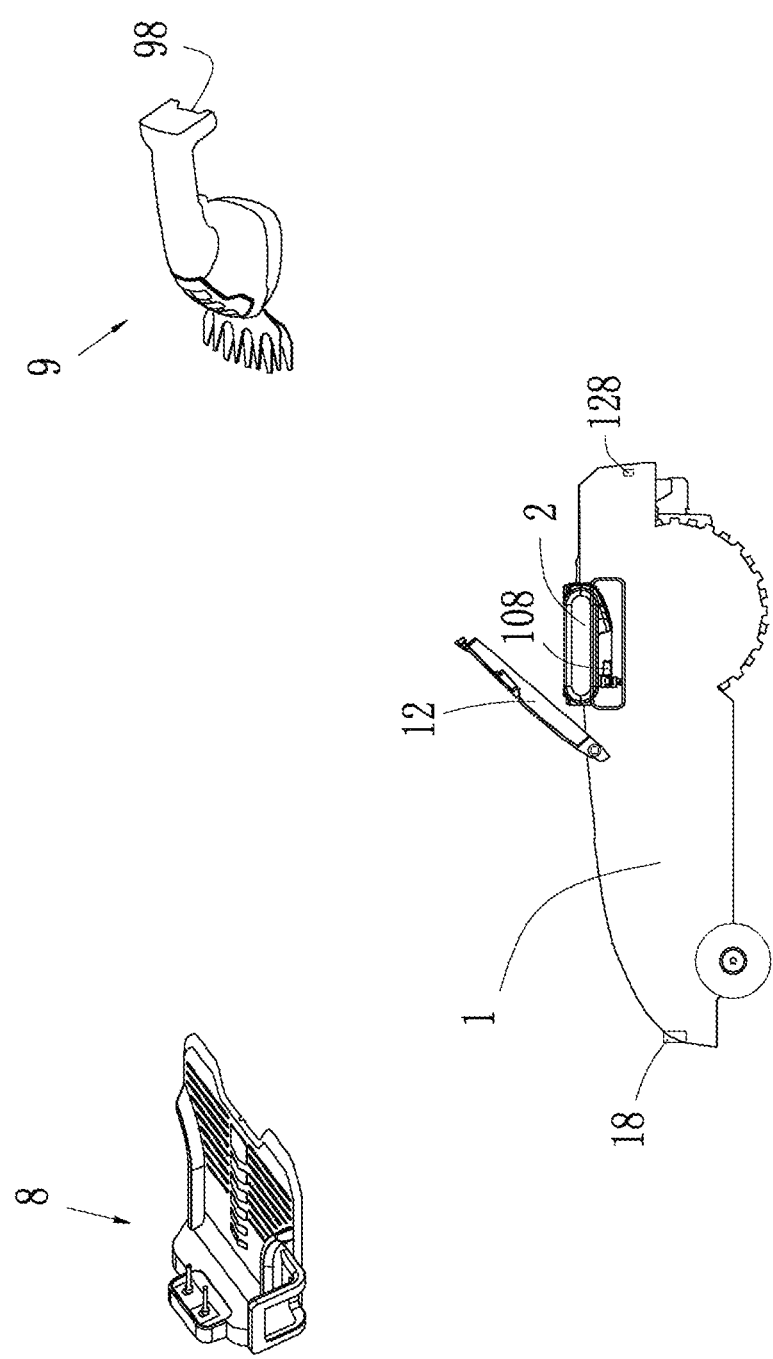
FIG. 1 is a schematic diagram of an automatic working system according to an embodiment of the present invention.

As shown in FIG. 1, an example embodiment of the present invention provides an automatic working system 100. The automatic working system 100 includes a self-moving device 1, a charging station 8, an electric tool 9, and at least one energy module 2. The energy module 2 is selectively configured to power the self-moving device 1 or the electric tool 9. In other words, a user may selectively use the energy module 2 in the self-moving device 1 or the electric tool 9 to power a corresponding self-moving device 1 or electric tool 9. Further, the self-moving device 1 includes a charging system. The charging system is configured to store external electrical energy in the energy module 2. The energy module 2 may store the external electrical energy in the energy module 2 by using the self-moving device 1. A source of the external electrical energy may be conventional utility power or may be electrical energy converted from solar energy or may be electrical energy converted from wind energy or the like. In this embodiment, the self-moving device 1 is an autonomous lawnmower. In other embodiments, the self-moving device 1 may be alternatively another outdoor self-moving device such as an automatic leaf blower, an automatic water sprinkler, and a multifunctional machine. In other embodiments, the self-moving device may be alternatively an indoor self-moving device such as a robot cleaner. The electric tool 9 is an electric tool other than the self-moving device 1, and is, for example, a gardening electric tool, a household electric tool, a DIY electric tool or the like that can be powered by a detachable battery pack. The gardening electric tool includes a trimmer, a hand-propelled lawnmower or the like. The home electric tool includes a gun drill, a hammer drill or the like. The DIY electric tool includes a DIY gun drill, a hammer drill or the like. The electric tools are no longer listed one by one herein. In another embodiment, the energy module 2 may further be selectively configured to power another electric device, for example, a home appliance. The electric device is an electric device other than the self-moving device 1. The electric tool 9, the home appliance, and the like may be generally referred to as electric devices.

In an example embodiment, the automatic working system 100 further includes a guide wire. The self-moving device 1 further includes a guide wire detection module (not shown). The guide wire detection module includes at least one guide wire detection sensor, configured to detect a position relationship between the self-moving device and the guide wire. The position relationship between the self-moving device and the guide wire includes the self-moving device being located on either side of the guide wire, a distance between the self-moving device and the guide wire or the like. In this embodiment, the guide wire includes a boundary wire defining a working area of the self-moving device. In other embodiments, the guide wire may be a lead wire arranged in the working area, is guided out from the position of a stop, and is configured to guide the self-moving device to move toward the stop. Certainly, the guide wire may be a physical boundary formed by a fence or the like, a physical boundary formed between a lawn and a non-lawn or the like. Correspondingly, the guide wire detection sensor may be a camera, a capacitive sensor or the like. In other embodiments, there may be no guide wire, and correspondingly, the working area of the self-moving device is directly controlled by using a capacitive sensor, Global Positioning System (GPS) positioning or the like. In the foregoing embodiments, when the guide wire is a boundary wire, the boundary wire usually needs to be powered. In an embodiment, the boundary wire is connected to the charging station and is charged by using alternating current (AC) power. In another embodiment, the automatic working system may be directly powered by the energy module 2 instead of being powered by AC power.

As shown in FIG. 1 to FIG. 9, the self-moving device 1 includes a body 10. The energy module 2 is detachably assembled on the body 10. "Detachably" means that the energy module 2 can be directly detached without needing to remove a fastener such as a screw, a nut or a pin. For example, the energy module 2 and the self-moving device 1 are docked by a connector, a wireless charging interface or the like, so that the energy module 2 and the self-moving device 1 can be conveniently undocked, to implement fast insertion of the energy module 2. Certainly, in other embodiments, a protective cover or the like fastened to the body 10 may be disposed outside the energy module 2, or even the protective cover and the body are fastened by a fastener such as a screw, a nut or a pin. The energy module 2 is "detachable" provided that fast insertion or tool-free insertion of the energy module 2 in the self-moving device 1 can be implemented. The self-moving device 1 includes a housing 3, a movement module 4 configured to drive the self-moving device 1 to move, a task execution module configured to perform a work task, a power module configured to power the movement module 4 and the task execution module, and a control module 7 configured to control the movement module 4 to drive the self-moving device 1 to move inside the defined working area and control the task execution module to perform the work task, and the like. The movement module 4, the task execution module, the control module 7, and the like are all disposed on the housing 3 to form the body 10. In this embodiment, the self-moving device 1 is an autonomous lawnmower. The task execution module is a cutting module 5 performing a mowing task. The power module includes a cutting motor configured to drive the cutting module 5 and a walking motor configured to drive the movement module. In other embodiments, the task execution module may be a task execution module performing another work task. For example, when the self-moving device is an automatic snowplow, the task execution module of the self-moving device is a snow removal module. In this embodiment, the control module 7 is electrically connected to the movement module 4, the cutting module 5, the energy module 2, and the like, to control the movement module 4 to drive the self-moving device 1 to move, and control the cutting module 5 to perform a mowing task.

Figure 8:
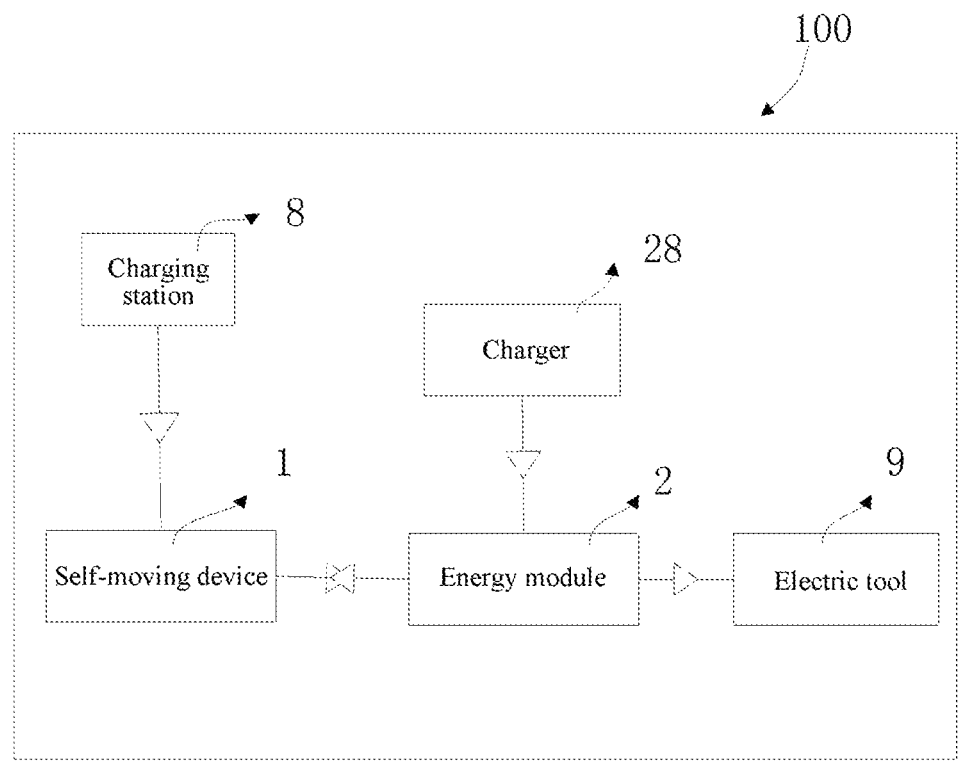
FIG. 8 is a schematic system diagram of an automatic working system according to an embodiment of the present invention.
Figure 9:
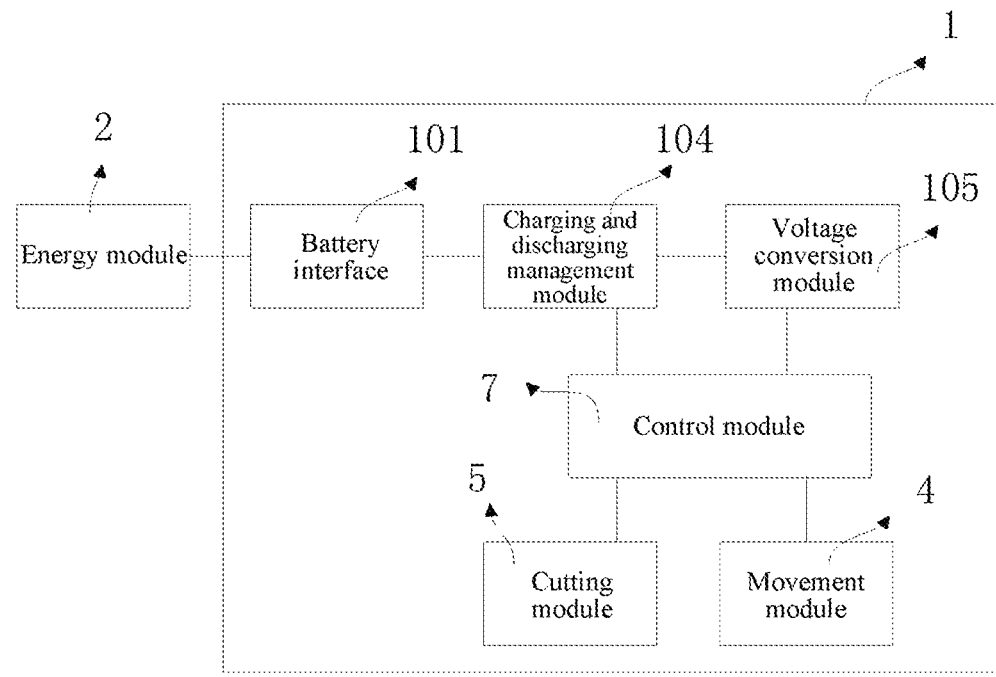
FIG. 9 is a schematic modular diagram of a self-moving device and an energy module according to an embodiment of the present invention.
Figure 10:
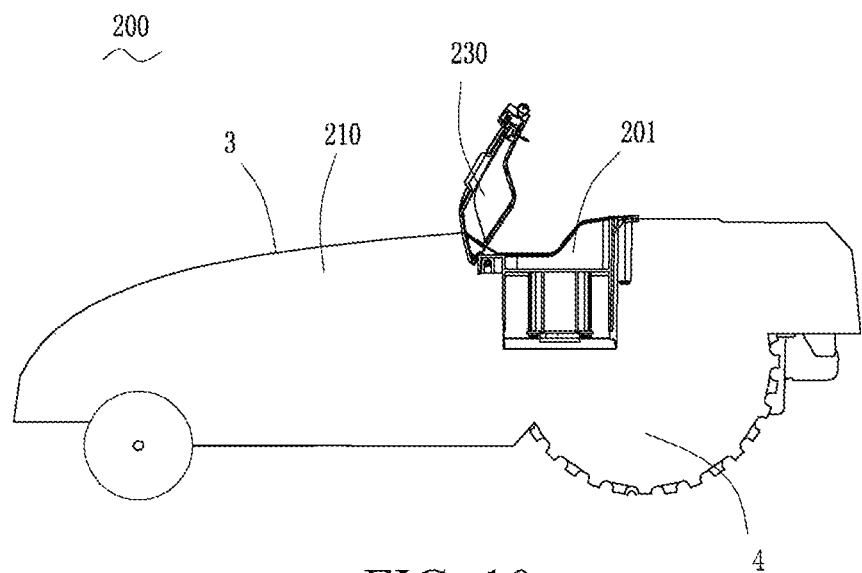
FIG. 10 is a front view of a self-moving device in which an energy module is not mounted according to an embodiment of the present invention.
Figure 11:
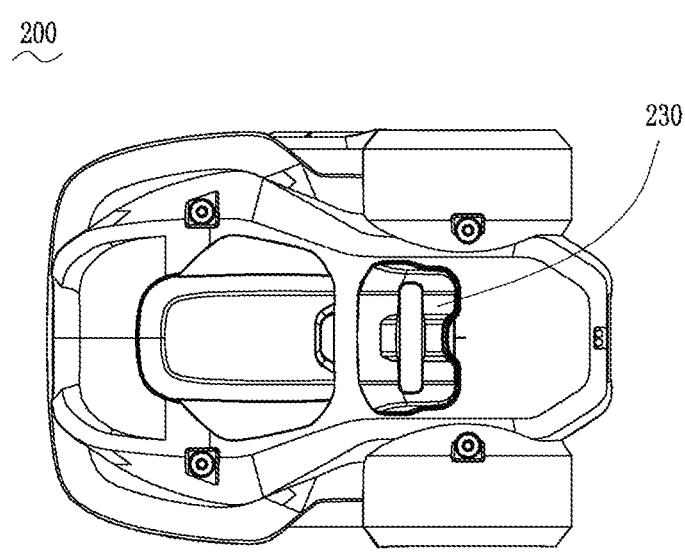
FIG. 11 is a top view of a self-moving device when an accommodating cavity is provided above a self-moving device according to an embodiment of the present invention.

In an example embodiment of the present invention, as shown in FIG. 8, the energy module 2 can provide energy for the self-moving device 1 to move and work, whereas the self-moving device 1 can be used as a charger for charging the energy module 2. The energy module 2 may be directly detached and separately taken back to the charging station for charging or another charging site such as a user's home for charging. Specifically, there may be several cases as follows in which the self-moving device 1 may be used as a charger for charging. In one case, the control module controls the self-moving device 1 to automatically return to the charging station, and the self-moving device 1 is used as a charger to charge the energy module 2. In another case, the self-moving device 1 is used as a charger. In a non-mowing period, the self-moving device 1 is used as a charger to be electrically connected to the charging station to charge the energy module 2. When the energy module 2 is fully charged, a non-fully-charged energy module in another electrical device is used to replace a fully-charged energy module in the self-moving device 1 to continue to charge the other non-fully-charged energy module. A plug and a receptacle that match each other may be disposed on the self-moving device 1 or the charging station. The plug and the receptacle match each other to enable the charging station to charge the self-moving device 1 or the like. Specifically, the energy module 2 is separately taken back to the charging station for charging or the another charging site such as the user's home for charging. There are several cases as follows. In the first case, an interface matching the energy module 2 is disposed on the charging station. The energy module 2 is directly inserted in a corresponding interface for charging. Certainly, the interface that directly charges the energy module 2 may be disposed at the another charging site such as the user's home to directly charge the energy module 2. In addition, the energy module 2 is inserted on a conventional charger 28. The conventional charger is inserted at the charging site such as the charging station or the user's home for charging. Specifically, the conventional charger 28 may be a movable charging pack charger or the like. In the foregoing case, the self-moving device 1 may automatically return to be used as a charger to charge the energy module 2 or may be directly placed nearby the charging station to be electrically connected to the charging station. The energy module 2 may be directly inserted in the charging station for charging and used as a charger to charge an energy module in the charging station or another electric device. In this way, the self-moving device 1 is directly used as a charger, so that resource optimization can be implemented, and it is not necessary to further add another adaptation structure. In another case, an interface matching the energy module 2 is directly disposed on the charging station, and an adaptation structure such as a conventional charger is also omitted. The energy module 2 is directly inserted on the charging station for charging, thereby implementing resource optimization, a simple structure, and simple operations.

Specifically, in an embodiment, a threshold is preset. When the electrical energy in the energy module 2 is less than a threshold, the control module 7 controls the self-moving device 1 to move to the stop along the boundary wire, to implement that the self-moving device 1 returns to the charging station 8 to charge the energy module 2. As the control module 7 controls the self-moving device 1 to move to the stop along the boundary wire, the self-moving device 1 is controlled to change the distance between the self-moving device 1 and the boundary wire, the self-moving device 1 is then controlled to move by at least one first preset distance in a movement direction parallel to the boundary wire, and the foregoing steps are repeated, to implement that the control module 7 controls the self-moving device 1 to return to the charging station. In other embodiments, the self-moving device 1 may return to the charging station in other manners. In other embodiments, the self-moving device 1 may preset time or another parameter. When the specified time or the specified another parameter is reached, the control module 7 controls the self-moving device 1 to automatically return to the charging station 8 for charging.

In another embodiment, when the electrical energy in the energy module 2 is less than an electrical energy threshold, the self-moving device reminds a user in a human-computer interaction manner such as light or sound. The user replaces the energy module 2 with another backup energy module and takes away the current energy module for charging. In other embodiments, the current energy module 2 is directly taken away for charging instead of being replaced. After being fully charged, the energy module 2 is then mounted on the self-moving device.

In an embodiment of the present invention, the energy module 2 on the self-moving device 1 may be used as an energy module that belongs to the self-moving device 1 to power the self-moving device 1. The energy module 2 may also be used as a movable energy platform that powers an electric tool such as a gun drill, a hammer drill, a trimmer or a hand-propelled lawnmower. Specifically, the energy module 2 may be directly completely or partially detached and used on the electric tool as the energy module of the electric tool to supply electrical energy to the electric tool.

In an example embodiment, in the self-moving device 1, after being fully charged, the energy module 2 can be directly detached and used as the energy module 2 of the electric tool 9 to power the electric tool 9. In another embodiment, the self-moving device 1 includes a plurality of energy modules 2. As the self-moving device 1 performs a mowing task, one energy module 2 powers the self-moving device 1 to keep normal working of the self-moving device 1, and another energy module 2 powers the electric tool 9. In another embodiment, the energy module 2 may separately power only the self-moving device 1. Specifically, the automatic working system includes at least one energy module 2. Each energy module 2 includes at least one battery pack 21. Each battery pack includes at least one battery group. A plurality of battery groups are adapted through series and parallel connection to adjust a battery voltage to a required voltage. In FIG. 3 to FIG. 6, for example, one energy module 2 includes one battery pack 21. Each energy module 2 may separately power the self-moving device 1 or may be separately configured to power the electric tool. In other embodiments, each energy module 2 may include a plurality of battery packs. The plurality of battery packs are combined to power the self-moving device 1, or the plurality of battery packs are combined to power the electric tool.

As shown in FIG. 3 to FIG. 6, the automatic working system 100 includes a plurality of energy modules 2. Each energy module 2 includes one battery pack. In an optimal embodiment, each battery pack has a voltage value of 20 V. That is, the automatic working system 100 includes a plurality of battery packs having a voltage value of 20 V. A voltage value such as 20 V discussed in this embodiment means that a full voltage is approximately 20 V (including a value of 20 V and a value of approximately 20 V). Different models of batteries, batteries with different specifications, differently aged batteries, and the like all have different full voltages. Therefore, in the industry, a full voltage of approximately 20 V is generally referred to as a voltage value of 20 V. For example, the full voltage of a ternary lithium battery used in an electric tool is usually 4.2 V. Generally, the ternary lithium battery usually has a nominal voltage of 3.6 V. A voltage value of such a ternary lithium battery is generally referred to as a voltage value of 4 V. The full voltage is a charging cut-off voltage in standard charge. For a cell, a nominal voltage is a nominal voltage in a cell specification. Specifically, the battery packs having a voltage value of 20 V may be formed in different manners. For example, the battery packs that are formed in different manners such as xS1P, xS2P, and xSnP are referred to as different types of battery packs. xS1P means that x (a plurality of) batteries are connected in series. For example, a 5S1P battery pack having a voltage value of 20 V includes five 4-V batteries connected in series. xS2P means that x battery assemblies are connected in series and each battery assembly includes two batteries connected in parallel. For example, a 5S2P battery pack having a voltage value of 20 V has ten batteries, where two batteries are connected in parallel to form one battery assembly and five battery assemblies are connected in series. xSnP means that x battery assemblies are connected in series and each battery assembly includes n (where n is not less than 3) batteries connected in parallel. For example, a 5SnP battery pack having a voltage value of 20 V has 5*n batteries, where n batteries are connected in parallel to form one battery assembly and five battery assemblies are connected in series. A battery in the battery pack usually contains lithium ions, magnesium ions, aluminum ions or a similar chemical substance. Specifically, the 4-V battery may be a lithium ion battery with a specification model of 18650, 21700 or the like. In a specific embodiment, any of the xS1P 20-V battery pack, the xS2P 20-V battery pack, and the xSnP 20-V battery pack may be separately configured to power the self-moving device 1 or the electric tool 9. Specifically, one battery pack of one type may be separately configured to supply power, or a plurality of battery packs of one same type may be configured together to supply power. In other embodiments, a plurality of 20-V battery packs of more than two types (including two types) may be configured together to power the self-moving device 1 or the electric tool 9. The more than two types of 20-V battery packs are any two or more types of the xS1P 20-V battery pack, the xS2P 20-V battery pack, and the xSnP 20-V battery pack. Correspondingly, each of the self-moving device 1 and the electric tool 9 is separately provided with a plurality of battery accommodating portions accommodating corresponding 20-V battery packs. The battery accommodating portion includes an accommodating cavity 101 accommodating the energy module 2 and a wall portion surrounding the accommodating cavity 101.

In the foregoing embodiments, the automatic working system 100 includes a plurality of battery packs having a voltage value of 20 V. Correspondingly, each of the self-moving device 1 and the electric tool 9 includes a plurality of (including one) accommodating cavities 101 accommodating the battery packs. Any of the xS1P 20-V battery pack, the xS2P 20-V battery pack, and the xSnP 20-V battery pack that is inserted in one accommodating cavity 101 of the self-moving device 1 or the electric tool 9 can power a corresponding self-moving device 1 or electric tool 9. A plurality of battery packs of different types that are inserted in the self-moving device 1 or the electric tool 9 can also power a corresponding self-moving device 1 or electric tool 9. Correspondingly, any 20-V battery pack that is detached from the self-moving device 1 and is inserted in any accommodating cavity of the electric tool 9 can power the electric tool 9. A plurality of 20-V battery packs of the same type or different types that are detached together and inserted in the plurality of accommodating cavities of the electric tool 9 can also power the electric tool 9.

Specifically, in an embodiment, the automatic working system 100 includes a plurality of battery packs having a voltage value of 20 V. The plurality of battery packs having a voltage value of 20 V may be connected in parallel to still implement a total output voltage of 20 V. In an embodiment, the automatic working system 100 includes two battery packs having a voltage value of 20 V. The two battery packs having a voltage value of 20 V are connected in parallel to still implement a total output voltage of 20 V.

Figure 5:
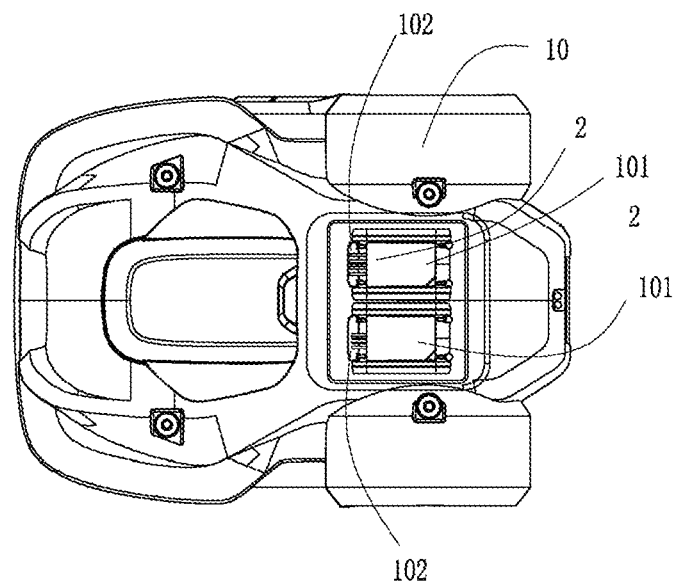
FIG. 5 is a top view of a self-moving device assembled with two energy modules according to an embodiment of the present invention.
Figure 6:
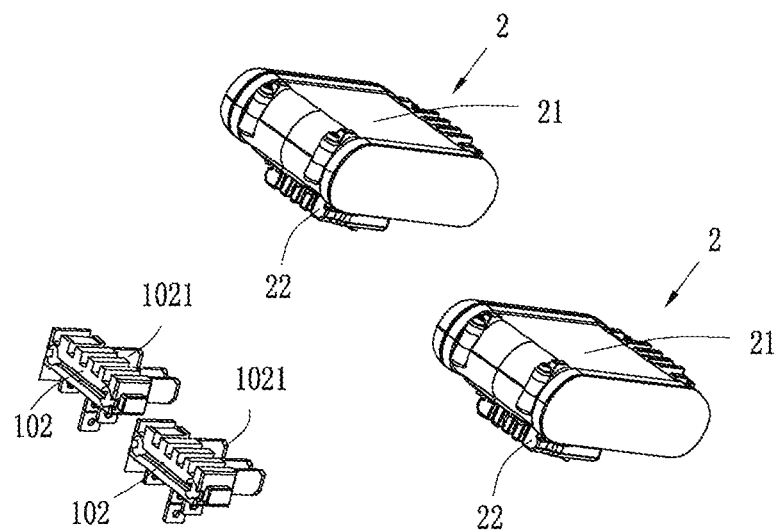
FIG. 6 is a three-dimensional view before a self-moving device connector and the energy modules in the self-moving device shown in FIG. 5 are assembled.

As shown in FIG. 3 to FIG. 6, the self-moving device 1 includes a battery accommodating portion that accommodates the energy module 2 and is provided with the accommodating cavity 101. The accommodating cavity 101 is in communication with an external space. The external space is a space outside the body. The energy module 2 is exposed from the body 10. Specifically, the body 10 is provided with at least one accommodating cavity 101 and a self-moving device connector 102 accommodated inside the accommodating cavity 101. Each energy module 2 includes at least one battery pack 21 and an energy module connector 22 docked to the self-moving device connector 102. The self-moving device connector 102 and the energy module connector 22 are fast-pluggable connectors, to implement fast insertion of the energy module 2. Specifically, when the self-moving device 1 has a plurality of energy modules 2, as shown in FIG. 5, the energy modules 2 may be accumulated and inserted in one same accommodating cavity 101. When the plurality of energy modules 2 are inserted in one same accommodating cavity 101, the structure of the accommodating cavity 101 may be adapted according to the structure of the energy module 2. For example, when each energy module 2 is one battery pack and each battery pack is provided with one energy module connector 22, a corresponding quantity of self-moving device connectors 102 is provided inside the accommodating cavity 101 to fit the energy module connector 22 of each battery pack. Specifically, the self-moving device connector 102 may be, as shown in FIG. 5 and FIG. 6, transversely disposed on a side of the accommodating cavity 101 or disposed in another position according to an actual case. As shown in FIG. 11, FIG. 13, FIG. 14, and FIG. 17, the self-moving device connector 102 is vertically disposed in the middle of the accommodating cavity 101. When there are a plurality of battery packs, a plurality of self-moving device connectors 102 are correspondingly disposed. The self-moving device connector 102 may be disposed as movable or detachable. For example, three movable self-moving device connectors 102 are disposed in the accommodating cavity 101 in advance. If three battery packs with different sizes need to be inserted in the accommodating cavity 101, the positions of corresponding self-moving device connectors 102 may be changed according to the sizes of the battery packs to enable each battery pack to be docked to each corresponding self-moving device connector 102. If only two battery packs need to be inserted in the accommodating cavity 101, one of the self-moving device connectors 102 may be detached or left vacant, and the positions of the two remaining self-moving device connectors 102 are changed for docking to corresponding battery packs. In this embodiment, the self-moving device connector 102 may be directly docked to the energy module connector 22. The electric tool 9 also includes an electric tool docking connector configured for docking to the energy module 2. The electric tool docking connector is also a fast-pluggable connector. The self-moving device connector 102 is the same as an electric tool connector, to enable the energy module 2 to be directly selectively configured to power the self-moving device 1 or the electric tool 9.

In other embodiments, the energy modules 2 may be separately arranged. The energy modules 2 are arranged in different positions of the body 10 of the self-moving device 1. The body 10 is provided with a plurality of accommodating cavities 101 corresponding to the energy modules 2. Each energy module 2 is accommodated inside a corresponding accommodating cavity 101. Specifically, when one energy module 2 has a plurality of battery packs, in an embodiment, the plurality of battery packs 21 are directly accommodated inside one same accommodating cavity 101 and are used as one entire energy module. In this case, the energy module connector 22 is disposed on the battery packs 21. In another embodiment, the energy module 2 may be provided with one carrier. The carrier is provided with a plurality of inner interfaces accommodating the battery packs and an outer interface for docking to the accommodating cavity. The plurality of battery packs are assembled in the inner interfaces of the carrier. The carrier assembled with the plurality of battery packs is used as the entire energy module and is accommodated inside the accommodating cavity. In this case, the outer interface is provided with the energy module connector for docking to the self-moving device connector. In the foregoing embodiments, a conventional wired charging technology is used to perform charging between the self-moving device 1 and the energy module 2. In other embodiments, a wireless charging technology may be used to perform charging between the self-moving device 1 and the energy module 2.

In the foregoing embodiments, the self-moving device connector in a wired charging technical solution and a charging interface corresponding to the self-moving device in the wireless charging technical solution may be generally referred to as a self-moving device power supply interface 108. The energy module connector in the wired charging technical solution and the charging interface corresponding to the energy module in the wireless charging technology may be generally referred to as energy module interfaces. In an embodiment, the self-moving device connector and the energy module connector in the wired charging technical solution are both fast-pluggable connectors, to implement fast insertion of the energy module 2 into and fast detachment of the energy module 2 from the self-moving device 1. In the foregoing embodiments, the self-moving device power supply interface 108 and an energy module interface 29 are docked in the form of a connector to complete energy transmission, or fit in the form of wireless charging to complete energy transmission, or fit in another manner to complete energy transmission. These manners can be generally referred to as that the self-moving device power supply interface 108 is electrically connected to the energy module interface 29. Correspondingly, the electric tool is also provided with an electric tool power supply interface 98. The energy module interface 29 and the electric tool power supply interface fit in the foregoing manners to complete energy transmission. These manners are also referred to as that the energy module interface 29 is electrically connected to the electric tool power supply interface. The energy module interface may be electrically connected to the electric tool power supply interface to power the electric tool. In a specific embodiment, the energy module interface 29 may be electrically connected to the electric tool power supply interface 98 by a connector. For example, the energy module interface is the energy module connector shown in FIG. 3 to FIG. 6. In an embodiment, the electric tool power supply interface is an electric tool connector that fits and is docked to the energy module connector. In other embodiments, the electric tool connector and the energy module connector may be joined by a conversion member.

In an embodiment, the self-moving device 1 includes a self-moving device power supply interface 108 that is directly docked to the energy module 2. The electric tool 9 includes an electric tool power supply interface 108 that is directly docked to the energy module 2. The self-moving device power supply interface is the same as the electric tool power supply interface, so that the energy module 2 can be directly docked to the electric tool 9 or directly docked to the self-moving device 1 without using any conversion member, to implement that the energy module 2 can be directly selectively configured to power the self-moving device 1 or the electric tool 9. As shown in FIG. 3 to FIG. 6, the self-moving device connector 102 includes a plurality of first terminals 1021 disposed inside the accommodating cavity 101. The energy module connector 22 includes a plurality of second terminals (not shown) assembled on the battery pack 21. In the embodiments shown in FIG. 3 and FIG. 6, the self-moving device connector 102 and the energy module connector 22 are docking connectors of each other and fit each other for docking. The first terminals 1021 are docked to the second terminals to complete an electrical connection.

Figure 7:
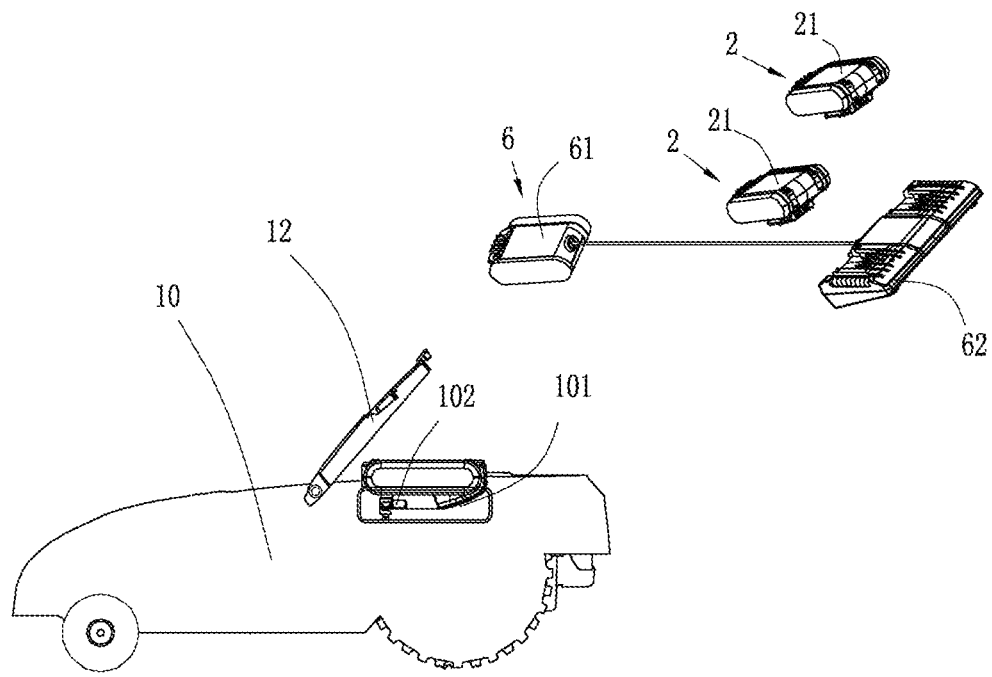
FIG. 7 is a three-dimensional view when a self-moving device, an interface adapter, and an energy module are not assembled according to an embodiment of the present invention.

Certainly, in other embodiments, the self-moving device power supply interface 108 may be different from the electric tool power supply interface, but instead a conversion member is used for conversion, to implement that the energy module is selectively configured to power the self-moving device or the electric tool. For example, as shown in FIG. 7, the self-moving device connector 102 may be electrically connected to the energy module connector 22 by an interface adapter 6. Specifically, the automatic working system further includes at least one interface adapter 6. The interface adapter 6 includes at least two groups of conversion interfaces. A group of conversion interfaces 61 are docked to at least one self-moving device connector 102, and another group of conversion interfaces 62 are docked to at least one energy module connector 22. The conversion interface 62 docked to the energy module connector 22 is the same as the electric tool power supply interface, to implement that the energy module can be selectively configured to power the self-moving device 1 or the electric tool 9 by means of the conversion of a conversion interface. The interface adapter is not limited to the interface adapter with a cable shown in FIG. 7, and may be another type of interface adapter. The interface adapter may have no cable, provided that two groups of conversion interfaces are provided. The interface adapter may be a converter for various types of battery packs, and different batteries can be plugged when different converters are mounted. In the embodiment shown in FIG. 7, the interface adapter 6 and the energy module 2 may be generally referred to as new energy modules. The conversion interface 61, electrically connected to the self-moving device connector 102, of the interface adapter 6 may be referred to as a new energy module connector.

Figure 2:
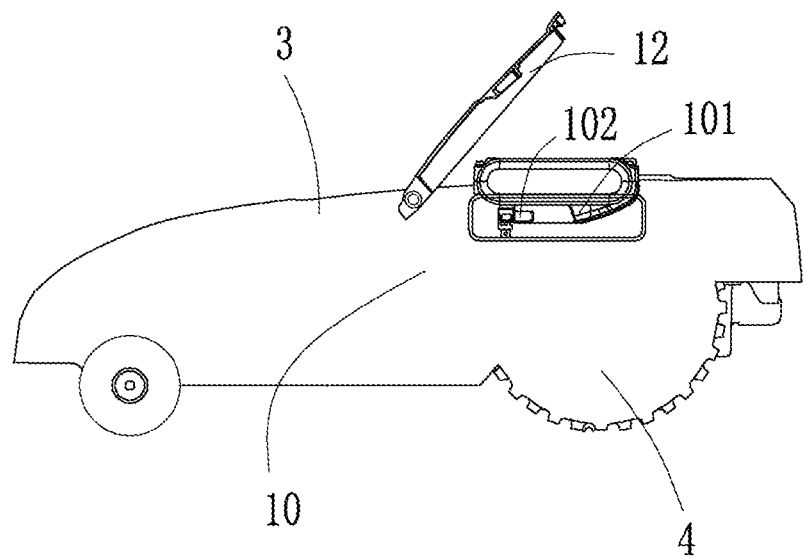
FIG. 2 is a front view of a self-moving device having an accommodating cavity according to an embodiment of the present invention.
Figure 3:
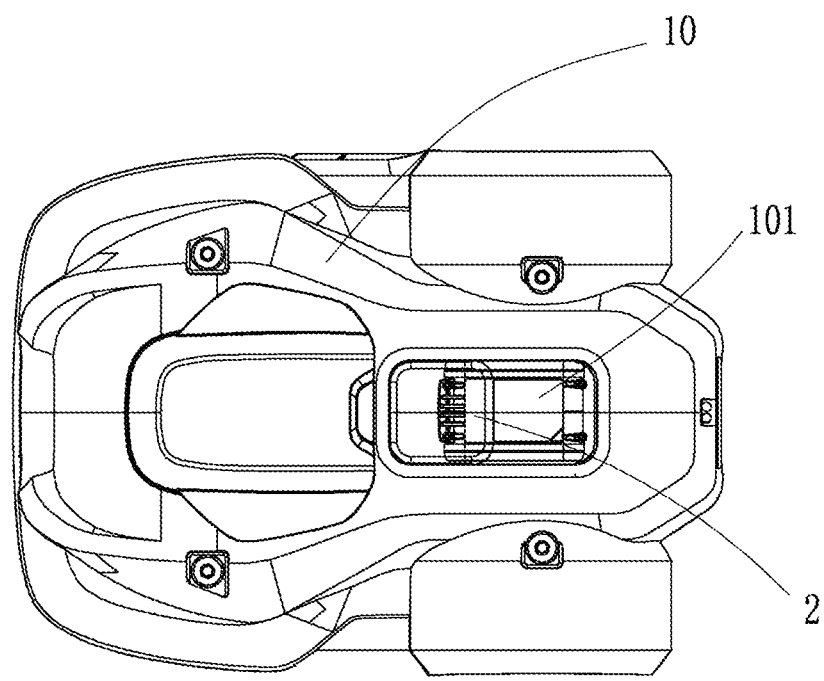
FIG. 3 is a top view when the self-moving device shown in FIG. 2 is assembled with an energy module.
Figure 4:
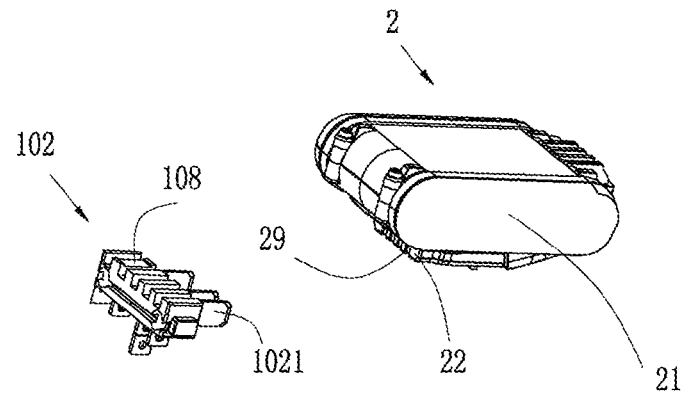
FIG. 4 is a three-dimensional view before a self-moving device connector and the energy module in the self-moving device shown in FIG. 3 are assembled.

In an embodiment, as shown in FIG. 1, FIG. 2, and FIG. 7, the self-moving device 1 further includes a protection apparatus 12 disposed on the body 10 and wrapping the energy module 2. The protection apparatus 12 is mainly configured for a water-proof purpose, a moist-proof purpose, a sun-proof purpose, and the like. In other embodiments, alternatively, the protection apparatus 12 may be configured for only one or more of the water-proof purpose, the moist-proof purpose, the sun-proof purpose, and the like. For example, the protection apparatus 12 may be only a rain-proof cover to prevent rainwater from reaching the energy module 2, the self-moving device connector 102 on the accommodating cavity 101 or other circuits to cause circuit damage.

Specifically, in an embodiment, the protection apparatus 12 may be assembled on the body 10. Only one end of the protection apparatus 12 may be fastened to the body 10, and the other end is not fastened. In another embodiment, both ends of the protection apparatus 12 may be fastened. For fastening manners, one end of the protection apparatus 12 is nondetachably fastened, and the other end of the protection apparatus 12 is detachably fastened, or both ends of the protection apparatus 12 are detachably fastened. "Detachable fastening" means that the protection apparatus 12 can be detached from the body 10 without a damaging act and without needing to detach a fastener such as a screw, and after being detached, the protection apparatus 12 can be fastened to the body 10 again. For example, a buckle is used. In contrast, "nondetachable fastening" means that the protection apparatus 12 can be detached from the body 10 only by using a damaging act or detaching a fastener such as a screw. For example, a nondetachable rotating shaft is used for fastening. In another embodiment, both ends of the protection apparatus 12 may be fastened, and both ends of the protection apparatus 12 are nondetachably fastened to the body 10. Specifically, the protection apparatus 12 and the body 10 define one accommodating cavity. The energy module 2 is completely accommodated inside the accommodating cavity to implement protection. One inlet for the energy module 2 to pass through may be kept nearby the accommodating cavity to pull out or mount the energy module 2. Certainly, in other embodiments, both ends of the protection apparatus 12 may be disposed on the body 10 in an unfastened manner, provided that the protection apparatus 12 can protect the accommodating cavity 101 and electrical components therein and the energy module 2.

In the foregoing embodiments, the energy module 2 and the protection apparatus 12 wrapping the energy module 2 may be disposed in different positions of the body 10 according to an actual cases. For example, the energy module 2 and the protection apparatus 12 are disposed below the body 10 to reduce environmental impact from rain, sunlight, and the like, or are disposed above the body 10 to make it convenient to mount and remove the energy module, or are disposed behind, in front of or on a side of the body 10 to reduce exposure to rain and sunlight and facilitate mounting and removal. Certainly, the effects corresponding to different positions of the energy module 2 and the protection apparatus 12 are analyzed according to specific scenarios and cases. Only examples are provided in the foregoing.

In an example embodiment, the automatic working system 100 further includes a charging and discharging management module 104 configured to manage related parameters during charging or discharging of the energy module. The charging and discharging management module 104 controls, according to a charging or discharging environment, whether to charge or discharge the energy module, and adjusts parameters such as a current and a voltage of charging or discharging in real time, to prevent a charging temperature from becoming excessively high or prevent excessive charge, excessive discharge, and the like of a battery, thereby protecting the battery or another related object from damage. The charging and discharging management module 104 may be separately disposed in the self-moving device 1 or may be separately disposed in the energy module 2 or may be integrated in the control module as some functions of the control module 7 or may be disposed at another position or implemented in another form according to an actual case.

In a specific embodiment, the automatic working system 100 further includes a voltage conversion module 105 configured to adjust a charging or discharging voltage of the energy module to adjust an input or output voltage of the energy module 2 to a corresponding standard voltage. Specifically, when the energy module 2 is charged or discharged, the voltage conversion module 105 adjusts charging or discharging voltages according to an actual case. During discharge of the energy module, the voltage conversion module 105 may recognize a pre-output voltage of the energy module 2, and convert the voltage into a working voltage required for the self-moving device or electric tool. During charge of the energy module 2, the voltage conversion module 105 may recognize a voltage of a preconnected energy module 2 and convert the voltage into a charging voltage of the energy module, to store electrical energy in the energy module. The working voltage and the charging voltage are generally referred to as a corresponding standard voltage. For example, the charging voltage of the energy module 2 is a high voltage, and the charging station uses a low voltage to charge the energy module 2 or directly charge the energy module 2 by using the self-moving device 1. The voltage conversion module 105 converts the low voltage into the high voltage in a boosting manner to charge the energy module 2. The voltage conversion module 105 may be separately disposed in the self-moving device 1 or may be separately disposed in the energy module 2 or may be integrated in the control module 7 as some functions of the control module 7 or may be disposed in another position or in another form according to an actual case.

In this embodiment, because the self-moving device 1 is in an outdoor working environment and is prone to theft, the energy module 2 is usually fixedly disposed below the self-moving device 1. However, in this embodiment, the energy module 2 is selectively configured to power another electric tool 9. If the energy module 2 is fixedly disposed below the self-moving device 1, it is inconvenient for a user to rapidly fetch and mount the energy module 2, resulting in degraded user experience. Therefore, it is necessary to design an automatic working system that can make it convenient for the user to rapidly fetch and mount the energy module 2 and can prevent the energy module 2 or the self-moving device 1 from being stolen.

To achieve an adequate anti-theft effect, the battery accommodating portion of the self-moving device 1, the position of a protection apparatus thereof, and a specific structure thereof may be set according to a specific case. For example, in a specific embodiment, FIG. 10 to FIG. 15 show a self-moving device 200 powered by the energy module 2. The energy module 2 is selectively configured to power the self-moving device 200 or electric tool. The self-moving device 200 includes a charging system. The charging system is configured to store external electrical energy in the energy module 2. In this embodiment, the electric tool is an electric tool other than the self-moving device 200. The energy module 2 is a quick-plug battery pack used by a conventional electric tool, preferably, a battery pack with a voltage value of 20 V. In this embodiment, the energy module 2 is selectively configured to power the self-moving device 200 or electric tool. In other embodiments, the electric tool 9 may be replaced with another electric device, for example, a home appliance. The electric device is an electric device other than the self-moving device. The electric tool 9, the home appliance, and the like may be generally referred to as electric devices. The self-moving device 200 includes a body 210. A battery interface 201 docked to the energy module 2 is disposed on the body 210. The energy module 2 is detachably assembled in the battery interface 201. "Detachable" means that the energy module 2 may be directly detached without needing to detach a fastener such as a screw, a nut or a pin. As shown in FIG. 9 to FIG. 15, the self-moving device 200 includes a housing 3, a movement module 4, a cutting module 5, and a control module 7. The movement module 4, the cutting module 5, and the control module 7 are all mounted on the housing 3 to form the body 210. The movement module 4 drives the self-moving device 200 to move in a working area, and the cutting module 5 performs a mowing task. The control module 7 is electrically connected to the movement module 4, the cutting module 5, the energy module 2, and the like, controls the movement module 4 to drive the self-moving device 1 to move, and controls the cutting module 5 to perform a mowing task.

Figure 12:
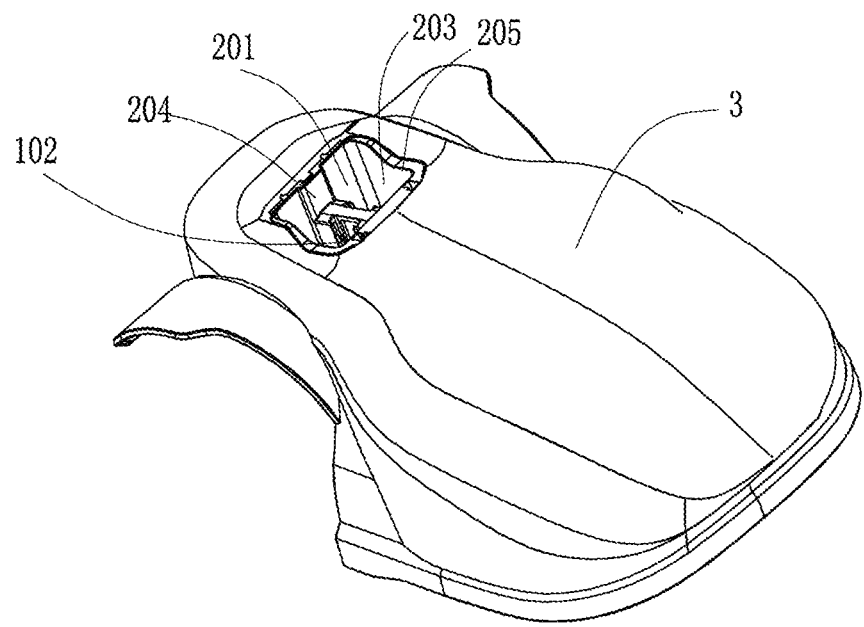
FIG. 12 is a schematic diagram of a housing of the self-moving device shown in FIG. 10.
Figure 13:
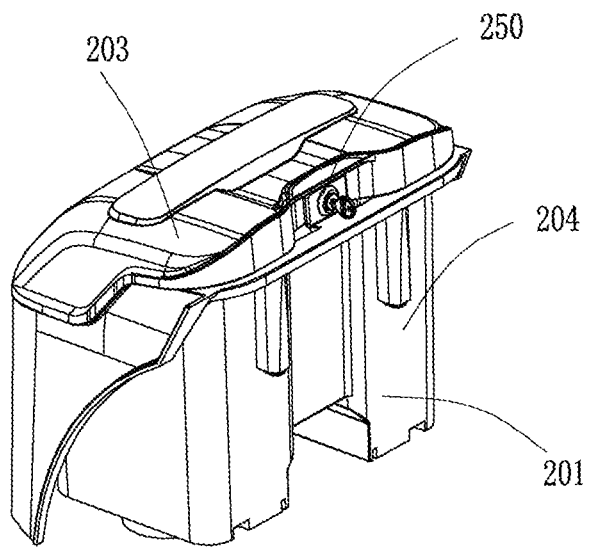
FIG. 13 is a three-dimensional view of a battery accommodating portion according to an embodiment of the present invention.
Figure 14:
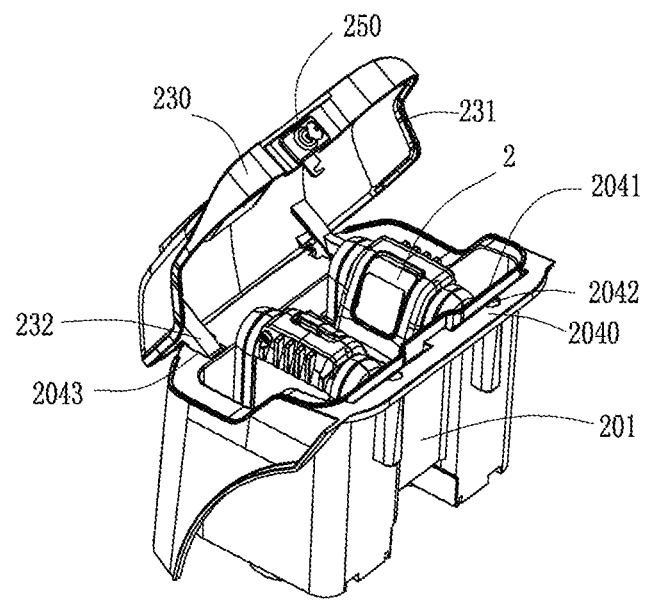
FIG. 14 is a three-dimensional view when a protective cover shown in FIG. 13 is open.
Figure 15:
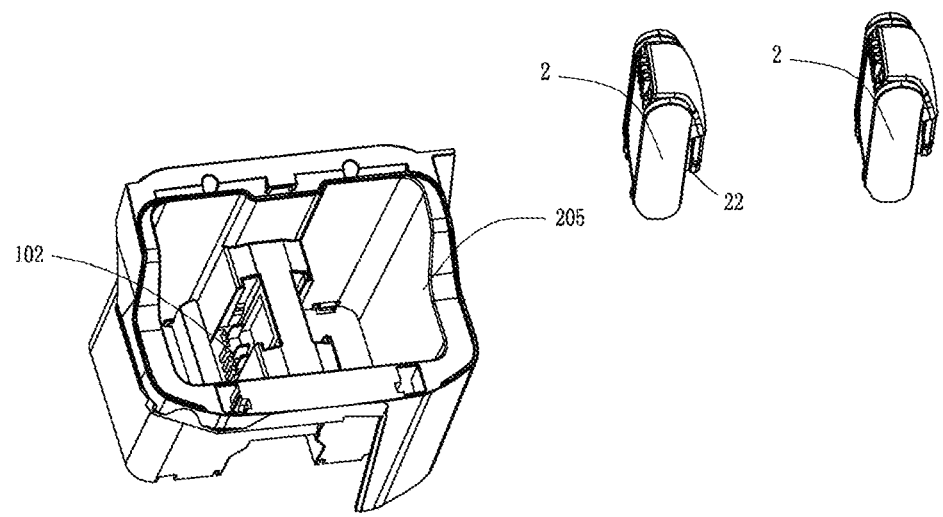
FIG. 15 is a three-dimensional view when an accommodating cavity shown in FIG. 14 and an energy module are not assembled.

As shown in FIG. 10 to FIG. 15, the self-moving device 200 further includes a protection apparatus blocking the battery interface 201. In this embodiment, the protection apparatus is a protective cover 230 assembled on the body 210. In other embodiments, the protection apparatus may be alternatively a part of the body 210. Specifically, the protection apparatus may be a part of the housing 3. The protection apparatus is directly formed by partially extending outwardly from the housing 3. The protection apparatus blocks the battery interface 201 to prevent rainwater from wetting the interior of the battery interface 201 or the interior of the battery interface 201 from being exposed to intense sunlight. As shown in FIG. 10 to FIG. 15, in this embodiment, the battery interface 201 includes an accommodating cavity 203 accommodating the energy module 2, a wall portion 204 surrounding the accommodating cavity 203, and a first connector 102 accommodated in the accommodating cavity 203 and docked to the energy module 2. A second connector 22 docked to the first connector 102 is disposed on the energy module 2. The accommodating cavity 203 includes an inlet 205 is in communication with the outside. The protective cover 230 may be opened and assembled on the body 210. When the protective cover 230 is not opened (closed), the protective cover 230 blocks the inlet 205 to prevent rain or sunlight from damaging a circuit or the energy module 2 in the interior of the accommodating cavity 203. In this embodiment, the protective cover 230 completely covers the inlet. In an optimal embodiment, a seal ring may be disposed at a joint between the protective cover 230 and the wall portion 204 to enhance a sealing effect, thereby improving water-proof performance. As shown in FIG. 14, in this embodiment, an upper end surface 2040 of the wall portion 204 partially protrudes upward to form a waterproof boss 2041. The upper end surface 2040 of the wall portion 204 is partially concave downward to form a water-guide groove 2042. Upper and lower ends of the water-guide groove 2042 are separately in communication with the outside. A seal ring 231 is disposed at a position between the protective cover 230 and the waterproof boss 2041. The seal ring 231 fits the waterproof boss 2041 to implement sealing at the joint. When the upper and lower ends of the water-guide groove 2042 are separately in communication with the outside, it means that two ends of the water-guide groove 2042 are both in communication with the outside of the self-moving device to make it convenient to guide out water. The communication between the two ends of the water-guide groove 2042 and the outside includes direct communication with the outside and indirect communication with the outside. The indirect communication with the outside means that the water-guide groove 2042 is not in direct communication with the outside, but instead is in communication with the outside through a third party to guide water out of the self-moving device 200. For example, the water-guide groove 2042 is in communication with a water-guide system (not shown) of the self-moving device 200, guides water in the water-guide groove 2042 into the water-guide system, and then guides water outside the self-moving device 200 by using the water-guide system. When water drops fall on the upper end surface 2040 of the wall portion 204, in an aspect, the waterproof boss 2041 blocks water, to prevent water from flowing into the accommodating cavity 203. In another aspect, water flows outside through the water-guide groove 2042, to guide out water in time, to avoid water accumulation on the upper end surface 2040 of the wall portion 204. As shown in FIG. 12, in this embodiment, the wall portion 204 is a part of the body 210. Specifically, the wall portion 204 is a part of the housing 3. The housing 3 is partially concave inwardly to form the wall portion 204. The protective cover 230 is assembled on the housing 3. In other embodiments, the wall portion 204 may be separately formed and is then assembled in the body. The protective cover 230 is assembled on the body having the wall portion 204. Alternatively, the protective cover 230 and the wall portion 204 may be first assembled to form a battery box with a cover, and the battery box is then assembled in the body. FIG. 13 is a three-dimensional enlarged view of the battery interface 201 assembled with the protective cover 230 in the self-moving device 200. In this embodiment, the protective cover 230 includes a positioning portion 232 that is assembled with the wall portion 204. A positioning hole 2043 limiting the positioning portion 232 is provided in the wall portion 204. The positioning portion 232 is accommodated in the positioning hole 2043 and is rotatable inside the positioning hole 2043 to enable the protective cover 230 to be opened or closed. Specifically, in this embodiment, left and right end surfaces of the positioning portion 232 protrude outwardly to form a rotating shaft. The rotating shaft is inserted in the positioning hole 2043 to rotate to implement opening and closing of the protective cover 230. In other embodiments, the specific structure of the positioning portion 232 and the positioning hole 2043 is not limited to the foregoing manner and may be determined according to an actual case.

Figure 16:
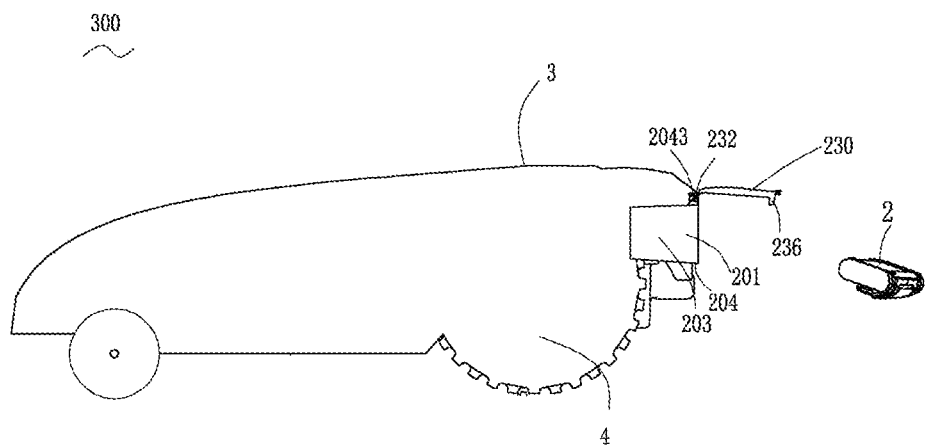
FIG. 16 is a front view of a self-moving device when an accommodating cavity is disposed behind the self-moving device according to an embodiment of the present invention.
Figure 17:
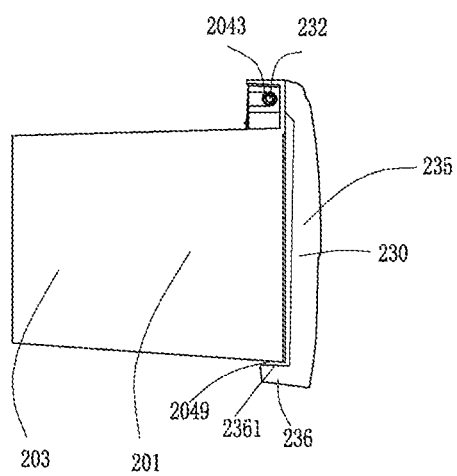
FIG. 17 is a front view of a battery accommodating portion in FIG. 16.

In this embodiment, the self-moving device 200 further includes a locking apparatus 250. The locking apparatus 250 is configured to lock the energy module 2 in the self-moving device 200. In this embodiment, the locking apparatus 250 locks the protective cover 230 and the body 210 to prevent the protective cover 230 from being opened, thereby preventing the energy module 2 from being stolen. In other embodiments, the locking apparatus 250 may directly lock the energy module 2 and the self-moving device 200 or lock the energy module 2 in the self-moving device 200 in another manner. The locking apparatus 250 may be a mechanical lock or an electrical lock. The electrical lock includes a password lock, a smart lock using image recognition, fingerprint recognition, voice recognition, iris recognition or the like. In this embodiment, the protective cover 230 is locked at the wall portion 204. The locking apparatus 250 is disposed at an end opposite the positioning portion 232. In other embodiments, the protective cover 230 may be locked in another position of the body 210. In this embodiment, the battery interface 201 is disposed above the body 210. The energy module 2 is inserted in the battery interface 201 in a vertical direction. In another embodiment, as shown in FIG. 16 and FIG. 17, a battery interface 201 of a self-moving device 300 is disposed behind the body 210. The energy module 2 is inserted in the battery interface 201 from rear to front. The protective cover 230 is assembled behind the body 210 and covers the inlet 205 of the battery interface 201. In another embodiment, the battery interface 201 may be disposed in another position of the body 210, for example, disposed below or in front of the body 210.

In the embodiments shown in FIG. 16 and FIG. 17, the battery interface 201 of the self-moving device 300 is disposed behind the body 210. The energy module 2 is inserted in the battery interface 201 from rear to front. The protective cover 230 is assembled behind the body 210 and covers the inlet 205 of the battery interface 201. As shown in FIG. 17, the protective cover 230 includes a main cover board 235 that seals the inlet 205, a positioning portion 232 located on one side of the main cover board 235 and fastened to the body 210, and a stop wall 236 located on the other side of the main cover board 235 and formed extending from an edge of the main cover board 235. The body 210 is provided with a positioning hole 2043 accommodating the positioning portion 232. The positioning portion 232 is accommodated inside the positioning hole 2043 to rotate to implement opening or closing of the protective cover 230. An edge of the stop wall 236 protrudes from an edge of the wall portion 204, to prevent water from flowing into the accommodating cavity. In an optimal embodiment, as shown in FIG. 17, the stop wall 236 extends inward (in a direction from the protective cover 230 to the inlet 205) from an edge of the main cover board 205. An inner wall 2361 of the stop wall 236 is located outside an outer wall 2049 of the wall portion 204. Preferably, the inner wall 2361 of the stop wall 236 wraps the outer wall 2049 of the wall portion 204 to seal the inlet 205, thereby preventing water from flowing into the accommodating cavity 203. In other embodiments, the protective cover 230 may be designed into another structure to block the inlet of the battery interface 201 or wrap the energy module 2 to implement a water-proof purpose, a moist-proof purpose, a sun-proof purpose or the like of the energy module 2 and a corresponding circuit.

Figure 18:
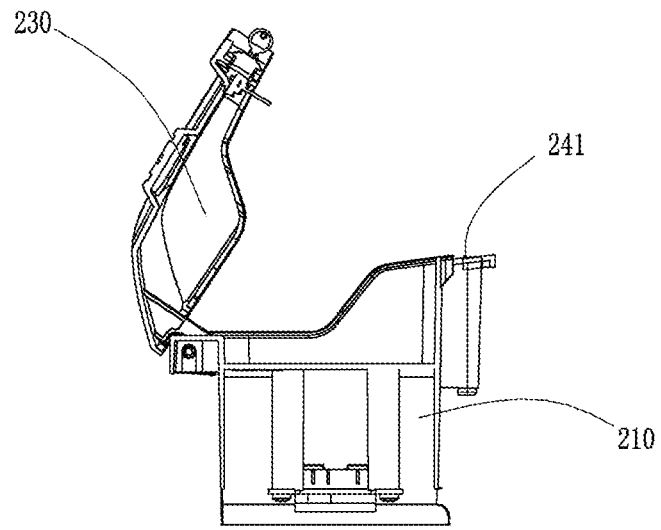
FIG. 18 is a front view of a battery accommodating portion when a protective cover is opened according to an embodiment of the present invention.
Figure 19:
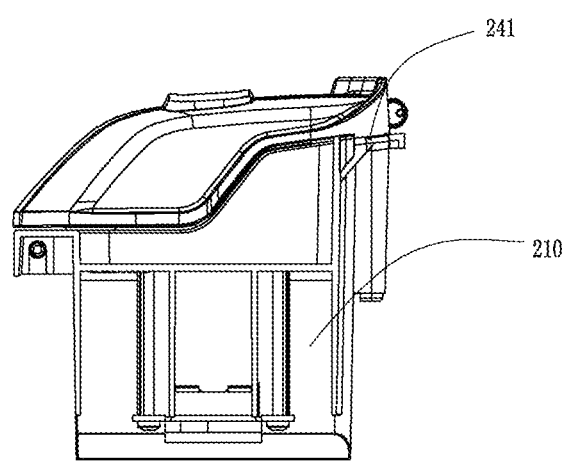
FIG. 19 is a front view of the battery accommodating portion when the protective cover shown in FIG. 18 is closed.
Figure 21:
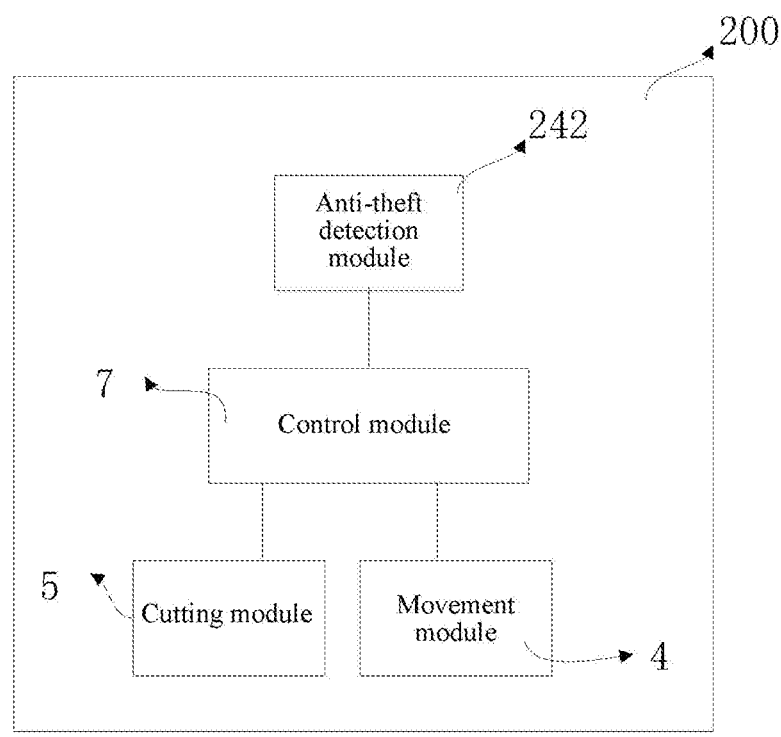
FIG. 21 is a schematic modular diagram of a self-moving device according to an embodiment of the present invention.

As shown in FIG. 18, FIG. 19, and FIG. 21, in an example embodiment, the self-moving device 1 further includes an anti-theft detection module 242 and a corresponding anti-theft control structure. FIG. 21 is a schematic modular diagram of the self-moving device 200 according to a specific embodiment. Specifically, the self-moving device 200 includes an anti-theft detection module 242 configured to detect whether the energy module 2 is abnormally unplugged, a control module 7, and an anti-theft system configured to prevent the energy module 2 from being stolen.

As shown in FIG. 21, in an embodiment, the self-moving device 200 further includes a locking apparatus 250 in the foregoing embodiments. The locking apparatus 250 includes a password lock, an electronic lock, and the like. The self-moving device 200 further includes an anti-theft detection module 242, a control module 7, and an anti-theft system. The anti-theft detection module 242 is configured to detect whether the energy module 2 is abnormally unplugged and obtain a detection result. The control module 7 controls, according to the detection result, whether the anti-theft system is turned on. Specifically, if the detection result is that the energy module 2 is abnormally unplugged, the anti-theft system is controlled to be turned on. When the energy module 2 is abnormally unplugged, it means that the energy module 2 is forcefully unplugged by a brute force such as impact and knock without unlocking the locking apparatus 250. The anti-theft detection module 242 may directly detect whether there is an act such as external impact to determine whether the energy module 2 is abnormally unplugged or may detect whether the locking apparatus is unlocked to determine whether the energy module 2 is abnormally unplugged. Certainly, it may be determined, according to an actual case in another manner, whether the energy module 2 is abnormally unplugged. In an embodiment, the anti-theft system includes a coordinate positioning module for positioning the energy module 2, for example, a Global Positioning System (GPS) positioning module. The coordinate positioning module can determine position coordinates of the energy module 2 in real time to detect a specific geographical position of the energy module. When the anti-theft detection module 242 detects that the energy module 2 is abnormally unplugged, the coordinate positioning module locates the energy module 2, and transmits position information to a user in a manner such as wireless communication. Specifically, the coordinate positioning module may be connected to a network such as a router, the Internet, and a cloud and a device thereof through wireless communication to be connected to a mobile phone or another intelligent mobile device. When detecting that the energy module 2 is abnormally unplugged, the anti-theft detection module 242 sends position information to a mobile phone or another intelligent mobile device through wireless communication. Certainly, in this embodiment, the anti-theft system may be kept on and keeps sending current position information of the energy module 2 to the user, to make it convenient for the user to learn about a specific position of the energy module 2 or learn about a specific position of the self-moving device 200 according to a specific position of the energy module 2. In another embodiment, a working range may be preset. When position coordinates of the energy module 2 are beyond a preset range, it is determined that the energy module 2 is stolen, and immediately an alarm is raised or information is sent to the user in a manner such as wireless communication.

In another embodiment, the self-moving device 200 includes an anti-theft detection module 242, a control module 7, and an anti-theft system. The anti-theft detection module 242 is configured to detect related information of the energy module 2 and obtain a detection result. The control module 7 controls, according to the detection result, whether the anti-theft system is turned on. Specifically, in a specific embodiment, the anti-theft detection module 242 includes a signal transmitter disposed on the self-moving device 200 and a signal receiver disposed in the energy module 2. A signal strength range is preset. If signal strength received by the signal receiver is less than the preset signal strength range, the control module controls the anti-theft system to be turned on. In another specific embodiment, the anti-theft detection module 242 includes a coordinate positioning module, for example, a GPS positioning module, configured to position the energy module 2 and acquire the position information of the energy module 2. A safe position range is preset. When the position of the energy module 2 acquired by the coordinate positioning module is beyond the safe position range, the control module 7 controls the anti-theft system to be turned on. In an embodiment, the anti-theft system includes a terminal device such as a mobile phone or a computer that can be connected to the coordinate positioning module through wireless communication. When the anti-theft system is turned on, the coordinate positioning module sends the position information of the energy module 2 to the terminal device. A user may find the energy module 2 according to the position information sent by the coordinate positioning module.

In another embodiment, the anti-theft system is an alarm apparatus. When the anti-theft system is turned on, it means that when the anti-theft detection module 242 detects that the energy module 2 is abnormally unplugged, the control module 7 controls the alarm apparatus to raise an alarm. An alarm manner may be light, sound or the like. Alternatively, alarm information or the like may be automatically sent to a terminal device such as a user's mobile phone or another movable device. In another embodiment, the anti-theft system includes a management system for managing whether the energy module sleeps. When the anti-theft system is turned on, it means that when the anti-theft detection module 242 detects that the energy module 2 is abnormally unplugged, the management system manages the sleep of the energy module 2. When the energy module 2 sleeps, it means that the energy module 2 is locked and enters a fake-death state. Even if the energy module 2 is stolen, the energy module 2 cannot continue to work and can be used only after reactivation by the user.

Figure 20:
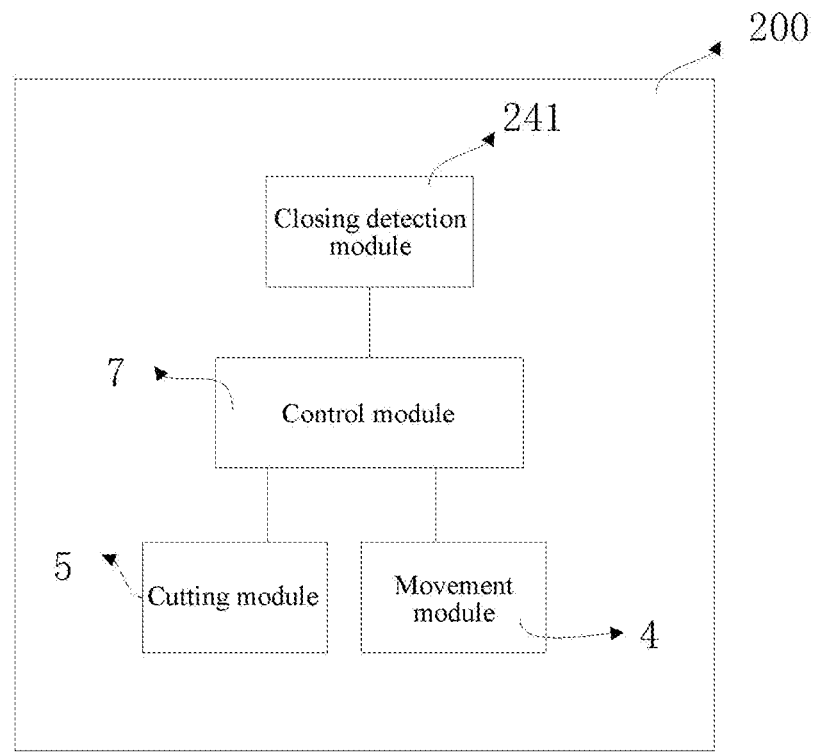
FIG. 20 is a schematic modular diagram of a self-moving device according to an embodiment of the present invention.

As shown in FIG. 18 to FIG. 20, in an embodiment, the self-moving device 200 includes a movement module 4, a cutting module 5, a closing detection module 241, and a control module 7. The closing detection module 241 is configured to detect whether the protective cover 230 and the body 210 are successfully closed to obtain a detection result. The control module 7 controls a working status of the self-moving device 200 according to the detection result of the closing detection module 241. Specifically, if the detection result of the closing detection module 241 is that the protective cover 230 and the body 210 are successfully closed, the self-moving device 200 is controlled to be electrified. If the detection result of the closing detection module 241 is that the protective cover 230 and the body 210 are successfully closed, the self-moving device 200 is controlled to be not electrified. In a specific embodiment, the closing detection module 241 may be disposed at a position in which the protective cover 230 is docked to the body 210. When the protective cover 230 is closed, the closing detection module 241 uses a mechanical touch manner, a sensor detection manner, a capacitor detection manner or the like to detect whether the protective cover 230 is successfully closed. The closing detection module 241 is only an implementation of the present invention, in other embodiments, according to an actual case, the closing detection module 241 may be disposed in another position or a different detection manner may be used for the closing detection module 241.

In an embodiment of the present invention, as shown in FIG. 22 to FIG. 28, a difference between this embodiment and the foregoing embodiments only lies in that a battery accommodating portion 101 of the self-moving device 200 has a different structure.

Figure 22:
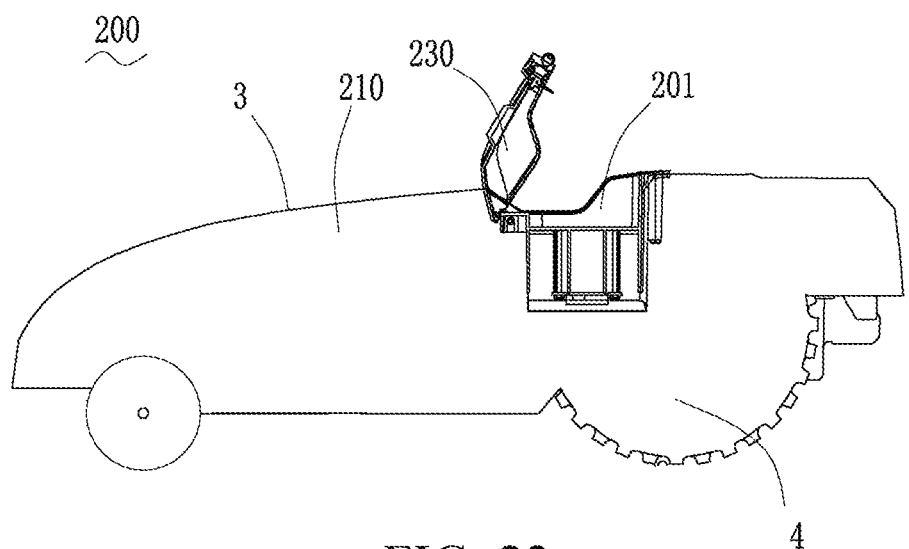
FIG. 22 is a front view of a self-moving device according to an embodiment of the present invention.

As shown in FIG. 22, the self-moving device 200 powered by the energy module 2, the energy module 2 is selectively configured to power the self-moving device 200 or electric tool. The self-moving device 200 includes a charging system. The charging system is configured to store external electrical energy in the energy module 2. The self-moving device 200 includes the body 210. The battery accommodating portion 101 docked to the energy module 2 is disposed on the body 210. The energy module 2 is detachably assembled in the battery accommodating portion 101.

In this embodiment, the self-moving device 200 is an autonomous lawnmower. In other embodiments, the self-moving device may be alternatively an automatic leaf blower, an automatic water sprinkler, a multifunctional machine, a robot cleaner or the like. The electric tool is an electric tool other than the self-moving device 200, and is, for example, a gun drill, a hammer drill, a trimmer or a hand-propelled lawnmower that is powered by a detachable battery pack. The energy module 2 is a quick-plug battery pack used in a conventional electric tool, preferably, a battery pack with a voltage value of 20 V. In this embodiment, the energy module 2 is selectively configured to power the self-moving device 1 or the electric tool. In other embodiments, the electric tool 9 may be alternatively another electrical device such as a home appliance. The electric device is an electric device other than the self-moving device. The electric tool 9, the home appliance, and the like may be generally referred to as electric devices.

Figure 23:
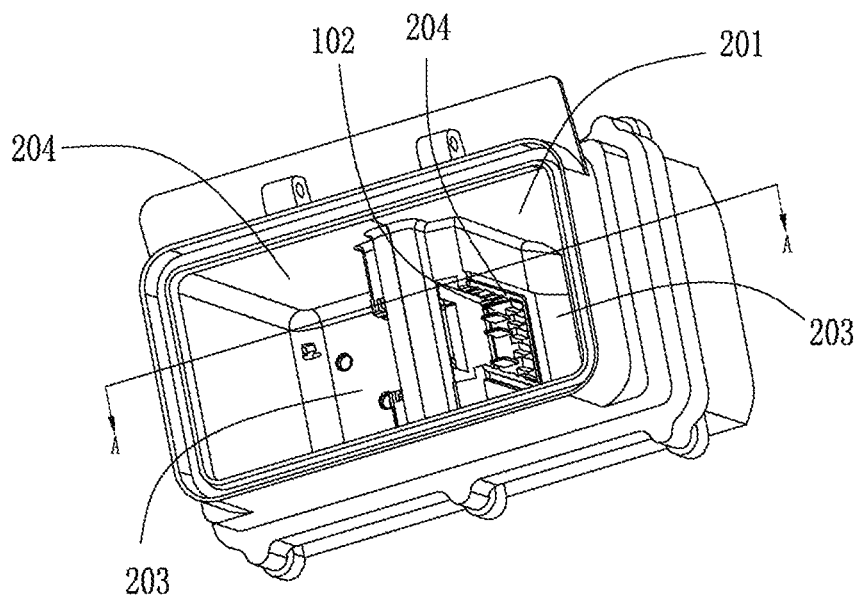
FIG. 23 is a three-dimensional view of a battery accommodating portion with a protective cover removed of the self-moving device shown in FIG. 22.

FIG. 23 is a schematic structural diagram of the battery accommodating portion 101 of the self-moving device 200 according to an embodiment of the present invention. As shown in FIG. 23, the self-moving device 200 includes a battery accommodating portion 101 configured to accommodate the energy module 2. The battery accommodating portion 101 includes an accommodating cavity 203 for accommodating the energy module 2, a wall portion 204 surrounding the accommodating cavity 203, and a connector 102 accommodated in the accommodating cavity 203 and docked to the energy module 2. A docking connector 22 docked to the first connector 102 is disposed on the energy module 2. In this embodiment, the energy module 2 is a conventional quick-plug battery pack used by the electric tool, and preferably, a battery pack with a voltage value of 20 V.

Figure 24:
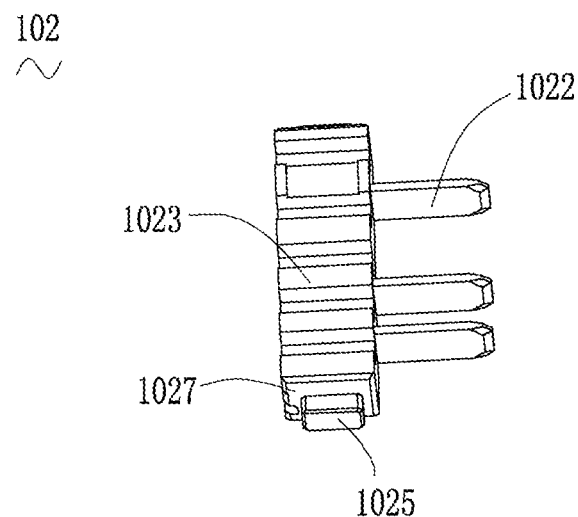
FIG. 24 is a three-dimensional view of a connector in the self-moving device shown in FIG. 23.

As shown in FIG. 24, the connector 102 includes a plurality of terminals 1022 assembled in the battery accommodating portion 101 and a body 1023 connected to the terminals 1022. The body 1023 is made of an insulating material. The docking connector 22 includes a plurality of docking terminals (not shown) assembled on the battery pack 21. The connector 102 and the docking connector 22 are mutual docking connectors, and fit each other and are docked, and the terminal 1022 is docked to the docking terminals to complete electrical connection. One end of the terminal 1022 protrudes from the body 1023 to be docked to the docking terminals, and the other end protrudes from the body 1023 to be connected to a control circuit of the self-moving device 200, so as to transfer electrical energy in a battery to the self-moving device 200.

The terminal 1022 is a common electrical conductor, including, but is not limited to, a metal conductor such as copper, iron, aluminum or silver. The shape of the terminal 1022 matches that of the docking terminals to perform insertion type electrical connection. The shape of the terminal 1022 may be a sheet-shaped, rod-shaped or similar plug-type protrusion. A corresponding docking terminal is disposed in a concave groove to form a receptacle. The terminal 1022 may be disposed in the concave groove to form the receptacle, and a corresponding docking terminal is disposed as a plug-type protrusion. The terminal 1022 may be a two-phase or three-phase plug or a multi-phase plug.

In this embodiment, the terminal 1022 is movable relative to the body 210, so that when the terminal 1022 is electrically connected to the docking terminal, the terminal 1022 is movable along with the docking terminal. It needs to be understood that the self-moving device 200 usually bumps over and shakes during movement, and the machine intensely sways during working, resulting in shaking of a battery pack. The battery pack makes a relative displacement relative to the body 210. In the conventional self-moving device 200, a plug terminal with a lead is disposed on the battery pack, and is docked to a receptacle terminal on the self-moving device 200 to implement an electrical connection. When the battery pack makes a relative displacement relative to the body 210, with the presence of the lead, the plug terminal and the receptacle terminal do not move relatively. In an embodiment of the present invention, the self-moving device 200 and the battery pack are directly docked in the form of a connector, to implement fast plug of the battery pack for selective use in another electric device. If a conventional design is used, a connector is fixed in the body 210. When a battery pack makes a relative displacement relative to the body 210, the terminal 1022 and a docking terminal in the battery pack have frequent relative movements, and an electrical spark is highly likely to occur. In a general concept, the fixation of a battery pack is strengthened, thereby reducing a relative displacement between a terminal and a docking terminal. In the technical solution in this implementation, the convention is broken to degrade the fixation of the terminal 1022, to enable the terminal 1022 to move relative to the body 210. With this design, when a battery pack moves relative to the body 210, the terminal 1022 is driven to move relative to the body 210, thereby avoiding an electrical spark generated from frequent relative movements between the docking terminal on the battery pack and the terminal 1022.

In a specific embodiment, the connector 102 is suspended in the body 210. Specifically, the body 1023 of the connector 102 is suspended on the wall portion 204 in the body 210. In this embodiment, the wall portion 204 is a part of the body 210. Specifically, as shown in FIG. 12, the wall portion 204 is a part of the housing 3, and the housing 3 is partially concave inwardly to form the wall portion 204. In other embodiments, the wall portion 204 may be separately formed and is then assembled in the body 210.

As shown in FIG. 25 to FIG. 28, the body 1023 includes a connecting portion 1025 suspended in the body 210. The body 10 includes a restricting portion 1026 configured to confine the connecting portion 1025. The connecting portion 1025 is suspended at the restricting portion 1026. The restricting portion 1026 confines the connecting portion in a particular range, to confine a suspension range of the connecting portion 1025, to prevent the connecting portion 1025 from departing from the body 210, to enable the connecting portion 1025 to be movable relative to the body 210 in a defined range.

Figure 25:
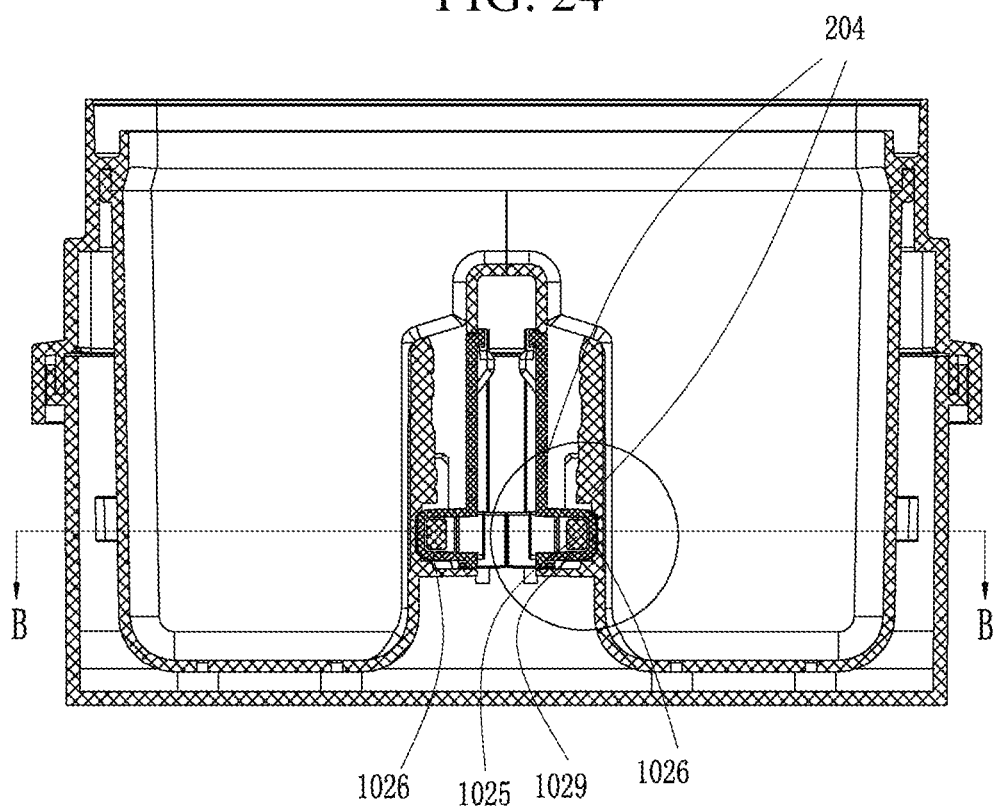
FIG. 25 is a sectional view along a line A-A shown in FIG. 23 of the battery accommodating portion shown in FIG. 23.
Figure 26:
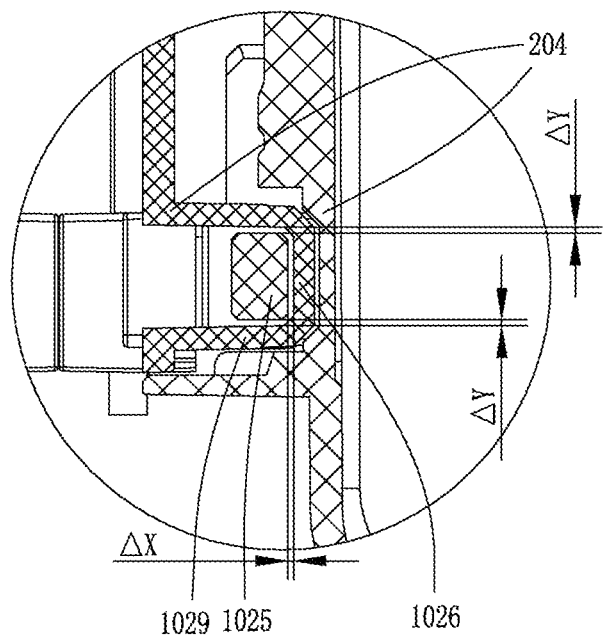
FIG. 26 is a partial enlarged view of the structure in the circle shown in FIG. 25.
Figure 27:
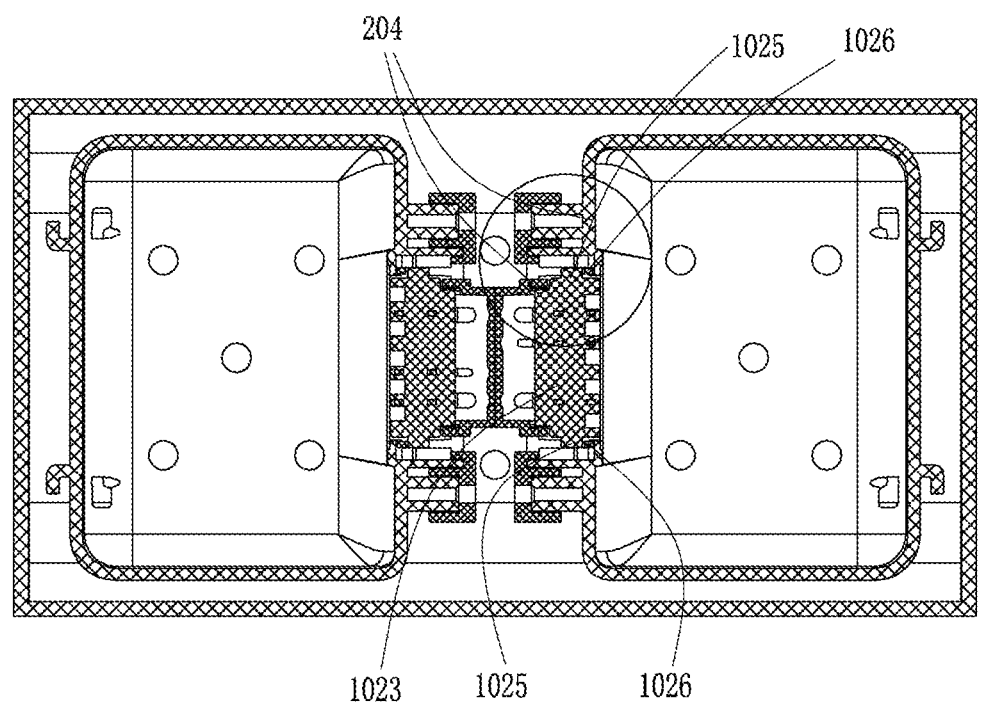
FIG. 27 is a sectional view along a line A-A shown in FIG. 25 of the battery accommodating portion shown in FIG. 23.
Figure 28:
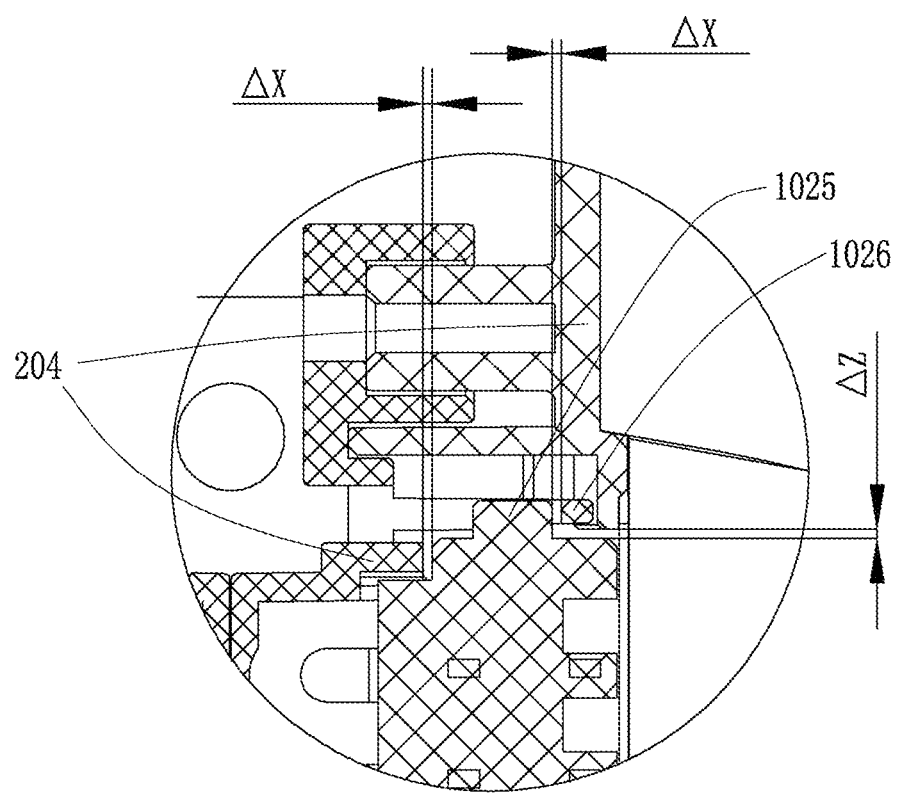
FIG. 28 is a partial enlarged view of the structure in the circle shown in FIG. 27.

In this embodiment, there is a gap between the restricting portion 1026 and the connecting portion 1025, to enable the two to move relative to each other. As shown in FIG. 25 and FIG. 26, in a specific embodiment, gaps are provided between the restricting portion 1026 and the connecting portion 1025 in the X, Y, Z-axis directions, and the gap values are respectively $\Delta X$, $\Delta Y$, and $\Delta Z$, to provide the connecting portion 1025 with suspension gaps relative to the body 210 in all directions. That is, the connecting portion 1025 may move relative to the body 210 in all the X, Y, Z-axis directions by distances $\Delta X$, $\Delta Y$, and $\Delta Z$, respectively. Preferably, value ranges of the gap values $\Delta X$, $\Delta Y$, and $\Delta Z$ are all 0 mm to 5 mm.

In another embodiment, there may be gaps between the connecting portion 1025 and the restricting portion 1026 in only some directions rather than all the directions according to an actual case. In this embodiment, as shown in FIG. 25, the connecting portion 1025 is a convex block. The restricting portion 1026 includes an accommodating groove fitting the convex block. Specifically, the accommodating groove may be directly inwardly concave from the wall portion 204. Alternatively, as shown in FIG. 25, one restricting portion 1026 having the accommodating groove may protrude outwardly form the wall portion 204. The restricting portion 1026 includes the accommodating groove and a restricting wall 1029 surrounding the accommodating groove. Specifically, as shown in FIG. 25, the self-moving device 200 includes two connecting portions. Correspondingly, two limiting portions 1026 are disposed on the wall portion 204. The two connecting portions are formed by protruding outwardly from two side surfaces 1027 of the body 1023. The two limiting portions 1026 are disposed at two ends of the body 1023 and fit the connecting portion 1025. In another embodiment, the connecting portion 1025 and the restricting portion 1026 and not limited to the foregoing structures, and may be any structures that fit each other to limit positions.

In another embodiment, at least one of the restricting portion 1026 and the connecting portion 1025 is an elastic body that can elastically deform, and no gap may be provided between the two. For example, the restricting portion 1026 is an elastic body. When the battery pack shakes, the connecting portion 1025 shakes along. Because the restricting portion 1026 is an elastic body and has a particular compression space. The connecting portion 1025 can still move relative to the body 210 in a particular range. In this embodiment, the connecting portion 1025 may be disposed as an elastic body. When the battery pack shakes, the connecting portion 1025 shakes along. Because the connecting portion 1025 is an elastic body and has a particular compression space, the terminal 1022 can still move relative to the body 210 in a particular range. In this embodiment, both the connecting portion 1025 and the restricting portion 1026 may be disposed as elastic bodies. Certainly, in this embodiment, a gap may be provided between the restricting portion 1026 and the connecting portion 1025, to increase a suspension space of the terminal 1022.

In another embodiment, the body 210 further includes an elastic component (not shown) disposed between the restricting portion 1026 and the connecting portion 1025. When a battery pack shakes, the elastic component is compressed in a corresponding direction to form a corresponding suspension space, to enable the terminal 1022 to move relative to the body 210.

Figure 29:
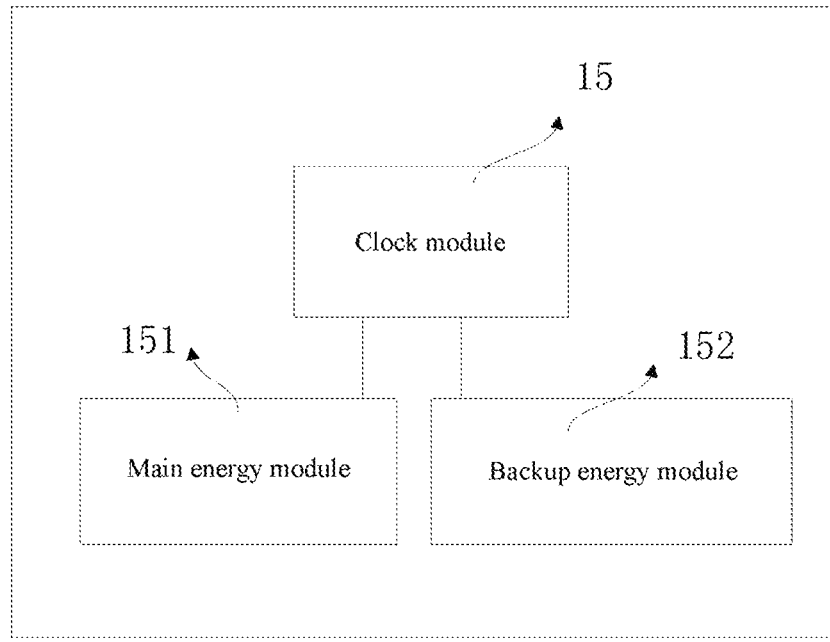
FIG. 29 is a schematic modular diagram of a clock module and a main energy module and a backup energy module for powering the clock module according to an embodiment of the present invention.
Figure 30:
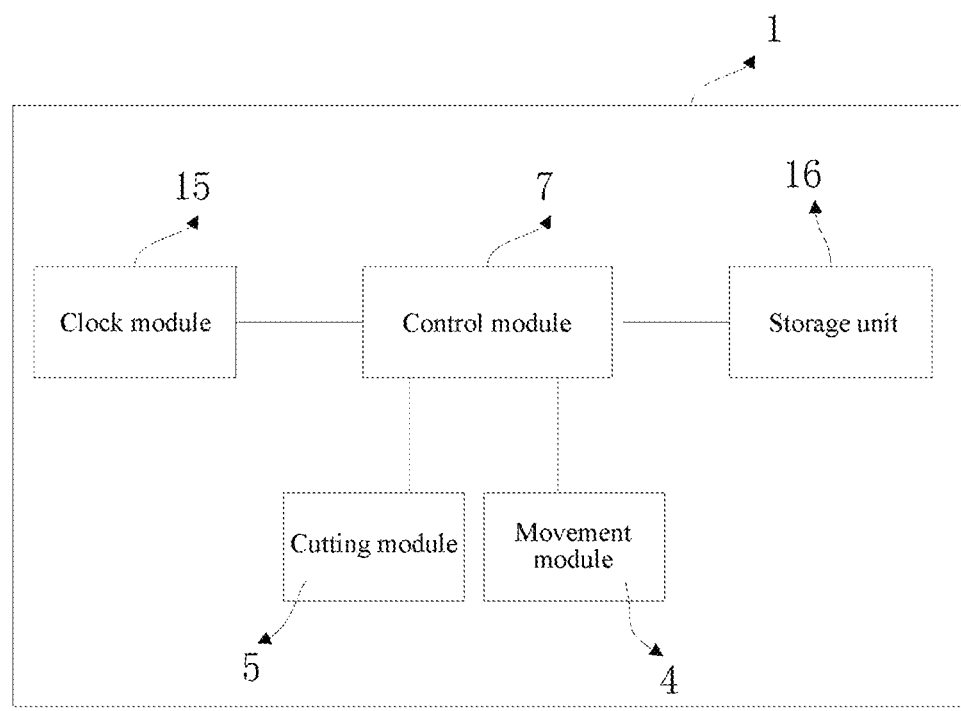
FIG. 30 is a schematic modular diagram of a self-moving device according to an embodiment of the present invention.

In an embodiment of the present invention, as shown in FIG. 29 and FIG. 30, a difference in this embodiment and the foregoing embodiments only lies in that the self-moving device 1 further includes a clock module 15 configured to record a real-time time of the self-moving device 1. The self-moving device 1 further includes a main energy module 151 and a backup energy module 152 for powering the clock module 15. Generally, the clock module 15 is powered by the main energy module 151. The main energy module 151 is an energy module 2 providing energy for the self-moving device to move and work in a first embodiment. After the main energy module 151 is unplugged from the self-moving device 1 and the self-moving device 1 is powered off, the clock module 15 is powered by the backup energy module 152, so that even if the main energy module 151 is unplugged from the self-moving device 1, the clock module 15 can continue to record the real-time time to stick to the schedule of the self-moving device 1. The backup energy module 152 may be a disposable energy module, for example, a disposable button cell or another disposable battery. When the energy module 152 is a button cell, the energy module 152 has a small volume, low self-discharge, and long service life, and it is not necessary to frequently detach and replace the backup energy module 152. The backup energy module 152 may be alternatively a rechargeable energy module. Specifically, the backup energy module 152 may be charged by the main energy module 151 or another charging device. For example, when the backup energy module is a supercapacitor, the backup energy module has a small volume and low prices, and in addition, the supercapacitor may be directly charged by the main energy module 151, so that it is not necessary to frequently detach and replace the backup energy module 152.

In a specific embodiment, the self-moving device 1 further includes a storage unit 16 configured to store customized information and a control module 7 for controlling the self-moving device 1 to move and work. The customized information includes a time setting, a working time table, a login password setting, a speech setting, and the like. The working time table is a working time plan of the self-moving device 1. For example, a week is used as a unit, and the working time is 8:00 to 18:00 every day from Monday to Friday. In an embodiment, the main energy module 151 is unplugged at 10:00 on a Wednesday and the power is turned off for two hours. After the main energy module 151 is unplugged, the clock module 15 is powered by the backup energy module 152 to continue to record the real-time time of the self-moving device 1. When the main energy module 151 is inserted again to power the self-moving device 1, the time recorded by the clock module 15 is not reset, and the two hours during which the self-moving device 1 is powered off is automatically added to stick to the time setting of the self-moving device 1. In this embodiment, the control module 7 automatically controls the working time of the self-moving device 1 according to the time recorded by the clock module 15 and a preset working time table. Specifically, the control module 7 automatically adds two hours during which the self-moving device 1 is powered off, extends the working time of the self-moving device 1, and controls the self-moving device 1 to work till 20:00 on the current day.

In another specific embodiment, after being unplugged, the main energy module 151 is configured to power another electric tool. When the main energy module 151 is inserted again, a battery level of the main energy module 151 is reduced compared with a battery level of the main energy module 151 when the main energy module 151 is unplugged. A difference between a remaining battery level when the main energy module 151 is unplugged and a remaining battery level when the main energy module 151 is inserted again may be used to calculate a charging time required to charge the battery level of the main energy module 151 to the remaining battery level when the main energy module 151 is unplugged, that is, a charging time required for the battery level of the main energy module 151 lost within the period of time during which the main energy module 151 is unplugged, so as to estimate a working end time according to the charging time for the lost battery level. For example, a week is used as a unit, and the working time is 8:00 to 18:00 every day from Monday to Friday. When the main energy module 151 is unplugged at 10:00 on a Wednesday and the power is turned off for two hours. In this case, when the energy module is inserted again to power the self-moving device, the two hours during which the main energy module 151 is powered off needs to be added. That is, the self-moving device works till 20:00 on the current day. If the remaining battery level of the main energy module 151 is 50% when being unplugged, and the remaining battery level of the main energy module 151 when the main energy module 151 is inserted again is 20%, in the working plan on the current day, the battery level of the main energy module 151 is reduced by 30% within a period of time during which the main energy module 151 is unplugged, and the time for charging of the 30% of the battery level needs to be added before the working plan on the current day can be completed. The control module 7 automatically controls the working time of the self-moving device 1 according to the time recorded by the clock module 15, the remaining battery level of the main energy module 151 when the main energy module 151 is unplugged, and the remaining battery level of the main energy module 151 when the main energy module 151 is inserted again. For example, if it takes one hour to charge the main energy module 151 from the remaining battery level of 20% to 50%, correspondingly, after the energy module is inserted again, the working end time on the current day is delayed by one more hour, that is, the work ends at 21:00.

In this embodiment, in the self-moving device 1, the backup energy module 152 for powering the clock module 15 is disposed to enable the self-moving device 1 to still accurately record the time after the main energy module 151 is powered off. In an aspect, when the main energy module 151 is inserted again, the time of the self-moving device 1 is accurate. In another aspect, the control module 7 automatically controls the working time of the self-moving device 1 according to the time recorded by the clock module 15 in combination with the preset working time table, so as to adjust a working time plan of the self-moving device 1.

Figure 31:
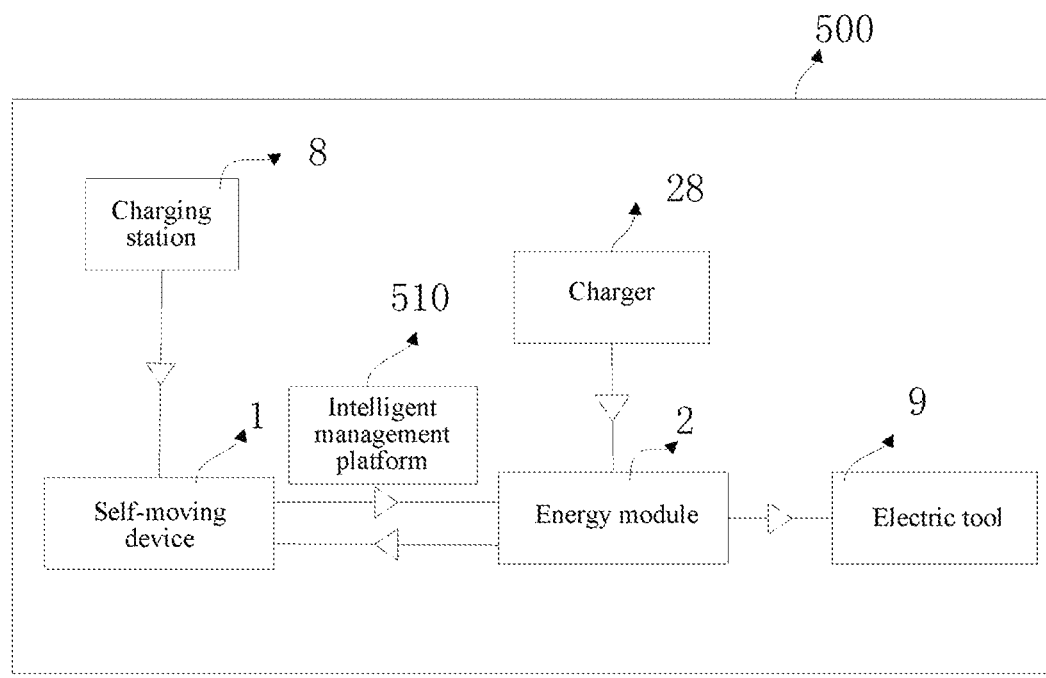
FIG. 31 is a schematic modular diagram of an automatic working system according to an embodiment of the present invention.
Figure 32:
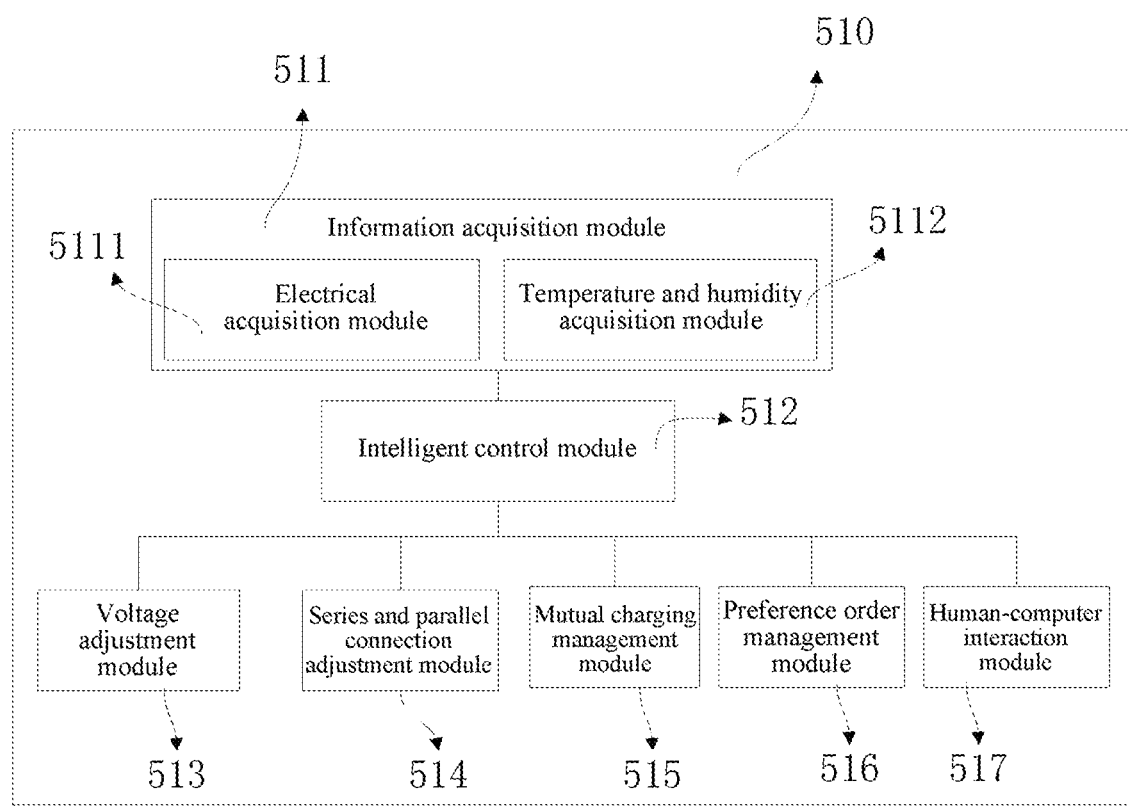
FIG. 32 is a schematic modular diagram of an intelligent management platform the automatic working system shown in FIG. 31.
Figure 33:
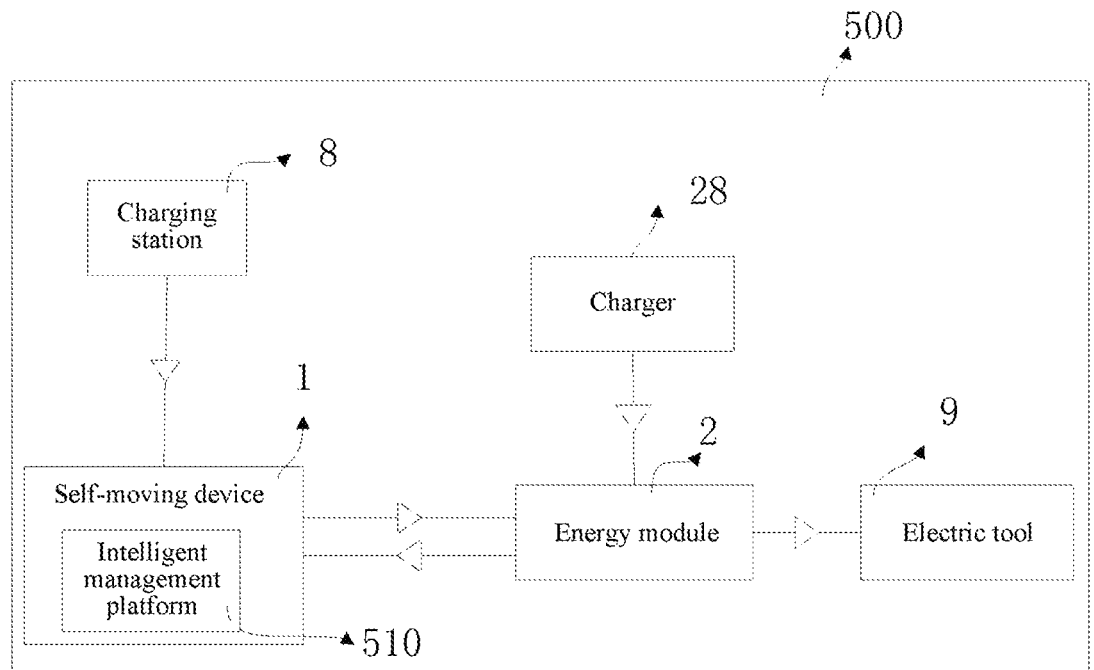
FIG. 33 is a schematic modular diagram of an automatic working system according to an embodiment of the present invention.

In an embodiment of the present invention, as shown in FIG. 31 to FIG. 33, an automatic working system 500 includes a self-moving device 1, a charging station 8, an electric tool 9, at least one energy module 2, and an intelligent management platform 510. FIG. 31 is only a schematic diagram of the automatic working system 500 having the intelligent management platform 510. A specific position of the intelligent management platform 510 is not limited. The intelligent management platform 510 may be disposed in any one or more of the self-moving device 1, the charging station 8, the electric tool 9, and at least one energy module 2 in the automatic working system 500 and may be disposed independently from another apparatus. The intelligent management platform 510 is configured to manage a status of the energy module 2. When the intelligent management platform 510 manages the status of the energy module 2, it means that the intelligent management platform 510 manages whether to charge or discharge the energy module 2 and a specific working status during charging or discharging. The specific working status during charging or discharging is a charging and discharging manner as well as series and parallel connection, a preference order, mutual charging, voltage adjustment, and the like of the energy modules 2 during charging or discharging. In this embodiment, the intelligent management platform 510 is configured to manage whether to perform charging or discharging between the self-moving device 1 and the energy module 2 and the specific working status during charging or discharging. In another embodiment, the intelligent management platform 510 may be configured to manage a discharging status between the energy module 2 and the electric tool 9. The energy module 2 is selectively used for the self-moving device 1 or the electric tool 9 to output electrical energy to power the self-moving device 1 or the electric tool 9. In other words, a user may selectively use the energy module 2 for the self-moving device 1 or the electric tool 9 to power a corresponding self-moving device 1 or electric tool 9. In other embodiments, the electric tool 9 may be alternatively another electric device, for example, a home appliance. That is, the energy module 2 is selectively configured to power the self-moving device 1 or another electric device. The another electric device is an electric device other than the self-moving device 1. The electric tool 9, the home appliance, and the like may be generally referred to as electric devices. Further, the self-moving device 1 includes a charging system. The charging system stores external electrical energy in the energy module 2. That is, the self-moving device 1 may be used as a charger to charge the energy module 2. In this embodiment, the self-moving device 1 is an autonomous lawnmower. In other embodiments, the self-moving device may be alternatively an automatic leaf blower, an automatic water sprinkler, a multifunctional machine, a robot cleaner or the like. The electric tool 9 is an electric tool other than the self-moving device 1, that is, an electric tool different from the self-moving device 1, and is, for example, a gun drill, a hammer drill, a trimmer or a hand-propelled lawnmower that is powered by a detachable battery pack. In this embodiment, the energy module 2 is a battery pack for powering the self-moving device 1. In other embodiments, the energy module 2 may be alternatively another unit that can power the self-moving device 1.

In an embodiment, the intelligent management platform 510 includes an information acquisition module 511 and an intelligent control module 512. The information acquisition module 511 is configured to acquire related information of the energy module 2. The intelligent control module 512 controls the status of the energy module 2 according to the related information of the energy module 2. The related information of the energy module 2 in this embodiment includes related information of the energy module 2 and related information of a circuit in which the energy module 2 is located. Specifically, the related information includes whether the energy module 2 is present (that is, whether there is a vacancy), an electrical parameter of the energy module 2, an environmental parameter of the energy module 2, and the like. The electrical parameter of the energy module 2 includes an electrical parameter of the energy module 2 itself and an electrical parameter of the circuit in which the energy module 2 is located. The electrical parameter of the energy module 2 includes voltages, currents, powers, battery pack types, battery levels, the quantities of times of charging or discharging, battery internal resistances, and single-battery voltages of the energy module 2 and the circuit in which the energy module 2 is located, and a status of the circuit in which the energy module 2 is located. The status of the circuit includes states such as charging and discharging, sequential charging and discharging, series and parallel connection charging and discharging, and mutual charging between energy modules. The environmental parameter includes a temperature, a humidity or the like of the energy module 2. The information acquisition module 511 may directly acquire the related information of the energy module 2 in a manner of detection or may acquire the related information of the energy module 2 in a communication manner. Specifically, when the related information of the energy module 2 is acquired in a communication manner, the intelligent management platform 510 presets a storage module for storing the related information of the energy module 2. The storage module sends the related information of the energy module 2 to the information acquisition module 511 in a wireless communication manner or the like.

In another embodiment, the intelligent management platform 510 further includes a recognition module. The recognition module is configured to recognize a self-moving device or an electric device powered by the energy module 2 and acquire device information. The electric device is a device other than the self-moving device 1. The device information is information of the self-moving device or electric device powered by the energy module 2. For example, when the energy module 2 is configured to power the self-moving device, the recognition module is configured to detect the information of the self-moving device. When the energy module 2 is configured to power another electric device, for example, is configured to power the electric tool 9, the recognition module is configured to recognize the information of the electric tool 9. The device information is information related to the device powered by the energy module 2, for example, the type of the device powered by the energy module 2, the power of the device, a supply voltage required for the device, and the size of a battery interface on the device, and the like. Further, the intelligent control module 512 controls the status of the energy module 2 according to the device information and the related information of the energy module 2. In a specific embodiment, the intelligent management platform 510 may recognize the device information in the following manner. In an embodiment, one recognition electrode is added to an electrode base to be connected to a battery pack electrode plate. The battery pack uses the recognition electrode to recognize the device. The recognition electrode may also be referred to as the recognition module. In another embodiment, sensors such as Hall sensors or photoelectric switch sensors are used to recognize different devices. Sensors mounted at different positions are used to recognize different device. For example, a sensor corresponding to a first tool is mounted at a first position, and a sensor corresponding to a second tool is mounted at a second position. The battery pack separately corresponds to the sensor in the first or second position to recognize a tool. For example, the first tool is determined if the first position is sensed, and the sensor may also be referred to as the recognition module. In another embodiment, reed switches are used to recognize different devices. A magnetic component is mounted at a battery pack. Reed switches are mounted at different positions of different tools. When there is magnetic inductance, two contacts of a reed switch are closed, so as to recognize different tools. The reed switch may also be referred to as the recognition module. In another embodiment, resistors are used to recognize different devices. One recognition resistor is provided inside the battery pack. There is also one recognition resistor inside the device. Voltage-division sampling is performed to recognize a resistance. Different devices have different resistances, so that different sampling voltages of different devices are detected, and a connected device is determined according to a corresponding sampling voltage. The recognition resistor may also be referred to as the recognition module. In the foregoing embodiments, the device includes a self-moving device and an electric device powered by the energy module 2. In other embodiments, the recognition module may be alternatively in another form, provided that the function of recognizing the device information can be implemented. The foregoing embodiments is only an example for description. In other embodiments, the related information of the energy module 2 may be recognized in the foregoing manners. The recognition module configured to recognize the related information of the energy module may also be referred to as an energy information acquisition module.

In a specific embodiment, the information acquisition module 511 include an electrical acquisition module 5111 and a temperature and humidity acquisition module 5112. Certainly, in other embodiments, the information acquisition module 511 may alternatively include only one of the electrical acquisition module 5111 and the temperature and humidity acquisition module 5112. The temperature and humidity acquisition module 5112 acquires one or two of the temperature and humidity of the energy module 2. Specifically, the temperature and humidity acquisition module 5112 performs detection to acquire one or two of the temperature and humidity of the energy module 2. The detecting the temperature or humidity of the energy module 2 herein includes directly or indirectly detecting the temperature or humidity of the energy module 2. The indirect detection is detecting the temperature, humidity or the like of the environment in which the energy module 2 is located to detect the temperature or humidity of the energy module 2. The temperature and humidity acquisition module 5112 acquires the temperature or humidity of the energy module 2. The intelligent control module 512 controls the status of the energy module 2 according to the temperature or humidity. For example, when the temperature is beyond a preset range, the energy module 2 does not work, or when the temperature is beyond a preset range, the energy module 2 cannot be used to charge another energy module, or when the temperature is beyond a preset range, the energy module 2 cannot be charged. When the temperature is high, a fan may be turned on or another cooling material may be used for cooling. When the humidity is beyond a preset range, the energy module 2 does not work.

Specifically, for a manner in which the intelligent control module 512 controls the status of the energy module 2 according to a detection result of the temperature and humidity acquisition module 5112, reference may be made to the following implementations.

Figure 34:
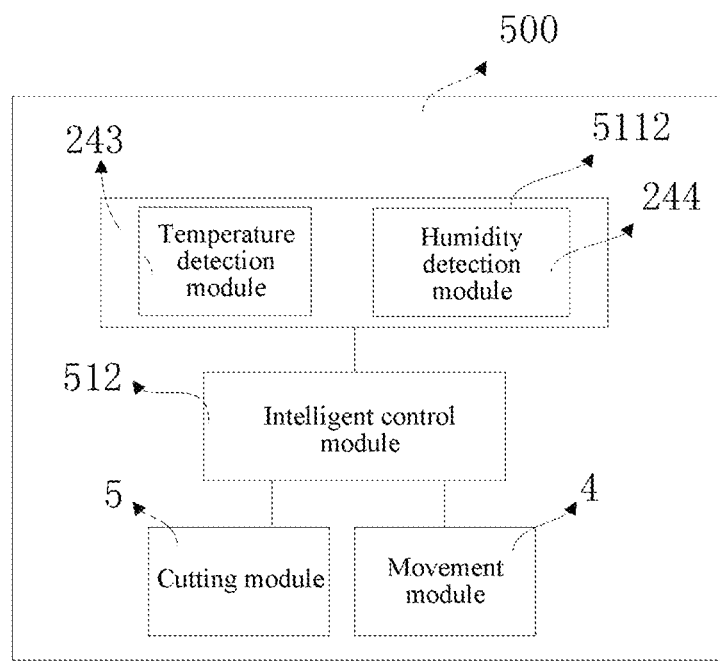
FIG. 34 is a schematic modular diagram of an automatic working system having both a temperature detection module and a humidity detection module according to an embodiment of the present invention.
Figure 35:
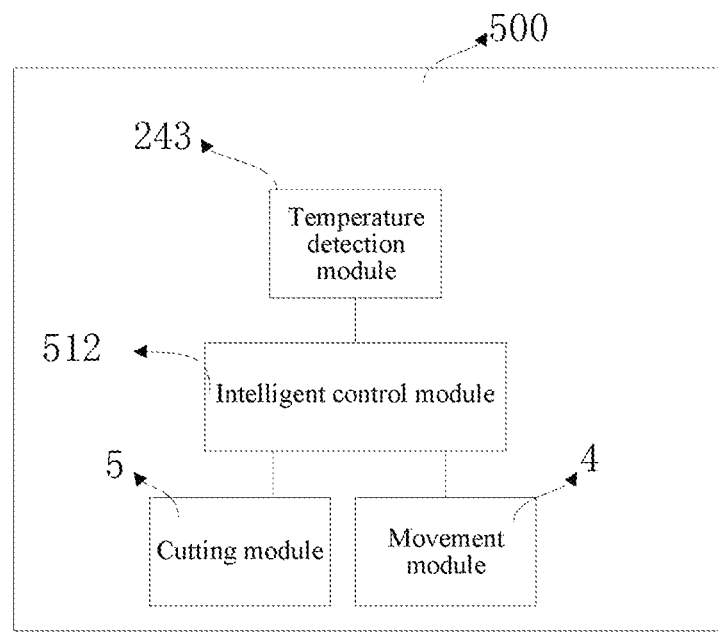
FIG. 35 is a schematic modular diagram of an automatic working system having a temperature detection module according to an embodiment of the present invention.
Figure 36:
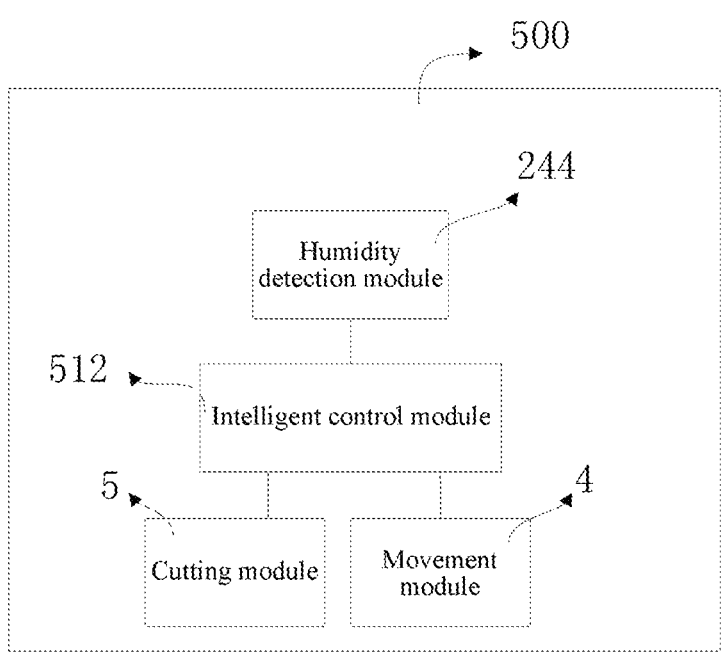
FIG. 36 is a schematic modular diagram of an automatic working system having a humidity detection module according to an embodiment of the present invention.

In an example embodiment, as shown in FIG. 34 to FIG. 36, the self-moving device 1 further includes a temperature and humidity acquisition module 5112 configured to detect one or two of the temperature or humidity of the energy module 2 and an intelligent control module 512. The temperature and humidity acquisition module 5112 detects one or two of the temperature or humidity of the energy module 2, to obtain a detection result. The intelligent control module 512 controls a working status of the self-moving device according to the detection result. The detecting the temperature or humidity of the energy module includes directly detecting or indirectly detecting the temperature or humidity of the energy module 2. The indirectly detecting the temperature or humidity of the energy module 2 is detecting a parameter related to the humidity or temperature of the energy module 2, for example, detecting the temperature or humidity of an environment in which the energy module 2 is located, or detecting the temperature or humidity in the accommodating cavity accommodating the energy module 2, to obtain the temperature or humidity of a working environment of the energy module 2, or detecting the temperature or humidity of a structure or in a specific position near the energy module 2 or the like.

Figure 38:
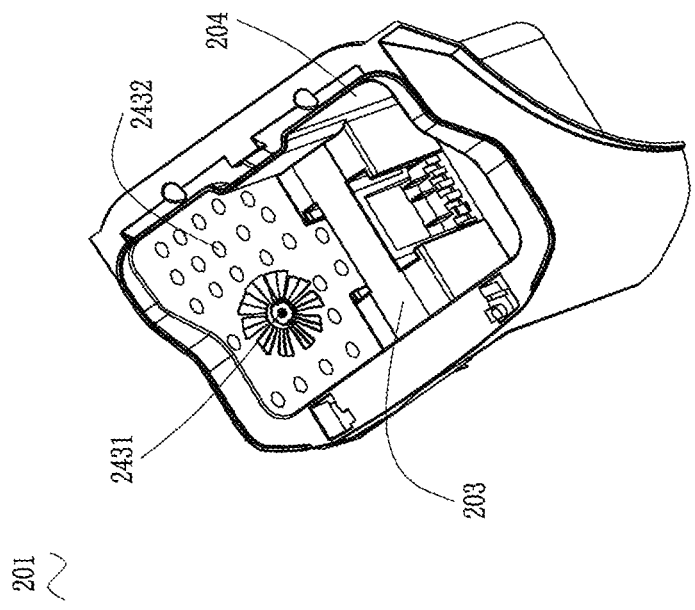
FIG. 38 is a schematic diagram of a fan and a heat sink hole provided in a battery accommodating portion according to an embodiment of the present invention.
Figure 37:
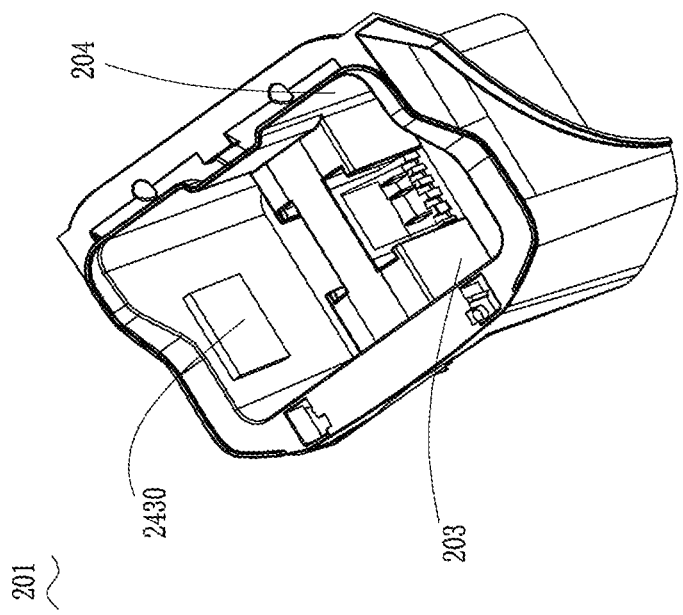
FIG. 37 is a schematic diagram of a temperature adjustment apparatus disposed in a battery accommodating portion according to an embodiment of the present invention.

As shown in FIG. 35, in an example embodiment, the temperature and humidity acquisition module 5112 is a temperature detection module 243 configured to detect the temperature of the energy module 2. The self-moving device 1 presets a temperature range. If the temperature detected by the temperature detection module 243 is beyond the temperature range, the intelligent control module 512 controls the energy module 2 not to supply power. If the temperature detected by the temperature detection module 243 is within the temperature range, the intelligent control module 512 controls the energy module 2 to supply power. As shown in FIG. 37, the self-moving device 1 further includes a temperature adjustment apparatus 2430. The intelligent control module 512 controls, according to the temperature detected by the temperature detection module, the temperature adjustment apparatus 2430 to adjust the temperature of the energy module. The adjusting the temperature of the energy module 2 by the temperature adjustment apparatus 2430 includes directly adjusting the temperature of the energy module 2 and indirectly adjusting the temperature of the energy module 2. The indirectly adjusting the temperature of the energy module 2 includes adjusting the temperature of the environment in which the energy module 2 is located to indirectly adjust the temperature of the energy module 2. Specifically, a maximum temperature value and a minimum temperature value are preset. When the temperature detected by the temperature detection module 243 is greater than the maximum temperature value, the intelligent control module 512 controls the temperature adjustment apparatus 2430 to reduce the temperature of the energy module 2 or the environment in which the energy module 2 is located. When the temperature detected by the temperature detection module 243 is less than the minimum temperature value, the intelligent control module 512 controls the temperature adjustment apparatus 2430 to increase the temperature of the energy module 2 or the environment in which the energy module 2 is located. Specifically, as shown in FIG. 38, the temperature adjustment apparatus is a fan 2431. The self-moving device presets a maximum temperature value. When the temperature detected by the temperature detection module 243 is greater than the maximum temperature value, the intelligent control module 512 controls the fan is turned on to cool the energy module 2 and the environment in which the energy module 2 is located. Moreover, a heat sink hole 2432 may be added to the wall portion 204 to accelerate heat dissipation. In another embodiment, the temperature adjustment apparatus 2430 may be another cooling material such as a phase change material and a semiconductor refrigeration sheet. When the temperature detected by the temperature detection module 243 is greater than the maximum temperature value, the intelligent control module 512 controls the cooling material to cool to reduce the temperatures of the energy module 2 and the environment in which the energy module 2 is located. In another embodiment, the temperature adjustment apparatus 2430 may be a heating material such as a heating sheet. When the temperature detected by the temperature detection module 243 is less than the minimum temperature value, the intelligent control module 512 controls the self-moving device to heat the heating sheet, to rapidly increase the temperature of the energy module 2 and the environment in which the energy module 2 is located.

As shown in FIG. 36, in another example embodiment, a detection module is a humidity detection module 244. The self-moving device 1 presets a humidity threshold. If a humidity detected by the humidity detection module 244 exceeds the humidity threshold, the intelligent control module 512 controls the energy module not to supply power. If the humidity detected by the humidity detection module 244 does not exceed the humidity threshold, the intelligent control module 512 controls the energy module to supply power. In this embodiment, the humidity detection module 244 may be a polymer resistive sensor. In other embodiments, the humidity detection module 244 may be alternatively another sensor or another structure. In an example embodiment, the self-moving device 1 further includes a drying apparatus. When the humidity detected by the humidity detection module exceeds the humidity threshold, the drying apparatus dries the energy module 2 and the environment in which the energy module 2 is located, to reduce humidity.

Figure 39:
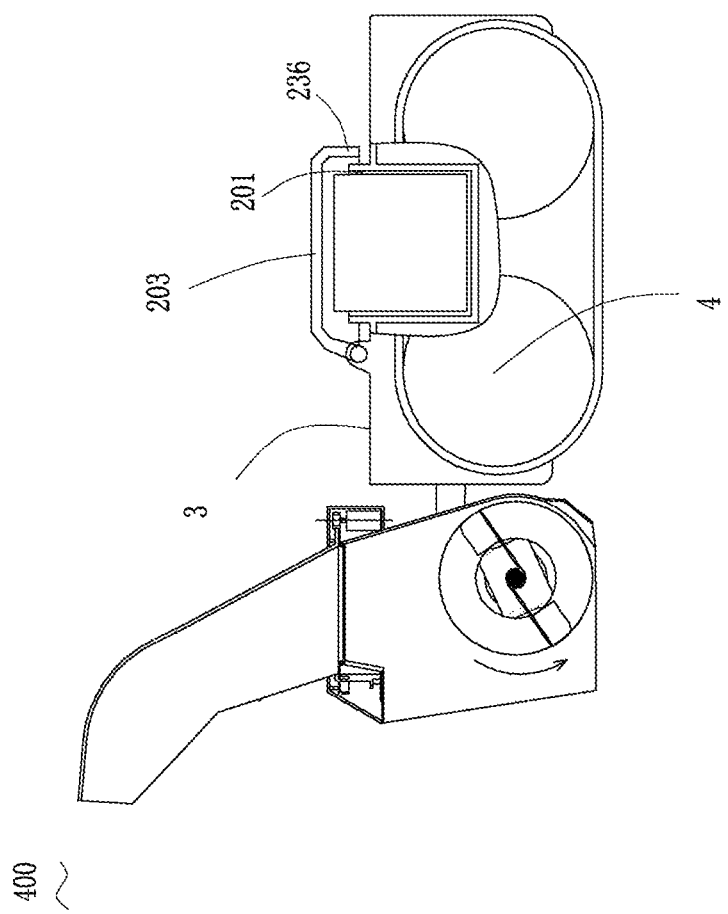
FIG. 39 is a front view of a self-moving device according to an embodiment of the present invention.

In the foregoing embodiments, for example, the self-moving device is a robotic lawnmower. In other embodiments, the self-moving device may be an automatic leaf blower, an automatic water sprinkler, a multifunctional machine, an automatic snowplow, a robot cleaner or the like. As shown in FIG. 39, in an example embodiment, a self-moving device 400 is an automatic snowplow. The self-moving device 400 includes a housing 3, a movement module 4, a snow removal module, an intelligent control module, and the like. In this embodiment, for all the structures of the self-moving device, reference may be made to the design of a robotic lawnmower. Because the automatic snowplow works in a low-temperature working environment, the temperature adjustment apparatus 2430 may be disposed as a heating material according to an actual case. The temperature adjustment apparatus 2430 is automatically heated until the temperature of the energy module 2 is increased to enter the preset temperature range. The control module controls the energy module 2 to supply power, and the automatic snowplow starts to perform work.

In another specific implementation, the intelligent control module 512 may further control a charging and discharging order of the energy module 2 according to the detected temperature and humidity. For example, the automatic working system 500 includes two energy modules 2. The temperature of one energy module 2 is relatively high. In this case, the intelligent management platform 510 intelligently manages that the other energy module 2 having a relatively low temperature is preferentially charged or discharged, and the original energy module 2 having a relatively high temperature is charged or discharged after being cooled.

For a specific manner in which the intelligent control module 512 controls the status of the energy module 2, reference may further be made to the following implementation:

In a specific implementation, the automatic working system 500 includes at least two energy modules 2. The information acquisition module 511 acquires the related information of the energy modules 2. The intelligent control module 512 controls a charging and discharging manner of the energy modules 2 according to the related information. The charging and discharging manner includes: the at least two energy modules 2 are sequentially charged or discharged, the at least two energy modules 2 are connected in series or parallel before charging or discharging, the at least two energy modules 2 are mutually charged before charging or discharging, and the like. For example, if the automatic working system 500 includes two energy modules 2, each energy module 2 is one battery pack. That is, the automatic working system 500 includes two battery packs. The two battery packs both have a voltage of 20 V. In this case, if a nominal voltage of the self-moving device 1 is 20 V, the intelligent control module 512 controls the energy modules to be connected in parallel to supply power. If the nominal voltage of the self-moving device 1 is 40 V, the intelligent control module 512 controls the energy modules 2 to be connected in series to supply power.

In another specific implementation, the automatic working system 500 includes at least two energy modules 2. The intelligent control module 512 controls, according to the related information acquired by the information acquisition module 511, the energy modules 2 to be sequentially charged or discharged and determine an order of sequential charging or discharging of the energy modules 2. Further, in an example embodiment, the information acquisition module 511 acquires the related information of the energy module 2. The intelligent control module controls, according to the related information, the energy modules 2 to be sequentially charged, to be connected in parallel to be charged or to be alternately charged, and the like. Further, in an example embodiment, the automatic working system 500 further includes a preference order management module 516 configured to manage a charging or discharging order of the energy modules 2. The intelligent control module 512 controls, according to the related information, the preference order management module 516 to manage the charging or discharging order of the energy modules 2. Specifically, for example, the electrical acquisition module 5111 acquires the battery levels of the energy modules 2, and compares different battery levels of the energy modules 2, and the intelligent control module 512 controls the preference order management module 516 to manage the energy module 2 with a higher battery level to preferentially supply power.

In another specific implementation, the automatic working system 500 includes at least two energy modules 2. The intelligent control module 512 controls, according to the related information acquired by the information acquisition module 511, the energy modules 2 to be connected in series and parallel before charging or discharging. Further, in another specific embodiment, the automatic working system 500 at least includes two energy modules 2. The intelligent management platform 510 further includes a series and parallel connection adjustment module 514 for changing a series and parallel connection manner between the energy modules 2. The information acquisition module 511 acquires the electrical parameter of the energy module 2. The intelligent control module 512 controls the series and parallel connection adjustment module 514 according to the electrical parameter to adjust a series and parallel connection manner of the energy module 2. Further, in a specific embodiment, the intelligent control module 512 controls the series and parallel connection adjustment module 514 according to the related information acquired by the information acquisition module 511 to manage parallel charging or alternate charging of the energy modules 2. Specifically, safe ranges are preset. The electrical acquisition module 5111 acquires voltages and battery levels of the energy modules 2. If a voltage difference and a battery level difference between the energy modules 2 are both in the safe ranges, the intelligent control module 512 controls the series and parallel connection adjustment module 514 to manage the energy modules 2 to be connected in parallel before charging. Further, in a specific embodiment, safe ranges are preset. The electrical acquisition module 5111 acquires voltages and battery levels of the energy module 2. If the voltage difference and the battery level difference between the energy modules 2 are both in the safe ranges, the intelligent control module 512 controls the energy module 2 to be connected in parallel to supply power. If the voltage difference or the battery level difference between the energy modules 2 is not in the safe range, the energy modules 2 are controlled to be connected in series to supply power. The safe ranges are a voltage difference range and a battery level difference range that are obtained according to experiments and allow safe mutual charging of the energy modules 2. For example, it is safe for one battery pack of 20 V and another battery pack with a voltage difference within 7.5 V to perform mutual charging. Therefore, for the battery pack of 20 V, a range with a voltage difference less than 7.5 V is a safe range. Next, for example, for two battery packs of 20 V, the battery level of one battery pack is 0, and the battery levels of the other battery pack is 100%. The two battery packs can safely perform mutual charging. Therefore, a range of a battery level difference between the battery packs of 20 V less than 100% is a safe range. The foregoing is only an example. Different battery packs may have different safe ranges. The present invention is not limited to the foregoing specific range values. Further, in another specific embodiment, the automatic working system 500 includes at least three energy modules. The information acquisition module 511 acquires the related information of the energy module 2. The intelligent control module 512 controls, according to the related information, the energy modules 2 to be combined in series or parallel for charging or discharging. For example, each energy module is one battery pack. There are three battery packs of 20 V. A battery level of one battery pack is 100%, and battery levels of the other two battery packs are 50%. In this case, the intelligent control module 512 controls the two battery packs with the battery levels of 50% to be connected in parallel and then connected in series to the other battery pack with the battery level of 100%. In this way, the energy of all battery packs can be utilized to the maximum extent.

In another specific implementation, the automatic working system 500 includes at least two energy modules 2. The automatic working system 500 further includes a mutual charging management module 515. The mutual charging management module 515 is configured to manage whether the energy modules 2 perform mutual charging and a corresponding mutual charging manner. The information acquisition module 511 acquires the related information of the energy module 2. The intelligent control module 512 controls, according to the related information, the mutual charging management module 515 to manage whether the energy modules 2 perform mutual charging and a corresponding mutual charging manner. Further, in a specific embodiment, when the intelligent control module 512 controls, according to the related information acquired by the information acquisition module 511, the energy modules 2 to be completely connected in parallel or partially connected in parallel, the mutual charging management module 515 manages whether the energy modules 2 are connected in parallel to perform mutual charging and a corresponding mutual charging manner. For example, the automatic working system 500 includes two energy modules 2. Each energy module 2 is one battery pack of 20 V. That is, the automatic working system 500 includes two battery packs of 20 V. The battery levels of the two battery packs of 20 V are separately 80% and 40%. The intelligent control module 512 controls the mutual charging management module 515 to manage that the two battery packs are first connected in parallel to perform mutual charging, and when both the battery levels reach 60%, the two battery packs are then connected in series to supply power. In this way, it may be avoided that the electric power of the battery pack with the battery level of 40% in the series connection cannot be output in time. If there are at least two battery packs, it is determined, according to the related information of the detected battery packs, whether the battery packs first perform mutual charging. If a voltage difference, a battery level difference or the like between two battery packs is beyond a safe range and mutual charging may damage one of the battery packs, the intelligent control module 512 controls the mutual charging management module 515 to manage the battery packs not to perform mutual charging.

In another specific implementation, the intelligent management platform 510 further includes a voltage adjustment module 513 for adjusting the voltage of the energy module 2. The information acquisition module 511 acquires the electrical parameter of the energy module 2. The intelligent control module 512 controls, according to the electrical parameter, the voltage adjustment module 513 to adjust an output voltage of the energy module 2. In an example embodiment, the electrical acquisition module 5111 acquires the electrical parameter of the energy module 2. Specifically, the electrical acquisition module 5111 acquires the output voltage of the energy module 2 and the nominal voltage of the self-moving device 1. The nominal voltage of the self-moving device 1 is a voltage required for the self-moving device 1 to work. The intelligent control module 512 controls, according to the acquired output voltage, the voltage adjustment module 513 to adjust an actual output voltage of the energy module 2, to adjust the actual output voltage of the energy module 2 to the nominal voltage of the self-moving device 1. For example, the electrical acquisition module 5111 acquires that the output voltage of the energy module 2 is 26 V, and the voltage actually required for the circuit is 20 V, the intelligent control module 512 controls the voltage adjustment module 513 to reduce the output voltage of the energy module 2, to adjust the actual output voltage of the energy module 2 to 20 V.

In another specific implementation, the information acquisition module 511 acquires a battery level condition of each energy module 2. The intelligent control module 512 controls, according to the battery level condition, whether each energy module 2 works. For example, the automatic working system 500 includes three energy modules. Each energy module is one battery pack. A battery level of one of the three battery packs is 0, and the intelligent control module controls the battery pack with the battery level of 0 not to work.

In another specific implementation, the intelligent management platform 510 further includes a human-computer interaction module 517. The human-computer interaction module 517 is configured to transfer information between the energy module 2 and a user or between the self-moving device 1 and a user. Specifically, in an example embodiment, the human-computer interaction module 517 can obtain an instruction of the user in a manner such as prestored information or wireless communication. The intelligent control module 512 controls the status of the energy module 2 according to the information obtained by the human-computer interaction module 517. Specifically, in another embodiment, the human-computer interaction module 517 may send the status of the energy module 2 or the self-moving device 1 to the user in real time, or the intelligent control module 512 controls the human-computer interaction module 517 to selectively send the status of the energy module 2 or the self-moving device 1 to the user. Specifically, in an embodiment, the human-computer interaction module 517 includes a user setting interface. The user may directly use the interface to set that the energy module 2 executes different states in different periods of time or in different environments. In another embodiment, the human-computer interaction module 517 includes a wireless communication module. The user may communicate with the human-computer interaction module such as a mobile APP or Bluetooth by using a mobile apparatus. The user gives an instruction on the mobile apparatus and transfers the instruction to the human-computer interaction module 517 by using the wireless communication module. The intelligent control module 512 controls the status of the energy module 2 according to the instruction obtained by the human-computer interaction module. For example, the user may use the mobile APP to set a specific period of time for the energy module 2 to stop working and enter a sleep state. Alternatively, the intelligent control module 512 controls the human-computer interaction module 517 to send instant information of the energy module 2 or the self-moving device 1 to a mobile phone of the user.

In another specific implementation, as shown in FIG. 33, the intelligent management platform 510 may be disposed in the self-moving device 1. The self-moving device 1 includes the intelligent management platform 510 for intelligently manage the status of the energy module 2. The self-moving device 1 further includes a charging system. The charging system stores external electrical energy in the energy module 2. That is, the self-moving device 1 may be used as a charger to charge the energy module 2. The energy module 2 may alternatively power the self-moving device 1. The intelligent management platform 510 intelligently manages whether the energy module 2 are charged or discharged and a specific working status during charging or discharging. In other embodiments, the intelligent management platform 510 may be alternatively disposed at a position other than the self-moving device 1, for example, disposed on the charging station or at another position. In this embodiment, for example, the self-moving device 1 is an autonomous lawnmower. The self-moving device 1 includes a housing, a housing, a movement module, a control module, and a cutting module. The movement module, the control module, and the cutting module are assembled on the housing to form the body. The intelligent management platform 510 is disposed in the self-moving device 1. The intelligent control module 512 in the intelligent management platform 510 may be integrated with the control module on the self-moving device 1. For example, the function of the intelligent control module 512 is directly integrated on the control module. Certainly, an intelligent control module 512 independent from the control module may be separately disposed. In other embodiments, the self-moving device 1 may be alternatively an automatic snowplow, an automatic leaf blower, an automatic water sprinkler, a multifunctional machine, a robot cleaner or the like.

In the foregoing embodiments, the automatic working system 500 includes an information acquisition module 511 and an intelligent control module 512. The information acquisition module 511 acquires the related information of the energy module 2. The intelligent control module 512 controls the status of the energy module 2 according to the related information. In a specific embodiment, the energy module 2 is a battery pack. Specifically, one energy module 2 is one battery pack. The battery pack includes a self-moving device battery pack used on the self-moving device 1. The self-moving device battery pack is a battery pack on the self-moving device 1, and includes a battery pack newly inserted in the self-moving device, but does not include an unplugged battery pack. The information acquisition module 511 can acquire information about a change in a quantity or type of the self-moving device battery pack. The intelligent control module 512 controls the status of the self-moving device battery pack according to the information about the change.

In an embodiment, the automatic working system 500 includes a preset default program. When the quantity or type of the self-moving device battery pack changes, the intelligent control module 512 controls the status of the self-moving device battery pack according to the default program. Specifically, the default program includes a preset battery level threshold. When the quantity of the self-moving device battery packs is increased, the self-moving device battery pack includes an originally connected battery pack and a newly added battery pack. The originally connected battery pack is a battery pack that has originally been connected to the self-moving device when the quantity of the self-moving device battery packs is not increased. The newly added battery pack is a battery pack newly inserted in the self-moving device. The information acquisition module acquires a battery level of the newly added battery pack. The intelligent control module controls the status of the newly added battery pack according to a relationship between the battery level of the newly added battery pack and the battery level threshold. When the battery level is greater than the battery level threshold, the intelligent control module controls the newly added battery pack and the originally connected battery pack to be discharged together. When the battery level is not greater than the battery level threshold, the intelligent control module controls the newly added battery pack not to supply power. When the self-moving device returns to the charging station, the intelligent control module controls the newly added battery pack and the originally connected battery pack to be charged together. The "charged together" and "discharged together" mean that the newly added battery pack and the originally connected battery pack are simultaneously charged or discharged or are sequentially charged or discharged. Specifically, it is chosen that the newly added battery pack and the originally connected battery pack are simultaneously charged or discharged or are sequentially charged or discharged, a specific status of charging or discharging is selected. For example, in the case of sequential charging or discharging, a preference order is selected. In the case of simultaneous charging or discharging, for example, it is selected whether the self-moving device battery packs are connected in series or parallel, whether the self-moving device battery packs perform mutual charging, and whether the voltage needs to be increased. All these may be managed by the intelligent management platform according to the foregoing embodiments. The intelligent management platform intelligently manages a specific charging or discharging status of the newly added battery pack and the originally connected battery pack. When a total quantity of the self-moving device battery packs is not changed and only a battery pack is replaced with the same type of battery pack or another type of battery pack, the default program takes the newly inserted battery pack as the newly added battery pack and uses the default program in the foregoing embodiments to determine the status of the self-moving device battery pack.

Specifically, the default program further includes a preset battery pack working condition. When the quantity of the self-moving device battery packs is reduced, a remaining battery pack after the quantity of the self-moving device battery packs is reduced is referred to as a remaining battery pack. The information acquisition module 511 acquires related information of the remaining battery pack, the intelligent control module 512 controls the status of the remaining battery pack according to whether the related information of the remaining battery pack meets the preset battery pack working condition. Specifically, if the related information of the remaining battery pack meets the preset battery pack working condition, the remaining battery pack continues to supply power. If the related information of the remaining battery pack does not meet the preset battery pack working condition, the self-moving device returns for charging. Certainly, if the related information of the remaining battery pack does not meet the preset battery pack working condition, the self-moving device 1 may be controlled to stop in situ or stand by and wait for another time to charge the self-moving device 1 or use another manner to charge the self-moving device 1. When the related information of the remaining battery pack does not meet the preset battery pack working condition, the self-moving device returns for charging, including that the self-moving device automatically returns for charging, a user manually takes the self-moving device back to the charging station for charging, and the like. Specifically, the default program further includes a preset condition for a battery pack to automatically return for charging. The information acquisition module acquires whether the remaining battery pack satisfies the condition for automatic return for charging. If the preset condition for automatic return for charging is satisfied, the self-moving device automatically returns for charging. If the preset condition for automatic return for charging is not satisfied, for example, if a quantity of the remaining battery packs is zero or a voltage or a battery level of the remaining battery pack is insufficient, the self-moving device reminds the user. A manner in which the self-moving device reminds the user includes: raising an alarm, providing a reminder on an operation interface, using a manner such as wireless communication to send information indicating that the self-moving device cannot automatically return for charging to the user's mobile APP or the like.

When it is determined according to the default program that the remaining battery pack needs to be charged or discharged, the specific charging or discharging status of the remaining battery pack can still be managed by the intelligent management platform according to the foregoing embodiments. The intelligent management platform intelligently manages the specific charging or discharging status of the remaining battery pack. In this embodiment, the information acquisition module acquires information about a change in the quantity and type of the self-moving device battery packs, and inputs the information about the change into the default program. The intelligent control module 512 intelligently controls the status of the self-moving device battery pack according to the default program, to implement an intelligent self-moving device and automatic working system thereof.

In another embodiment, the automatic working system 500 may not include the default program, or a user does not select the default program. Instead, the human-computer interaction module is used to directly control the self-moving device 1 to perform an act. The human-computer interaction module 517 is configured to transfer information between the energy module 2 and the user or between the self-moving device 1 and the user. In this embodiment, the user uses the human-computer interaction module 517 to transfer an instruction of the user to the self-moving device 1. The intelligent control module 512 controls, according to the instruction of the user, the status of the energy module 2. Specifically, a user setting interface may be used to directly input the instruction of the user. The user setting interface includes buttons on the self-moving device 1, a mobile APP that can perform wireless communication with the self-moving device or the like. Specifically, some programs corresponding to the buttons or instructions on the mobile APP may be preset by using the self-moving device 1. For example, regardless of any factor, all the self-moving device battery packs are forcefully instructed to be discharged or charged or not to supply power together, or a designated self-moving device battery pack is forcefully instructed to be discharged or charged or not to supply power. When a corresponding instruction is given, the intelligent control module 512 controls a corresponding program to be turned on, and the self-moving device battery pack executes a corresponding state. In this embodiment, the information acquisition module 511 acquires the information about the change in the quantity and type of the self-moving device battery packs. The intelligent control module 512 intelligently controls the status of the self-moving device battery pack according to the information about the change, to implement an intelligent self-moving device and automatic working system thereof.

In a specific embodiment, when a battery pack is inserted in or unplugged from the self-moving device 1, the information acquisition module 511 acquires related information of the self-moving device battery pack, and the intelligent control module 512 intelligently controls the status of the self-moving device battery pack according to the related information. Specifically, when a battery pack is inserted into or unplugged from the self-moving device 1, the information acquisition module 511 acquires the information about the change in the quantity or type of the self-moving device battery packs, to make it convenient to directly use the default program to control an initial status of the self-moving device battery pack. In addition, the information acquisition module further acquires other related information such as an electrical parameter, a temperature or a humidity of the self-moving device battery pack, and the intelligent management platform 510 is used to further confirm a further status of the self-moving device battery pack. In this embodiment, when a battery pack is inserted into or unplugged from the self-moving device, the self-moving device uses the default program to control the initial status of the self-moving device battery pack, and the intelligent management platform 510 is combined to further confirm a specific status of the self-moving device battery pack, to eventually intelligently control the status of the self-moving device battery pack when a battery pack is plugged into or unplugged from the self-moving device.

In an implementation of the present invention, as shown in FIG. 46 to FIG. 50 and with reference to FIG. 1 to FIG. 39, in this embodiment, the automatic working system 100 is different from that in the foregoing embodiments only in the charging system. For the structure apart from the charging system of the automatic working system 100, reference may be made to the structure shown in FIG. 1 to FIG. 39. For example, in this embodiment, for the mechanical structure of the automatic working system 100, reference may be made to the mechanical structure in any embodiment shown in FIG. 1 to FIG. 39. Details are not described one by one again in this embodiment. In this embodiment, the automatic working system 100 includes a self-moving device 800, a charging station 8, an electric tool 9, and at least one energy module 2. The energy module 2 is selectively configured to power the self-moving device 800 or the electric tool 9. In other words, a user may selectively use the energy module 2 in the self-moving device 800 or the electric tool 9 to power a corresponding self-moving device 800 or electric tool 9. Further, the self-moving device 800 includes a charging system. The charging system is configured to store external electrical energy in the energy module 2. The energy module 2 may use the self-moving device 800 to store external electrical energy in the energy module 2. A source of the external electrical energy may be conventional utility power or may be electrical energy converted from solar energy or may be electrical energy converted from wind energy or the like. In this embodiment, the self-moving device 800 is an autonomous lawnmower. In other embodiments, the self-moving device 800 may be alternatively an automatic leaf blower, an automatic water sprinkler, a multifunctional machine or the like. In other embodiments, the self-moving device may be alternatively an indoor self-moving device such as a robot cleaner. The electric tool 9 is an electric tool other than the self-moving device 800, and is, for example, a gun drill, a hammer drill, a gardening electric tool, a trimmer or a hand-propelled lawnmower that is powered by a detachable battery pack. In another embodiment, the energy module 2 may further be selectively configured to power another electric device, for example, a home appliance. The electric device is an electric device other than the self-moving device 800. The electric tool 9, the home appliance, and the like may be generally referred to as electric devices.

Figure 46:
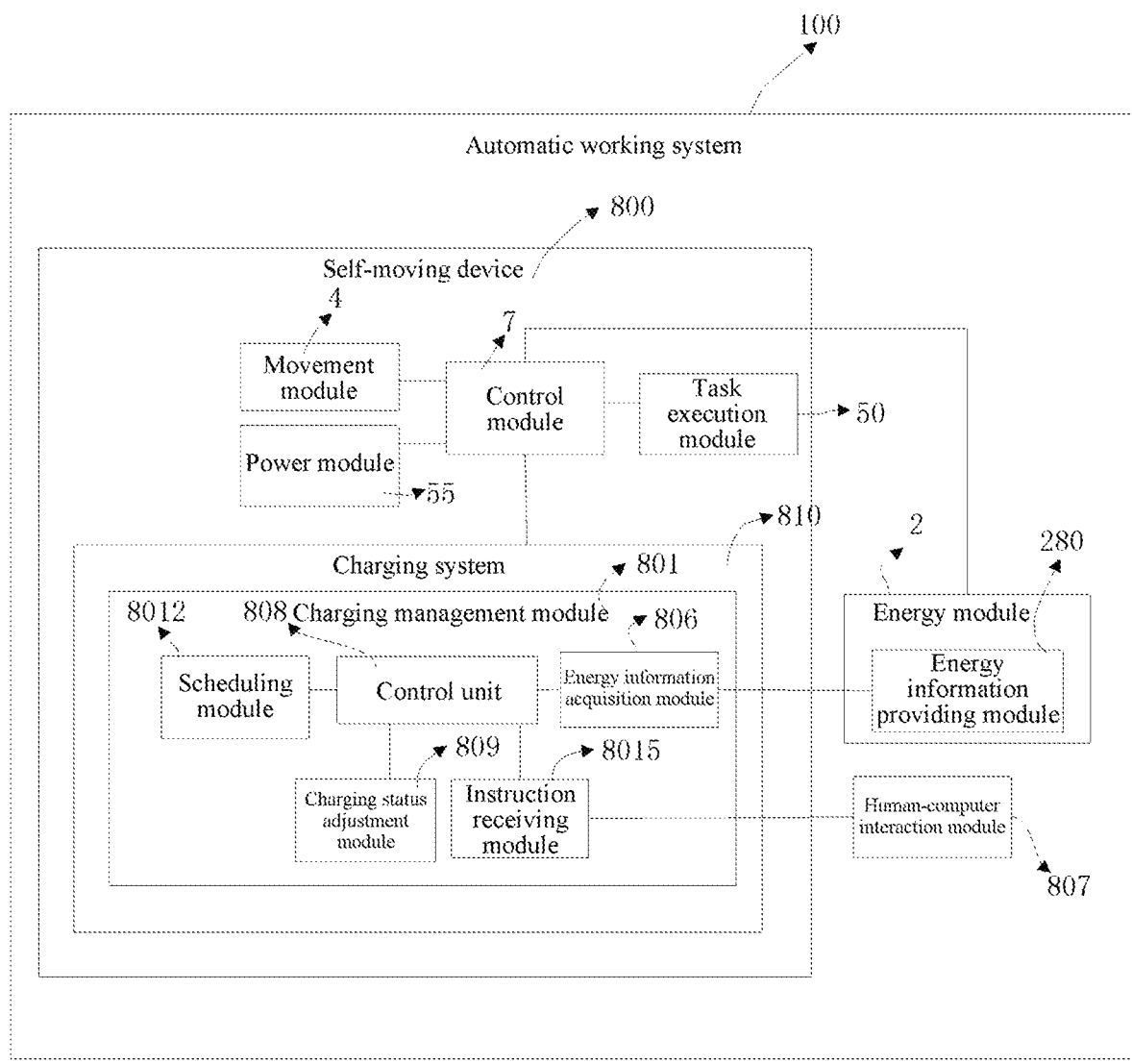
FIG. 46 is a schematic modular diagram of an automatic working system according to an embodiment of the present invention.

As shown in FIG. 46 and with reference to FIG. 1 to FIG. 9, the self-moving device 800 includes a body 10. The energy module 2 is detachably assembled on the body 10. "Detachably" means that the energy module 2 can be directly detached without needing to remove a fastener such as a screw, a nut or a pin. For example, the energy module 2 and the self-moving device 1 are docked by a connector, a wireless charging interface or the like, so that the energy module 2 and the self-moving device 1 can be conveniently undocked, to implement fast insertion of the energy module 2. Certainly, in other embodiments, a protective cover or the like fastened to the body 10 may be disposed outside the energy module 2, or even the protective cover and the body are fastened by a fastener such as a screw, a nut or a pin. The energy module 2 is "detachable" provided that fast insertion of the energy module 2 in the self-moving device 800 can be implemented. The self-moving device 800 includes a housing 3, a movement module 4 configured to drive the self-moving device 800 to move, a task execution module 50 configured to perform a work task, a power module 55 configured to power the movement module 4 and the task execution module 50, and a control module 7 configured to control the movement module 4 to drive the self-moving device 800 to move inside a defined working area and control the task execution module to perform the work task, and the like. The movement module 4, the task execution module 50, the control module 7, and the like are all disposed on the housing 3 to form the body 10. In this embodiment, the self-moving device 1 is an autonomous lawnmower. The task execution module 50 is a cutting module 5 performing a mowing task. The power module 55 includes a cutting motor configured to drive the cutting module 5 and a walking motor configured to drive the movement module. In other embodiments, the task execution module 50 may be a task execution module performing another work task. For example, when the self-moving device is an automatic snowplow, the task execution module of the self-moving device 800 is a snow removal module. In this embodiment, the control module 7 is electrically connected to the movement module 4, the cutting module 5, the energy module 2, and the like, to control the movement module 4 to drive the self-moving device 1 to move and control the cutting module 5 to perform a mowing task.

In this embodiment, as shown in FIG. 1 to FIG. 6, the energy module 2 is a battery pack, and the energy module 2 is detachably assembled in the self-moving device 800. The self-moving device 800 is powered by a detachable energy module 2. The charging system is configured to charge the detachable energy module 2. When the charging system is configured to charge the energy module 2 or the energy module 2 is configured to power the self-moving device 800, the energy module 2 is detachably assembled in the self-moving device 800. In a specific embodiment, one energy module 2 is a battery pack.

The self-moving device 800 further includes a self-moving device power interface 108 configured to be docked to the energy module 2 to charge the energy module 2 and/or power the energy module 2, the self-moving device power interface 108 is docked to the energy module 2, to enable the energy module 2 to be electrically connected to the self-moving device 800, to enable the self-moving device 800 to charge the energy module 2 or enable the energy module 2 to power the self-moving device 800. The self-moving device power interface 108 is the same as an electric tool power interface of an electric tool different from the self-moving device, to enable the energy module 2 to be selectively configured to power the self-moving device 800 or the electric tool 9. The self-moving device power interface 108 includes at least one of a quick-plug self-moving device connector 102 and a wirelessly rechargeable self-moving device charging interface. In this embodiment, for the mechanical structure of the self-moving device 800, reference may be made to the mechanical structure in any embodiment shown in FIG. 1 to FIG. 39. Details are not described one by one again in this embodiment.

As shown in FIG. 46 to FIG. 50, in this embodiment, a charging system 810 is configured to store external electrical energy in the energy module 2 to charge the energy module 2. The charging system 810 includes at least two charging modes for charging the energy module 2. In different charging modes, the charging system uses different charging logics and/or different charging parameters to charge the energy module 2. The charging system 810 includes a charging management module 801 configured to manage the charging modes, to enable the charging system 810 to use a corresponding charging mode to charge the energy module, that is, enable the charging system 810 to select a charging mode suitable for charging the energy module 2 from the at least two charging modes to charge the energy module 2, so that the charging system 810 can use a suitable charging logic and/or charging parameter to charge the energy module 2.

In an embodiment, the charging system 810 includes at least two charging modes. Each charging mode is used to match one of at least two different types of energy modules 2, to enable the charging system 810 to use a corresponding charging mode to charge the at least two different types of energy modules 2. Different types of energy modules 2 are categorized according to at least one manner of a manufacturer, a model, a used material, a shape, a size, a capacity, a cell type, a structure, and the like. The energy modules 2 have different types. For example, in the two energy modules 2, one cell is produced by Samsung, and the other cell is produced by Sony. It is therefore considered that the two energy modules 2 have different types. For another example, in the two energy modules 2, one is 1P, and the other is 2P. It is also considered that the two energy modules 2 have different types. For another example, in the two energy modules 2, one has a full voltage of 20 V, and the other has a full voltage of 36 V. It is therefore considered that the two energy modules 2 have different types. In an embodiment, in the at least two charging modes, different charging parameters are separately used to charge the energy module 2, to enable the charging system 810 to use a corresponding charging parameter to charge the energy module 2, that is, enable the charging system 810 to select a suitable charging parameter to charge the energy module 2. For example, according to the full voltage of the energy module 2, a corresponding charging voltage for charging the energy module 2 is selected.

Alternatively, a corresponding charging current for charging the energy module 2 is selected according to a maximum bearable charging current of the energy module 2. For example, when a battery pack has a higher capacity, a relatively high charging current may be selected to reduce a charging time for a high-capacity battery pack. Alternatively, a corresponding temperature range for normally charging the energy module 2 is selected according to the type of the energy module 2. Specifically, the corresponding temperature range may be selected according to a cell type of the energy module 2. For example, if a cell of the energy module 2 is from Samsung, the energy module 2 is controlled to be normally charged in a temperature range of 0° C. to 50° C., and charging stops when the temperature exceeds 50° C. If a cell of the energy module 2 is from Sony, the energy module 2 is controlled to be normally charged in a temperature range of 0° C. to 55° C., and charging stops when the temperature exceeds 55° C. Certainly, after the temperature range is selected according to the cell type of the energy module 2, the temperature range may further be selected according to the structure of the energy module 2. For example, if a cell of the energy module 2 is a Sony cell, the structure of the energy module 2 is further considered. Specifically, when the energy module 2 is a 2P battery pack, the energy module 2 is controlled to be normally charged in the temperature range of 0° C. to 55° C., and charging stops when the temperature exceeds 55° C. If the energy module 2 is a 1P battery pack, the energy module 2 is controlled to be normally charged in the temperature range of 0° C. to 50° C., and charging stops when the temperature exceeds 55° C. Certainly, the foregoing specific temperature restriction is only an example, and is specifically determined according to an actual case.

In another embodiment, the charging system 810 includes at least two energy modules 2 charged by a charging system. The charging system 810 includes at least two charging modes. Each charging mode uses one of at least two different charging orders to charge the energy module, to enable the charging system to use a corresponding charging order to charge the energy module. Specifically, the types of the charging order include sequential charging and an order of sequential charging, simultaneous charging and a manner of simultaneous charging (for example, series charging or parallel charging), a combination of sequential charging and partially simultaneous charging and a specific manner of combination (for example, for charging of three battery packs, one battery pack is charged first, and the remaining two battery packs are simultaneously charged), and the like. Certainly, the foregoing is only an example. A specific charging order may be set according to an actual case, and is not limited to the foregoing specific form.

In another embodiment, the charging system 810 may combine the foregoing two embodiments. That is, the charging system 810 includes two charging modes. Each charging mode is used to match one of the at least two different types of energy modules 2. The charging system 810 further includes two more charging modes. Each charging mode uses one of at least two different charging orders to charge the energy module.

In other embodiments, the charging system 810 may include other different charging modes. For example, each charging mode uses different charging logics for charging or each charging mode uses different charging parameters to perform charging, which is specifically set according to an actual case. Examples are not described one by one herein.

In this embodiment, when the self-moving device 800 is powered on or when a quantity of the energy modules 2 changes, the charging management module 801 automatically adjusts a charging mode of the charging system 810, so that when the charging system 810 is powered on or when the quantity of the energy modules 2 changes, a corresponding charging mode is automatically selected to charge the energy module. Certainly, in other embodiments, the charging management module 801 may also monitor the self-moving device 800 and the status of the energy module 2 in real time, to adjust the charging mode of the charging system in real time. Alternatively, a manner such as manual adjustment is used, so that the charging mode is manually adjusted at any time according to a user requirement.

Specifically, the charging management module 801 adjusts the charging mode in various manners, for example, an automatic adjustment manner or a manual adjustment manner.

As shown in FIG. 46, in a specific embodiment, the charging management module 801 may adjust the charging mode in an automatic adjustment manner. Specifically, the charging management module 801 includes an energy information acquisition module configured to acquire the related information of the energy module 2 and a control unit 808 configured to control, according to the related information of the energy module 2, the charging system to use a corresponding charging mode to charge the energy module 2. In this embodiment, the related information of the energy module 2 includes one or more pieces of quantity information, type information, temperature information, voltage information, capacity information, battery level information or the like of the energy module 2. Certainly, the foregoing pieces of related information are only examples. In other embodiments, any information related to the energy module 2 may be referred to as the related information of the energy module 2, for example, whether the energy module 2 exists (that is, whether there is a vacancy), the electrical parameter of the energy module 2, and the environmental parameter of the energy module 2. The electrical parameter of the energy module 2 includes an electrical parameter of the energy module 2 itself and an electrical parameter of a circuit in which the energy module 2 is located. The electrical parameter of the energy module 2 includes voltages, currents, powers, battery pack types, battery levels, the quantities of times of charging or discharging, battery internal resistances, and single-battery voltages of the energy module 2 and the circuit in which the energy module 2 is located and a status of the energy module 2, and the like.

The energy module 2 includes an energy information providing module 280 configured to provide the related information of the energy module 2, and an energy information acquisition module 806 configured to acquire information provided by the energy information providing module 280. The energy information acquisition module 806 may recognize the energy information providing module 280 in the conventional recognition manner to acquire information provided by the energy information providing module 280. For example, an electrical connection manner is used to recognize the information provided by the energy information providing module 280 or a communication manner may be used to communicate with the energy information providing module 280 to acquire information provided by the energy information providing module 280.

In an implementation, the energy information acquisition module 806 recognizes related information of the energy module in the conventional recognition manner. Specifically, the energy information providing module 280 includes at least one of a recognition electrode, a sensor, a reed switch, a recognition resistor, and the like. Specifically, the related information of the energy module 2 may be recognized in the following manner. In an embodiment, one recognition electrode is added to the battery pack to be connected to an electrode of an electrode base. A recognition electrode on a battery pack is recognized to recognize related information of the battery pack. The recognition electrode may also be referred to as the energy information providing module 280. The energy information acquisition module 806 is located on the self-moving device and is configured to acquire the information provided by the energy information providing module 280. In another embodiment, sensors such as Hall sensors or photoelectric switch sensors may be used to recognize different battery packs, and sensors mounted at different positions to recognize different battery packs. For example, a sensor corresponding to a first battery pack is mounted at a first position, and a sensor corresponding to a second battery pack is mounted at a second position. The self-moving device separately senses a sensor corresponding to the first or second position to recognize a battery pack. For example, the first battery pack is determined when the first position is sensed. The foregoing sensor located on the battery pack may be referred to as the energy information providing module 280, and the energy information acquisition module 806 is located on the self-moving device and is configured to acquire the information provided by the energy information providing module 280. In another embodiment, reed switches are used to recognize different battery packs. A magnetic component is mounted on the electrode base. Reed switches are mounted at different positions of different battery packs. When there is magnetic inductance, two contacts of a reed switch are closed, so as to recognize different battery packs. The reed switch may also be referred to as the energy information providing module 280. The energy information acquisition module 806 is located on the self-moving device and is configured to acquire the information provided by the energy information providing module 280. In another embodiment, resistors are used to recognize different battery packs. One recognition resistor is provided inside the self-moving device 800. There is also one recognition resistor in the interior of the battery pack. Voltage-division sampling is performed to recognize a resistance. Different battery packs have different resistances, so that different sampling voltages of different battery packs are detected, and a connected battery pack is determined according to a corresponding sampling voltage. The recognition resistor may also be referred to as the energy information providing module 280. In the foregoing embodiments, the device includes a self-moving device and an electric device powered by the energy module 2. The energy information acquisition module 806 is located on the self-moving device and is configured to acquire information provided by the energy information providing module 280. In other embodiments, the energy information acquisition module 806 may be alternatively in another form, provided that the function of recognizing the device information can be implemented. The foregoing embodiments is only an example for description.

In another implementation, the energy information acquisition module 806 may also acquire related information of the energy module in a communication manner. Specifically, the energy information acquisition module 806 and the energy information providing module 280 may implement communication in a manner such as wired communication or wireless communication. The self-moving device 800 uses the energy information acquisition module 806 to communicate with the energy module 2, to acquire related information of the energy module 2. In this embodiment, a communication manner is used to acquire the related information of the energy module 2, so that the acquired information of the energy module 2 is more comprehensive, instead of recognizing only relatively simple information of the energy module 2. In this embodiment, in a communication manner, whether the energy module 2 exists (that is, whether there is a vacancy), a quantity, type information, an electrical parameter (for example, temperature information, voltage information, capacity information or battery level information) of the energy module 2, and the environmental parameter (for example, a temperature or a humidity of the energy module 2), and the like may be acquired, and in addition, information such as a delivery date, a repair condition, a use record of the energy module 2 may further be acquired, and other information stored in the energy module 2 may also be acquired, so that the information acquired by the self-moving device 800 is more complete and precise. After acquiring the related information of the energy module 2, the self-moving device 800 may further display the related information on a user interface or on another user terminal such as a user's mobile phone, a computer or a remote control that can communicate with the self-moving device 800. For example, the self-moving device 800 automatically acquires an electrical parameter, type information, environment information, quantity information, a repair condition, a use record, and the like of the energy module 2, and the related information is then sent to the user's mobile APP for the user to browse related conditions of the energy module 2. Specifically, in an embodiment, an information acquisition method may include the following steps: The self-moving device 800 is turned on and powered up. The self-moving device 800 and the energy module 2 use the energy information acquisition module 806 and the energy information providing module 280 to send handshake information and establish a communication connection. The control module 7 of the self-moving device 800 sends a data frame in a specific format. The energy module 2 uses a specific data frame to feed back the related information of the energy module. The control module 7 parses the data frame fed back by the energy module 2 to obtain the related information of the energy module 2 to perform various control of the entire machine or use the human-computer interaction module to present the related information to the user. Certainly, in other embodiments, another form may be used to implement communication. The foregoing specific embodiment is only an example.

In this embodiment, when the self-moving device 800 is powered on, the energy information acquisition module 806 automatically acquires at least one piece of quantity information and type information of the energy module 2. The control unit 808 controls, according to at least one piece of the quantity information and type information of the energy module 2, a charging mode for charging the energy module 2 by the charging system 810. That is, when the self-moving device 800 is powered on, the charging system 810 is controlled to automatically select a suitable charging mode to charge the energy module 2. After the self-moving device 800 is powered on, the energy information acquisition module 806 continuously acquires the quantity information of the energy module 2. When a quantity of the energy modules 2 changes, the charging management module 801 adjusts in real time a charging mode for charging the energy module 2. After a suitable charging mode is selected, the energy information acquisition module 806 continues to keep acquiring the related information of the energy module 2. For example, the energy information acquisition module 806 acquires one or more pieces of a quantity, a current temperature, a voltage value, a remaining battery level value, and the like of the energy module 2 in real time. The control unit 808 controls, according to the related information acquired by the energy information acquisition module 806, a charging status of charging the energy module 2 by the charging system 810. The charging status is at least one of whether charging is performed, a charging order, a charging current, a charging voltage, a charging power, a charging battery level, a charging time, and the like. That is, the energy information acquisition module 806 keeps acquiring a real-time status of the energy module 2. The control unit 808 controls in real time, according to the real-time status of the energy module 2, the charging status of charging the energy module 2 by the charging system 810, for example, controls whether to charge the energy module 2, and selects the magnitude of the charging current, charging voltage or charging power, a charging cutoff battery level, charging duration, and the like. Specifically, the charging management module further includes a charging status adjustment module 809 configured to adjust the charging status of the energy module 2. The control unit 808 controls, according to the related information of the energy module 2 acquired by the energy information acquisition module 806, the charging status adjustment module to adjust the charging status of the energy module 2. Specifically, the charging status adjustment module 809 includes at least one of a charging current adjustment module configured to adjust the charging current of the energy module 2, a charging battery level management module configured to adjust the charging battery level of the energy module 2, a charging power management module configured to adjust the charging power of the energy module 2, and the like. Certainly, the specific charging current adjustment module, charging battery level management module, and charging power management module, and the like may be integrated into one overall module or may be alternatively separately disposed as an independent module.

Figure 47:
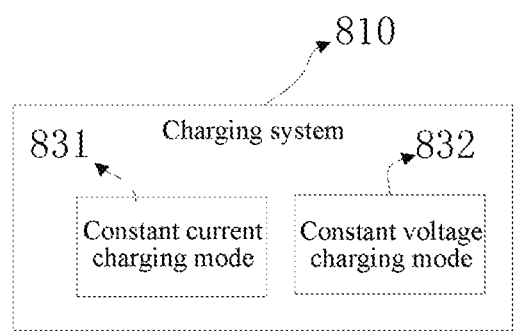
FIG. 47 is a schematic modular diagram of a charging system according to an embodiment of the present invention.

As shown in FIG. 46 and FIG. 47, in an embodiment, the charging modes include at least one of a constant current charging mode 831 using a constant charging current to charge the energy module 2 and a constant voltage charging mode 832 of using a constant charging voltage to charge the energy module 2. The constant current means that the charging current value is an approximate constant value but is not required to be absolutely constant. Similarly, the constant voltage means that a charging voltage value is an approximate constant value but is not required to be absolutely constant. When the charging system 810 uses the constant current charging mode 831 to charge the energy module 2, that is, in the constant current charging mode 831, the control unit 808 automatically selects, according to the related information of the energy module 2, for example, according to the information such as the type information or maximum rechargeable current of the energy module 2, a charging current used by the charging system 810 to charge the energy module 2. For example, when the battery pack has a higher capacity, the battery pack has a larger maximum rechargeable current. In this case, when a large current is selected to charge a battery pack, the time of charging a high-capacity battery pack can be reduced. Specifically, the control unit 808 may adjust a charging power and/or a charging voltage for charging the energy module 2 by the charging system 810 to adjust a charging current, to enable the charging system to adjust the charging current to a constant charging current suitable for charging the energy module 2, so that the charging system 810 selects a corresponding constant charging current to charge the energy module 2. When the charging system 810 uses the constant voltage charging mode 832 to charge the energy module 2, in the constant voltage charging mode 832, the control unit 808 automatically selects, according to the related information of the energy module 2, for example, according to the type information of the energy module 2, the voltage information of the energy module 2 or the like, a charging voltage for charging the energy module 2 by the charging system.

In an embodiment, the charging system 810 includes both the constant current charging mode 831 and the constant voltage charging mode 832. The energy information acquisition module 806 is configured to acquire the current information of the energy module 2, and control, according to the current information of the energy module 2, the charging system 810 to select to use one of the constant current charging mode 831 and the constant voltage charging mode 832 to charge the energy module 2. For example, the energy information acquisition module 806 is configured to acquire a current voltage value of the energy module 2. The control unit 808 controls, according to the current voltage value of the energy module 2, the charging system 810 to select to use one of the constant current charging mode 831 and the constant voltage charging mode 832 to charge the energy module 2.

In another specific embodiment, as shown in FIG. 46, the charging system 810 may adjust a charging mode in a manual adjustment manner. Specifically, the automatic working system 100 further includes a human-computer interaction module 807 configured to adjust a charging mode for charging the energy module 2 by the charging system 810. The human-computer interaction module 807 includes a user interface disposed on the self-moving device 800 and/or a user terminal that can communicate with the self-moving device 800, for example, a mobile phone, a computer or a remote control that can communicate with the self-moving device 800. A user may perform an operation on the user interface or the user terminal to adjust a charging mode. The self-moving device 800 includes an instruction receiving module 8015 and a control unit 808. The instruction receiving module 8015 is configured to receive an instruction for adjusting the charging mode for charging the energy module 2 by the charging system 810. The control unit 808 is configured to adjust, according to the instruction, the charging mode for charging the energy module 2 by the charging system 810. The human-computer interaction module 807 is configured to send the instruction for adjusting the charging mode for charging the energy module 2 by the charging system 810.

In an embodiment, the human-computer interaction module 807 adjusts a charging parameter and/or charging logic for charging the energy module 2 by the charging system 810, to adjust a charging mode. Specifically, the foregoing instruction includes an adjustment instruction for adjusting the charging parameter and/or charging logic for charging the energy module 2 by the charging system 810. The human-computer interaction module 807 is configured to send the adjustment instruction. The instruction receiving module 8015 is configured to receive the adjustment instruction. The control unit 808 adjusts, according to the adjustment instruction, the charging mode for charging the energy module 2 by the charging system. For example, a user uses a mobile APP to directly adjust the charging parameter for charging the energy module 2 by the charging system 810. For example, the mobile APP is used to directly set a charging current, a charging voltage, a charging cutoff temperature, a charging cutoff battery level, a charging time, and the like. The mobile APP sends an adjustment instruction for adjusting the charging current, the charging voltage, the charging cutoff temperature, the charging cutoff battery level, the charging time, and the like of the energy module 2. The instruction receiving module 8015 receives the adjustment instruction. Certainly, the mobile APP may be alternatively used to directly set and send the adjustment instruction for adjusting the charging logic. The instruction receiving module 8015 receives the adjustment instruction, for example, a charging order for adjusting the energy module 2. For example, there are a total of three battery packs. The mobile APP is used to directly adjust which of the three battery packs is charged first or charged next, series charging or parallel charging or the like. The human-computer interaction module may be used, and the adjustment instruction for adjusting the charging parameter and charging logic is simultaneously sent. The instruction receiving module 8015 receives the adjustment instruction. For example, there are a total of three battery packs. The mobile APP is directly used to adjust a charging parameter, charging order or the like corresponding to each battery pack. In an embodiment, for example, the human-computer interaction module 807 is used to set a charging cutoff battery level of each battery pack. The control unit 808 controls the charging system 810 to charge each battery pack and keeps detecting whether a current battery level of a battery pack is the same as a set battery level. If the current battery level is the same as the set battery level, the charging system 810 stops charging the current battery pack. Certainly, only an example in which the human-computer interaction module 807 is a mobile APP is used. In other embodiments, an operation may be alternatively performed on the user interface or another user terminal on the self-moving device 800.

In another embodiment, the human-computer interaction module 807 may alternatively directly adjust a charging mode in a manner of switching between preset charging modes. Specifically, the self-moving device 800 presets a plurality of preset charging modes for charging the energy module 2. An instruction sent by the human-computer interaction module 807 includes a switching instruction for switching between the preset charging modes. The instruction receiving module 8015 receives the switching instruction. The control unit 808 controls, according to the switching instruction, the charging system 810 to use a corresponding preset charging mode to charge the energy module 2. For example, a switching key for switching a charging mode is disposed on the user interface, a user's mobile APP or the like on the self-moving device 800. The user may use the switching key to manually switch between the preset charging modes.

Figure 50:
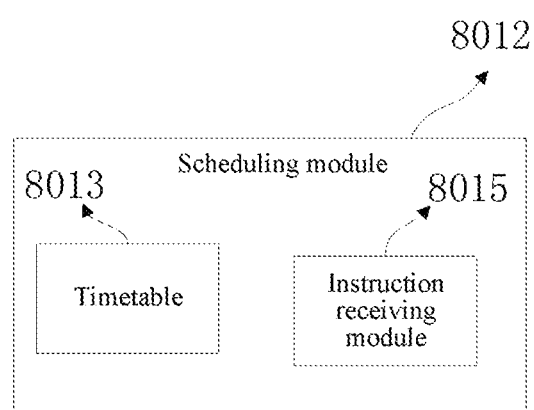
FIG. 50 is a schematic modular diagram of a scheduling module according to an embodiment of the present invention.

As shown in FIG. 46 and FIG. 50, in another embodiment, the self-moving device 800 presets a plurality of preset charging modes for charging the energy module 2. The charging management module 801 further includes a scheduling module 8012. The scheduling module 8012 is configured to plan a time arrangement in which the charging system uses the preset charging modes. The control unit 808 controls the charging system 810 to charge the energy module 2 according to the plan of the scheduling module 8012, to enable the charging system 810 to charge the energy module 2 according to a corresponding preset charging mode at a corresponding time. For example, the charging system includes a first preset charging mode and a second preset charging mode. The scheduling module 8012 is configured to plan the time when the charging system uses the first preset charging mode and the second preset charging mode. For example, the scheduling module plans to use the first preset charging mode in the daytime and use the second preset charging mode in the nighttime. For another example, the first preset charging mode is used on a workday and the second preset charging mode is used at the weekend.

Specifically, the scheduling module 8012 may preset, in a manner of preset timetable, to use a time arrangement of preset charging modes or may use a manner of memorizing a habit of a user to generate the timetable representing the time arrangement of the preset charging modes. In an embodiment, the scheduling module 8012 includes a preset timetable 8013 representing the time arrangement of using the preset charging modes by the charging system 810. The control unit 808 controls the charging system 810 to charge the energy module 2 according to the plan of the scheduling module 8012, to enable the charging system 810 to charge the energy module 2 according to a corresponding preset charging mode at a corresponding time. For example, when the self-moving device 800 is delivered from the factory, the timetable 8013 is preset according to a regular habit of the user obtained through statistics. The control unit 808 controls, according to the timetable 8013, the charging system 810 to charge a charging mode of the energy module 2. In another embodiment, the scheduling module 8012 is configured to memorize a habit of using the preset charging modes by the self-moving device 800, and generate, according to the memorized content, the timetable 8013 representing the time arrangement of using the preset charging modes by the charging system 810. The control unit 808 controls, according to the plan of the scheduling module, the charging system 810 to charge the energy module 2, to enable the charging system 810 to charge the energy module 2 according to a corresponding preset charging mode at a corresponding time. For example, the scheduling module 8012 automatically memorizes a use habit of the user in one month, that is, records, within one month, a time distribution of using the preset charging modes by the self-moving device 800, and automatically collects statistics to generate a corresponding pattern to form the timetable 8013. The control unit 808 automatically controls, according to the generated timetable 8013, the charging system 810 to charge the charging mode of the energy module 2, to enable the charging system 810 to charge the energy module 2 according to a corresponding preset charging mode at a corresponding time.

In another embodiment, the foregoing embodiments having the scheduling module 8012 may be combined with the embodiment having the human-computer interaction module 807. For example, the human-computer interaction module 807 is configured to send an instruction for representing the timetable 8013. The timetable is used to plan the charging system 810 to charge a time arrangement of the charging mode of the energy module 2. A user plans the time arrangement of the charging mode by using the human-computer interaction module 807. The scheduling module 8012 further includes an instruction receiving module. The instruction receiving module 8015 is configured to receive the foregoing instruction for representing the timetable. The control unit 808 is configured to control, according to the foregoing instruction, the charging system 810 to charge the charging mode of the energy module 2, to enable the charging system 810 to charge the energy module 2 at a corresponding time according to a corresponding preset charging mode set by the user.

In a specific embodiment, the self-moving device 800 presets a plurality of preset charging modes for charging the energy module 2. The control unit 808 is configured to control the charging system 810 to use a corresponding preset charging mode to charge the energy module 2.

Figure 48:
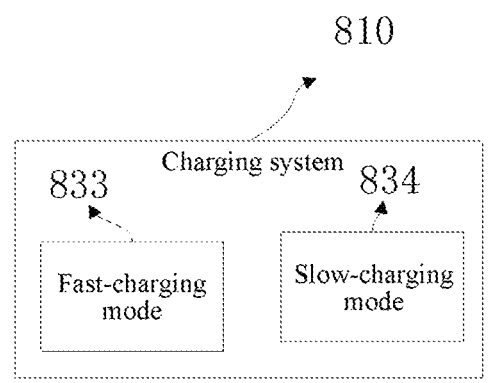
FIG. 48 is a schematic modular diagram of a charging system according to an embodiment of the present invention.

As shown in FIG. 46 to FIG. 48, in an embodiment, the preset charging modes may be categorized into a fast-charging mode 833 and a slow-charging mode 834 according to a charging speed. That is, the preset charging modes include the fast-charging mode 833 for rapidly charging the energy module 2 and the slow-charging mode 834 for slowly charging the energy module 2. Specifically, when a user needs to frequently change the energy module 2 during working, the fast-charging mode 833 is selected to perform charging. When the user does not urgently need to use the energy module 2, the slow-charging mode 834 is selected to perform charging. For example, at the weekend, the user needs to use the energy module 2 to power the electric tool 9, for example, power a gun drill or another electric tool 9 with high power discharge. The energy module 2 often runs out before work is completed. In this case, the charging management module 801 is used to manage that the self-moving device 800 uses the fast-charging mode 833 to perform charging. On a non-workday, the user does not urgently need to use the energy module 2 or the energy module 2 is only used for conventional mowing of an autonomous lawnmower, it is not necessary to use the fast-charging mode 833 to perform charging, but the slow-charging mode 834 is used instead to perform charging, thereby extending the service life of the energy module 2.

The charging management module 801 is configured to control the charging system 810 to use a corresponding preset charging mode to charge the energy module 2. Specifically, the charging management module 801 may adjust the charging speed in several manners in the following.

In an implementation, the charging management module 801 may control a charging current for the charging system 810 to charge the energy module 2, to adjust the charging speed of the charging system 810. Specifically, both the fast-charging mode 833 and the slow-charging mode 834 include using a constant charging current to charge the constant current charging mode 831 of the energy module 2. In the constant current charging mode 831 in the fast-charging mode 833, the charging management module 801 increases the charging current for the charging system 810 to charge the energy module 2, to increase the charging speed of the charging system. That is, in the constant current charging mode 831 in the fast-charging mode 833, a charging current for charging the energy module 2 by the charging system 810 is greater than a charging current in the constant current charging mode 831 in the slow-charging mode 834, to increase the charging speed in the fast-charging mode 833.

The fast-charging mode 833 and/or the slow-charging mode 834 may include only the constant current charging mode 831, that is, only use the foregoing constant current mode to perform charging; or may include both the constant current charging mode 831 and the constant voltage charging mode 832, that is, use a manner combining the constant current charging mode 831 and the constant voltage charging mode 832 to perform charging. In other words, in a process of charging the energy module 2 having an insufficient battery level until the energy module 2 is fully charged, the fast-charging mode 833 and/or the slow-charging mode 834 separately includes a constant current charging stage of performing charging using the constant current charging mode 831 and a constant voltage charging stage of performing charging using the constant voltage charging mode 832. In the fast-charging mode 833 and/or the slow-charging mode 834, the charging management module 801 controls the charging system 810 to automatically select, according to the current voltage value of the energy module, to use the constant current charging mode 831 or the constant voltage charging mode 832 to charge the energy module 2. In this case, the fast-charging mode 833 and/or the slow-charging mode 834 increases a charging current thereof only in the constant current charging mode 831 thereof to increase the charging speed in the constant current charging mode 831. Certainly, in other embodiments, in the fast-charging mode 833 and/or the slow-charging mode 834, the charging speeds in the constant current charging mode 831 and the constant voltage charging mode 832 may both be increased, to increase the charging speed of charging the energy module 2 by the charging system 810.

Specifically, in an embodiment, the fast-charging mode 833 and the slow-charging mode 834 both have the foregoing constant current charging stage of performing charging using the constant current charging mode 831 and a constant voltage charging stage of performing charging using the constant voltage charging mode 832. The charging management module 801 controls the charging system 810 to automatically select, according to the current voltage value of the energy module, to use the constant current charging mode 831 or the constant voltage charging mode 832 to charge the energy module 2. With the same energy modules 2 charged by the charging system 810, for example, with the same type and quantity of the energy modules 2, a charging current of the constant current charging stage in the fast-charging mode 833 is greater than a charging current of the constant current charging stage in the slow-charging mode 834, so that a charging speed in the fast-charging mode 833 is greater than a charging speed in the slow-charging mode 834. In the fast-charging mode 833, the charging management module 801 increases the charging current for charging the energy module 2 by the charging system 810, to increase the charging speed of the charging system.

In another implementation, when the charging system 810 simultaneously charges at least two energy modules 2, the charging management module 801 controls the charging system 810 to intelligently adjust in real time a charging current for charging each energy module 2, to enable the charging system 810 to keep using a high power to charge the energy module 2, to increase the charging speed of charging the battery levels of all the energy modules 2 to target values.

In another implementation, the charging management module 801 controls the charging system 810 to first charge one of the energy modules 2, to increase the charging speed for the single energy module 2 that is first charged.

Figure 49:
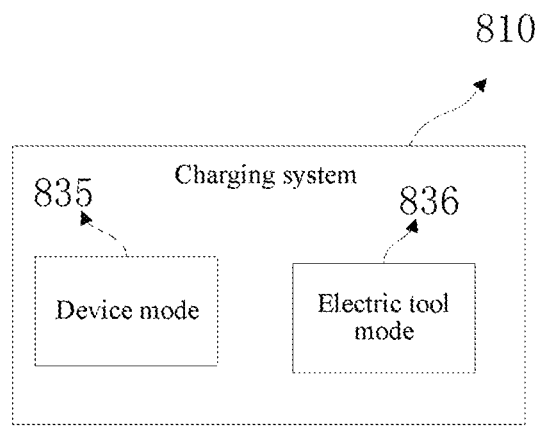
FIG. 49 is a schematic modular diagram of a charging system according to an embodiment of the present invention.

In another specific embodiment, as shown in FIG. 49, the charging mode may further be categorized into a device mode 835 and an electric tool mode 836 according to use. The device mode 835 means that the energy module 2 is charged for powering the self-moving device 800. That is, in the device mode 835, the charging system 810 charges the energy module 2 to satisfy a requirement for powering the self-moving device 800. The electric tool mode 836 means that the energy module 2 is charged to power the electric tool 9. That is, in the electric tool mode 836, the charging system 810 charges the energy module 2 to satisfy a requirement for powering the electric tool 9. When the energy module 2 is configured to power the self-moving device, the energy module 2 generally needs to be shallowly charged or shallowly charged, to implement simultaneous mowing and charging, and a battery pack is not prone to damage. When the energy module 2 is configured to power the electric tool 9, because the battery level of the electric tool 9 is rapidly consumed, it is necessary to rapidly charge the battery levels of the energy modules 2 to a relatively high state, thereby preventing an insufficient battery level from stopping the work.

In this embodiment, a device charging cutoff battery level and an electric tool charging cutoff battery level are preset, in the device mode 835, the charging system 810 charges the charging cutoff battery level of the energy module 2 to the device charging cutoff battery level, and in the electric tool mode 836, the charging system 810 charges the charging cutoff battery level of the energy module 2 to the electric tool charging cutoff battery level. Specifically, the device charging cutoff battery level is 80% to 90%, and the electric tool charging cutoff battery level is 90% to 100%. That is, in the device mode 835, the charging cutoff battery level of the energy module 2 by the charging system 810 is 80% to 90%, to satisfy a requirement for powering the self-moving device 800 by the energy module 2. In the electric tool mode 836, the charging cutoff battery level of the energy module 2 by the charging system 810 is 90% to 100%, to satisfy a requirement for powering an electric tool by the energy module 2. Further, the charging mode further includes the fast-charging mode 833 and the slow-charging mode 834 in the foregoing embodiments, in the device mode 835, the charging system 810 uses the slow-charging mode 834 to charge the energy module 2, to extend the service life of the energy module 2. In the electric tool mode 836, the charging system 810 uses the fast-charging mode 833 to charge the energy module 2, to enable the energy module 2 to be rapidly fully charged when the battery level is insufficient, thereby sticking to a working progress.

Many electric tools need to be powered by at least two battery packs, in particular, at present, many electric tools are powered by a dual-pack (dual-battery pack) platform, that is, are powered by two battery packs of 20 V. Therefore, when the self-moving device 800 is used as a charging platform for charging a battery pack of an electric tool, the self-moving device 800 needs to be able to simultaneously charge at least two battery packs. To achieve the foregoing objective, the following implementation may be used.

In an implementation, as shown in FIG. 5 and FIG. 6 and FIG. 12 to FIG. 15, the self-moving device 800 includes at least two self-moving device power interfaces 108 docked to the energy module 2, to enable the self-moving device to simultaneously charge at least two energy modules 2, that is, simultaneously power at least two battery packs 2, to satisfy that a charged battery pack can be configured to power an electric tool for powering two or more packs (a plurality of battery packs).

Figure 42:
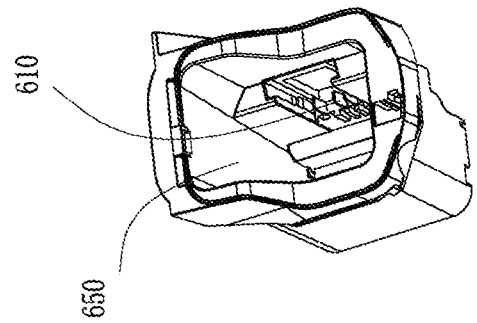
FIG. 42 is a three-dimensional view of the charging member shown in FIG. 40 with a charging member cover removed.
Figure 41:
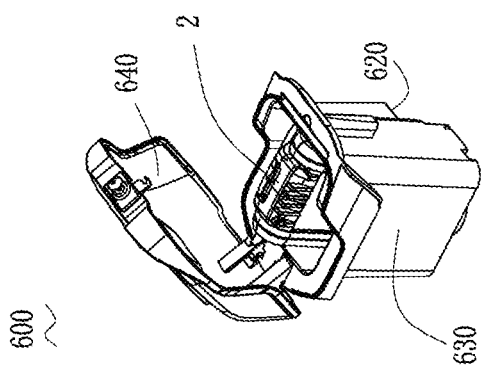
FIG. 41 is a three-dimensional view of a charging member and an energy module shown in FIG. 40 being assembled.
Figure 40:
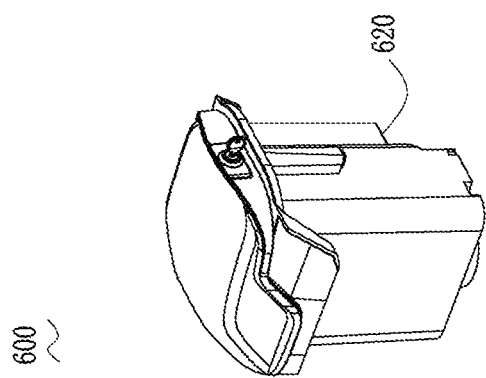
FIG. 40 is a three-dimensional view of a charging member according to an embodiment of the present invention.

In another implementation, as shown in FIG. 40 to FIG. 45 and with reference to FIG. 1 to FIG. 9, the self-moving device 800 includes at least one self-moving device power interface 108 configured to be docked to the energy module 2. The automatic working system 100 further includes a charging member 600 configured to accommodate at least one energy module 2. The charging member 600 includes a charging member interface 610 electrically connected to the energy module 2 and a charging member adaptation interface 620 electrically connected to the self-moving device 800. The charging member 600 and the specific structure adapting to the charging member 600 on the self-moving device 800 are not limited. For example, as shown in FIG. 40 to FIG. 42, in an embodiment, the charging member 600 includes a charging member accommodating cavity 650 configured to accommodate the energy module 2, a charging member wall portion 630 surrounding the accommodating cavity 650, and a charging member cover 640. The charging member interface 610 is accommodated in the charging member accommodating cavity 650. The self-moving device 800 further includes a device adaptation interface 106 configured to be electrically connected to the charging member adaptation interface 620, a device cavity 1061 accommodating the charging member 600, and a device cover 1060 configured to protect the device adaptation interface 106. In other embodiments, the charging member 600 may be alternatively in another form, provided that the effect of charging the energy module 2 can be implemented.

In this embodiment, the charging member 600 and the self-moving device 800 can be detachably assembled. When the self-moving device 800 needs to charge at least two energy modules 2, the charging member 600 is suspended on the self-moving device 800. The charging member interface 610 is directly electrically connected to the energy module 2, to enable the self-moving device 800 to be electrically connected to at least one energy module 2 by the charging member 600, so that the self-moving device 800 simultaneously charges the energy module 2 docked to the self-moving device power interface 108 and the energy module 2 electrically connected to the charging member interface 610. In this embodiment, there is one self-moving device power interface 108. The self-moving device 800 can only charge one energy module 2 by using the self-moving device power interface 108. Therefore, the charging member 600 is detachably added, so that when the self-moving device 800 needs to charge at least two energy modules 2, the charging member 600 may be electrically connected to the self-moving device 800 for implementation. When it is not necessary to charge at least two energy modules 2, the charging member 600 may be detached from the self-moving device 800, to reduce the weight of the self-moving device 800 and provide the machine with more pleasing appearance.

In this embodiment, the self-moving device 800 may store external electrical energy in the energy module 2 in different manners in the following.

In an embodiment, as shown in FIG. 1, the self-moving device 800 further includes a docking charging interface 18. The docking charging interface 18 is configured to be docked to the charging station 8 to use the charging system 810 to store external electrical energy in the energy module 2.

Specifically, in an embodiment, the self-moving device 800 includes an automatic-return charging mode. The charging management module 801 includes an energy information acquisition module 806 configured to acquire the related information of the energy module 2 and a control unit 808 configured to control the self-moving device 800 to automatically return for charging. In the automatic-return charging mode, the control unit 808 controls, according to the related information of the energy module 2, the self-moving device 800 to automatically return to the charging station 8 to be docked to the charging station 8 to charge the energy module 2.

In this embodiment, the automatic-return charging mode may determine a return time by using a voltage value. Specifically, the automatic-return charging modes include a room temperature return charging mode. In the room temperature return charging mode, a return voltage threshold is preset. The energy information acquisition module 806 is configured to acquire a current voltage value of the energy module 2. When the current voltage value of the self-moving device 800 is less than the return voltage threshold, the control unit controls the self-moving device to automatically return for charging. The automatic-return charging mode further includes a high-temperature return charging mode. In the high-temperature return charging mode, a high-temperature return voltage threshold is preset. The high-temperature return voltage threshold is greater than the return voltage threshold. When the current voltage value of the self-moving device 800 is less than a high temperature voltage threshold, the control unit 808 controls the self-moving device 800 to automatically return for charging. The energy information acquisition module 806 is configured to acquire a current temperature of the energy module 2. The control unit 808 controls, according to the current temperature of the energy module 2, the self-moving device 800 to select a corresponding automatic-return charging mode. Specifically, a temperature threshold is preset. When the current temperature of the energy module 2 exceeds the temperature threshold, the control unit 808 controls the self-moving device 800 to select the high-temperature return charging mode to automatically return for charging. Specifically, the energy module 2 may use a thermosensitive resistor to recognize the temperature of the energy module. The energy module 2 includes a thermosensitive resistor. The energy information acquisition module 806 detects a resistance value of the thermosensitive resistor to acquire the current temperature of the energy module. When the temperature is higher, the energy module 2 with the same voltage value has a lower battery level. Therefore, if the room temperature return charging mode is still used at a high temperature, it is highly likely that the battery level of the self-moving device 800 cannot support the return of the self-moving device 800 to the charging station 8 for charging. Therefore, at a high temperature, a corresponding high-temperature return charging mode is set to satisfy that at a high temperature, the self-moving device 800 can still successfully automatically return to the charging station 8 for charging. In this embodiment, for the return voltage threshold of the automatic-return charging mode, in addition to the foregoing temperature factors, reference may further be made to the capacity of the energy module 2. For example, when a battery pack has a higher capacity, a lower return voltage threshold may be set, so that a high-capacity battery pack has a longer working time.

In another embodiment, the automatic-return charging mode may further use a remaining battery level value of the energy module 2 to determine a return charging time. Specifically, the automatic-return charging modes include a room temperature return charging mode. In the room temperature return charging mode, a return battery level threshold is preset. The energy information acquisition module 806 is configured to acquire the remaining battery level value of the energy module 2. When the remaining battery level value of the energy module 2 is less than the return battery level threshold, the control unit 808 controls the self-moving device to return to the charging station for charging.

Specifically, in another embodiment, the self-moving device 800 further includes a non-automatic-return charging mode. In the non-automatic-return charging mode, the control unit 808 controls the self-moving device 800 to be docked to the charging station 8 to charge the energy module 2. For example, when a user urgently needs to charge the electric tool 9, and when the self-moving device 800 still does not satisfy a return charging condition, the user may actively carry the self-moving device 800 back to the charging station, or use a return button on the self-moving device 800 or a return button on a user terminal to control the self-moving device 800 to return to the charging station, to charge the energy module 2.

Figure 43:
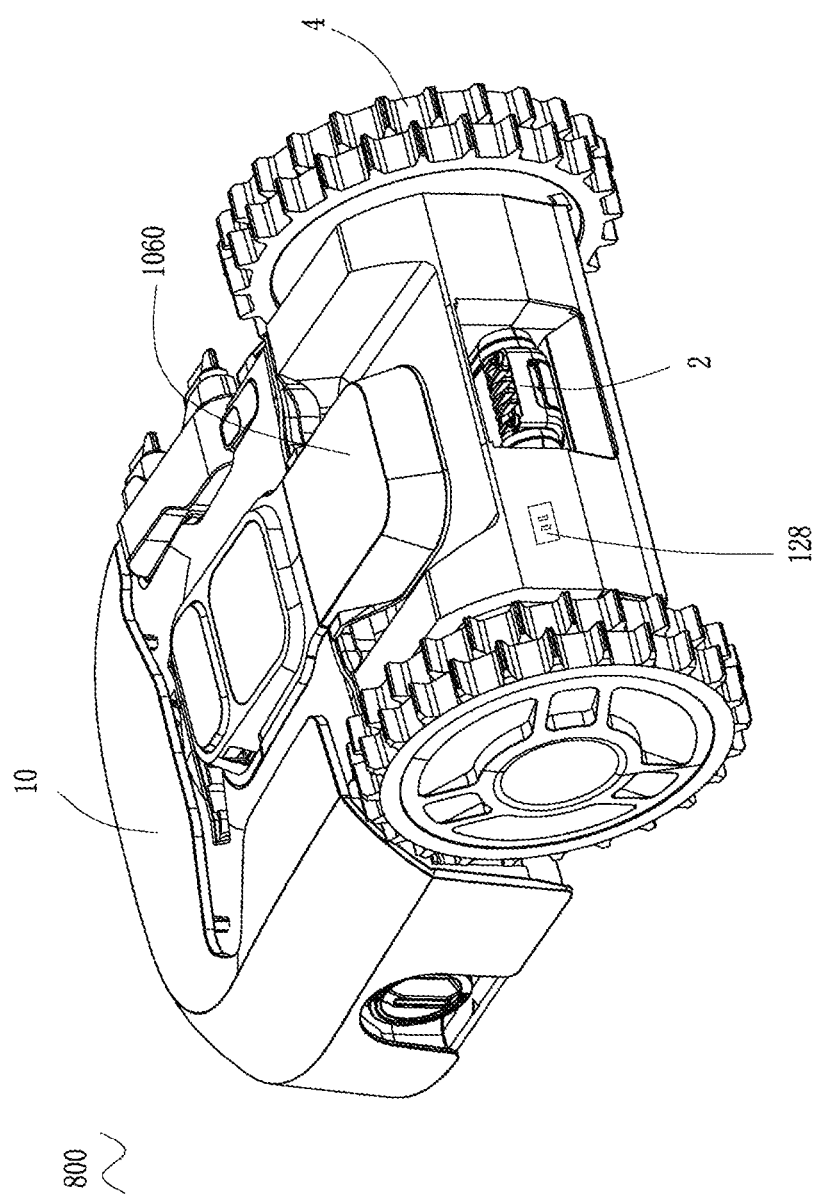
FIG. 43 is a three-dimensional view of a self-moving device to which a charging member can be suspended according to an embodiment of the present invention.
Figure 44:
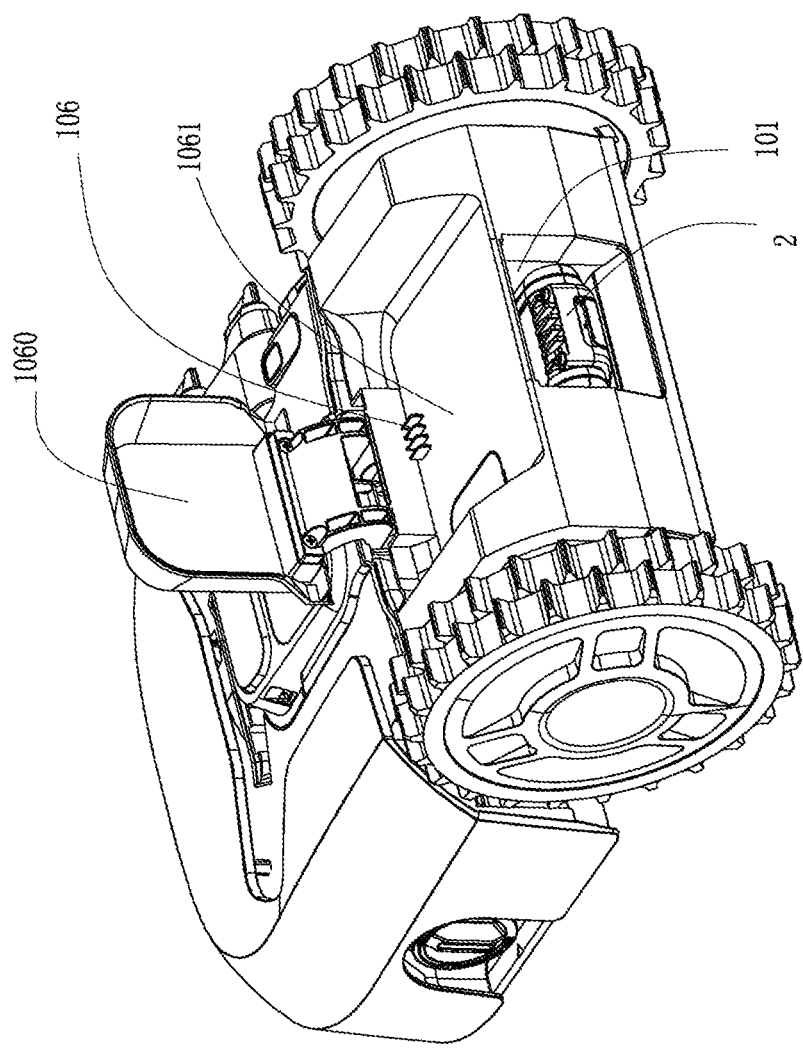
FIG. 44 is a three-dimensional view of the self-moving device shown in FIG. 43 with a device cover opened.
Figure 45:
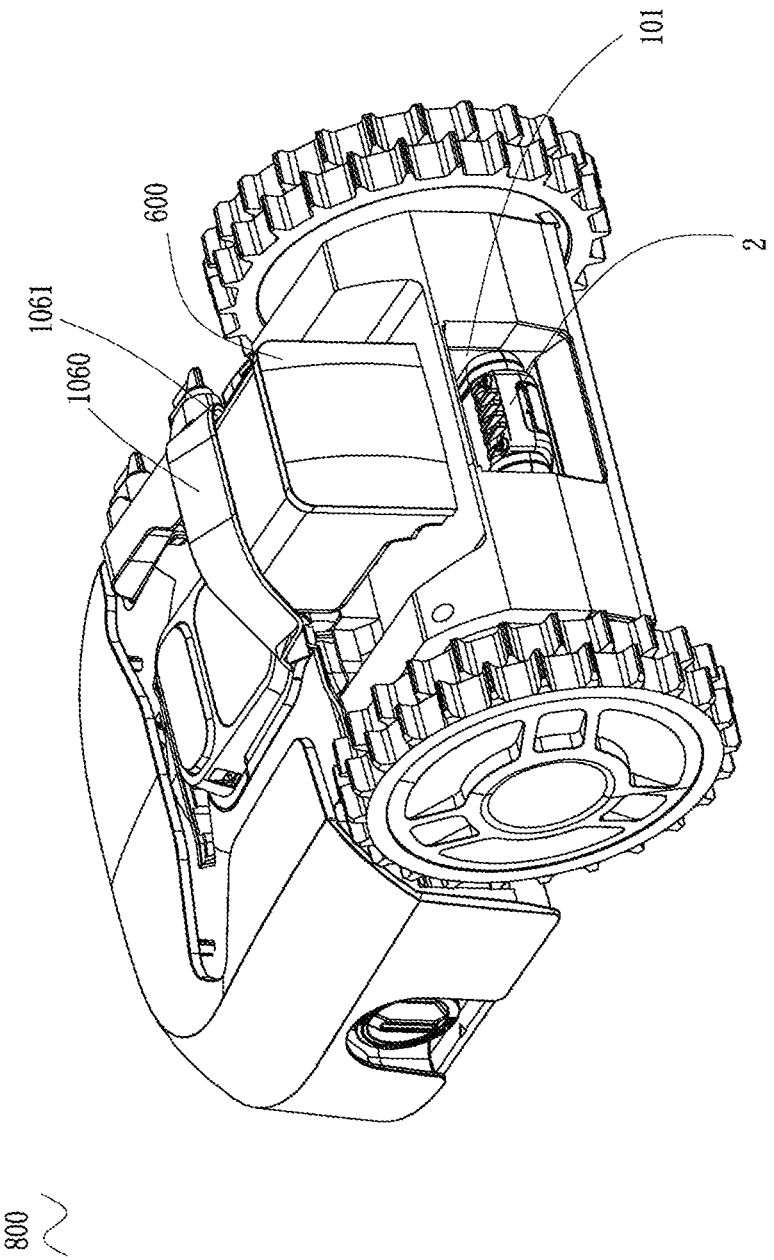
FIG. 45 is a three-dimensional view of the self-moving device and the charging member shown in FIG. 43 being assembled.

Specifically, in another embodiment, as shown in FIG. 1 and FIG. 43, the self-moving device 800 further includes a direct charging interface 128 different from the docking charging interface 18. The direct charging interface 128 is configured to be directly electrically connected to an external power supply to use the charging system 810 to store external electrical energy in the energy module 2. For example, when the self-moving device 800 is an autonomous lawnmower, the self-moving device 800 does not need to work in winter and cannot use the foregoing manner of automatically returning for charging to return for charging, so that the direct charging interface 128 may be directly used, and the self-moving device 800 is electrically connected to the external power supply, for example, is electrically connected to a receptacle in the user's home, so as to use the charging system 810 to store external electrical energy in the energy module 2.

For simplicity of description, all possible combinations of the technical features in the foregoing embodiments are not described. However, it should be considered that these combinations of technical features fall within the scope recorded in the specification provided that these combinations of technical features do not have any conflict.

The foregoing embodiments only describe several implementations of the present invention, and their description is specific and detailed, but cannot therefore be understood as a limitation to the patent scope of the present invention. It should be noted that a person of conventional skill in the art may further make variations and improvements without departing from the conception of the present invention, and these all fall within the protection scope of the present invention. Therefore, the patent protection scope of the present invention should be subject to the appended claims.

What is claimed is:

1. An automatic working system, comprising a self-moving device powered by an energy module and moving and working in a defined working area, wherein
the self-moving device comprises:
a body;
a movement module, disposed on the body and configured to drive the self-moving device to move;
a task execution module, disposed on the body and configured to perform a work task;
a control module, configured to control the movement module to drive the self-moving device to move in a defined area, and control the task execution module to perform the work task; and
a charging system, configured to store external electrical energy in the energy module to charge the energy module,
wherein the charging system comprises at least two charging modes for charging the energy module,
wherein, in different charging modes of the at least two charging modes, the charging system uses different charging logics and/or different charging parameters to charge the energy module,
wherein the charging system further comprises a charging management module configured to manage the at least two charging modes, to enable the charging system to use a corresponding charging mode to charge the energy module,
wherein the at least two charging modes comprise a fast-charging mode for charging at a fast speed and a slow-charging mode for charging at a slow speed,
wherein, in a device mode, the charging system charges the energy module in the slow-charging mode, and
wherein, in an electric tool mode, the charging system charges the energy module in the fast-charging mode.

2. The automatic working system according to claim 1, wherein the self-moving device is powered by a detachable energy module, and the charging system is configured to charge the detachable energy module.

3. The automatic working system according to claim 1, wherein each charging mode of the at least two charging modes is used to match one of at least two different types of energy modules, to enable the charging system to use a corresponding charging mode to charge the at least two different types of energy modules, and the at least two charging modes separately use different charging parameters to charge the energy module, to enable the charging system to use a corresponding charging parameter to charge the energy module.

4. The automatic working system according to claim 1, wherein the automatic working system comprises at least two energy modules charged by the charging system, and wherein each charging mode of the at least two charging modes uses one of at least two different charging orders to charge the energy module, to enable the charging system to use a corresponding charging order to charge the energy module.

5. The automatic working system according to claim 1, wherein when the self-moving device is powered on and/or a quantity of the energy modules changes, the charging management module adjusts the charging mode, to enable the charging system to select a corresponding charging mode to charge a current energy module.

6. The automatic working system according to claim 1, wherein the charging management module comprises an energy information acquisition module configured to acquire related information of the energy module and a control unit configured to control the charging system according to the related information, and the control unit is configured to control the charging system to use a corresponding charging mode to charge the energy module.

7. The automatic working system according to claim 6, wherein the energy module comprises an energy information providing module configured to provide the related information of the energy module, and the energy information acquisition module is configured to acquire information provided by the energy information providing module.

8. The automatic working system according to claim 6, wherein the energy information acquisition module is configured to acquire at least one piece of information of quantity information and type information of the energy module, and the control unit controls, according to the at least one piece of information of quantity information and type information of the energy module, a charging mode of charging the energy module by the charging system.

9. The automatic working system according to claim 6, wherein the at least two charging modes comprise a constant current charging mode of using a constant charging current to charge the energy module, and in the constant current charging mode, the control unit automatically selects, according to the related information of the energy module, a charging current of charging the energy module by the charging system, and the at least two charging modes further comprise a constant voltage charging mode of using a constant charging voltage to charge the energy module, and in the constant voltage charging mode, the control unit automatically selects, according to the related information of the energy module, a charging voltage of charging the energy module by the charging system.

10. The automatic working system according to claim 9, wherein the energy information acquisition module is configured to acquire a current voltage value of the energy module, and the control unit controls, according to the current voltage value of the energy module, the charging system to select to use one of the constant current charging mode and the constant voltage charging mode to charge the energy module.

11. The automatic working system according to claim 6, wherein the energy information acquisition module is configured to continuously acquire at least one piece of information of a quantity, a current temperature, a voltage value, and a remaining battery level value of the energy module, and the control unit controls, according to the related information of the energy module acquired by the energy information acquisition module, a charging status of charging the energy module by the charging system.

12. The automatic working system according to claim 1, wherein the charging management module further comprises an instruction receiving module and a control unit, the instruction receiving module is configured to receive an instruction for adjusting the corresponding charging mode, and the control unit adjusts the corresponding charging mode according to the instruction.

13. The automatic working system according to claim 1, wherein the self-moving device presets a plurality of preset charging modes for charging the energy module, and the charging management module is configured to control the charging system to use a corresponding preset charging mode to charge the energy module, and the preset charging modes comprise the fast-charging mode and the slow-charging mode.

14. The automatic working system according to claim 13, wherein in the fast-charging mode, when the charging system simultaneously charges at least two energy modules, the charging management module controls the charging system to adjust in real time a charging current for charging each energy module, to enable the charging system to charge the energy module at a high power, to increase the charging speed of the energy module.

15. The automatic working system according to claim 1, wherein a device charging cutoff battery level and an electric tool charging cutoff battery level are preset, in the device mode, a charging cutoff battery level of charging the energy module by the charging system is the device charging cutoff battery level, and in the electric tool mode, the charging cutoff battery level of charging the energy module by the charging system is the electric tool charging cutoff battery level.

16. The automatic working system according to claim 1, wherein the self-moving device comprise an automatic-return charging mode, an energy information acquisition module and a control unit, the automatic-return charging mode comprises a room temperature return charging mode and a high-temperature return charging mode, the energy information acquisition module is configured to acquire a current temperature of the energy module, and the control unit controls, according to the current temperature of the energy module, the self-moving device to select a corresponding automatic-return charging mode.

17. The automatic working system according to claim 1, wherein the self-moving device further comprises a docking charging interface and a direct charging interface different from the docking charging interface, the docking charging interface is configured to be docked to a charging station to store external electrical energy in the energy module by using the charging system, and the direct charging interface is configured to be directly electrically connected to an external power supply to store external electrical energy in the energy module by using the charging system.

18. The automatic working system according to claim 1, wherein the automatic working system further comprises a charging member configured to accommodate at least one energy module, and the charging member comprises a charging member interface electrically connected to the energy module and a charging member adaptation interface electrically connected to the self-moving device.

19. The automatic working system according to claim 1, wherein the device mode is for charging the energy module for powering the self-moving device mode.

20. The automatic working system according to claim 1, wherein the electric tool mode is for charging the energy module for an electric tool that is separate from the self-moving device mode.

\* \* \* \* \*